US012684385B2

(12) United States Patent　　　　(10) Patent No.:　US 12,684,385 B2

Balasubramanian et al.　　　　　　(45) Date of Patent:　　　Jul. 14, 2026

(54) INTERFERENCE MANAGEMENT FOR RECONFIGURABLE INTELLIGENT SURFACES

(71) Applicant: QUALCOMM Incorporated, San Diego, CA (US)

(72) Inventors: Anantharaman Balasubramanian, San Diego, CA (US); Shuanshuan Wu, San Diego, CA (US); Navid Abedini, Basking Ridge, NJ (US); Kapil Gulati, Belle Mead, NJ (US); Junyi Li, Fairless Hills, PA (US); Sourjya Dutta, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 17/832,413

(22) Filed: Jun. 3, 2022

(65) Prior Publication Data

US 2023/0397030 A1　　Dec. 7, 2023

(51) Int. Cl.
　　　*H04W 24/10*　　　(2009.01)
　　　*H04L 5/00*　　　(2006.01)
(52) U.S. Cl.
　　　CPC ........... *H04W 24/10* (2013.01); *H04L 5/0048* (2013.01); *H04L 5/0073* (2013.01)
(58) Field of Classification Search
　　　CPC .... H04W 24/10; H04W 24/08; H04L 5/0048; H04L 5/0073; H04L 5/001; H04B 7/0626; H04B 7/04013
　　　See application file for complete search history.

(56) References Cited

U.S. PATENT DOCUMENTS

2016/0014791 A1* 1/2016 Liu ........................ H04W 24/08
　　　　　　　　　　　　　　　　　370/252
2017/0187448 A1* 6/2017 Kwon ................ H04B 7/15585
(Continued)

FOREIGN PATENT DOCUMENTS

WO　　WO-2021251511 A1　12/2021
WO　　WO-2022050554 A1　 3/2022
WO　　WO-2023000287 A1　 1/2023

OTHER PUBLICATIONS

"On the Performance of Physical Layer Security of RIS-aided Communications"; Tu et al.; 2021 IEEE Conference on Antenna Measurements & Applications (CAMA) Nov. 15-17, 2021, Antibes Juan-les-Pins, France (Year: 2021).*

(Continued)

*Primary Examiner* — Benjamin H Elliott, IV
(74) *Attorney, Agent, or Firm* — Paul M. McAdams; Holland & Hart LLP

(57)　　　　　　　ABSTRACT

Methods, systems, and devices for wireless communications are described. A user equipment (UE) or a base station may communicate a set of reference signals on a set of interference measurement resources. The set of interference measurements may be based on a first activation schedule of one or more reconfigurable intelligent surfaces (RISs). The UE or the base station may generate interference measurement information associated with the one or more RISs based on the set of reference signals. The base station may determine a second activation schedule of the one or more RISs or an allocation of resources for communicating with the UE based on the set of interference measurements. The base station may communicate with the UE based on the second activation schedule or the allocation of resources.

32 Claims, 21 Drawing Sheets

(56) References Cited

U.S. PATENT DOCUMENTS

| | | | | |
|---|---|---|---|---|
| 2021/0302561 A1* | 9/2021 | Bayesteh | ................. | G01S 13/42 |
| 2021/0384958 A1* | 12/2021 | Denis | ..................... | H04B 7/145 |
| 2022/0014935 A1* | 1/2022 | Haija | ................... | H04L 5/0048 |
| 2023/0030324 A1* | 2/2023 | Ali | ..................... | H04B 7/04013 |
| 2023/0188170 A1* | 6/2023 | Dutta | .................... | H04W 24/08 |
| | | | | 375/346 |
| 2023/0284055 A1* | 9/2023 | Wei | ....................... | H04W 24/08 |
| | | | | 370/252 |
| 2023/0318177 A1* | 10/2023 | Zhou | ................... | H04L 25/0204 |
| | | | | 455/456.1 |
| 2023/0328573 A1* | 10/2023 | Yang | ................. | H04B 7/04013 |
| | | | | 370/329 |
| 2023/0397030 A1* | 12/2023 | Balasubramanian | ........................ | |
| | | | | H04B 7/0626 |
| 2024/0364434 A1* | 10/2024 | Sahraei | ................ | H04B 17/309 |
| 2024/0380440 A1* | 11/2024 | Jamadagni | ......... | H04B 7/06952 |
| 2025/0167953 A1* | 5/2025 | Guan | ................ | H04B 7/06952 |

OTHER PUBLICATIONS

"Reconfigurable Intelligent Surfaces for Smart Cities: Research Challenges and Opportunities"; Kisseleff et al.; IEEE Open Journal of the Communications Society ( vol. 1); Nov. 10, 2020 (Year: 2020).*

"Reconfigurable-Intelligent-Surface Empowered Wireless Communications: Challenges and Opportunities"; Yuan et al.; IEEE Wireless Communications • Apr. 2021 (Year: 2021).*

"Software-Defined Reconfigurable Intelligent Surfaces: From Theory to End-to-End Implementation"; Liaskos et al.; Proceedings of the IEEE | vol. 110, No. 9, Sep. 2022 (Year: 2022).*

Partial International Search Report—PCT/US2023/023882—ISA/EPO—Sep. 1, 2023.

International Search Report and Written Opinion—PCT/US2023/023882—ISA/EPO—Dec. 18, 2023.

* cited by examiner

1010

1020

1015

1005

1000

1410

1420

1415

1405

1400

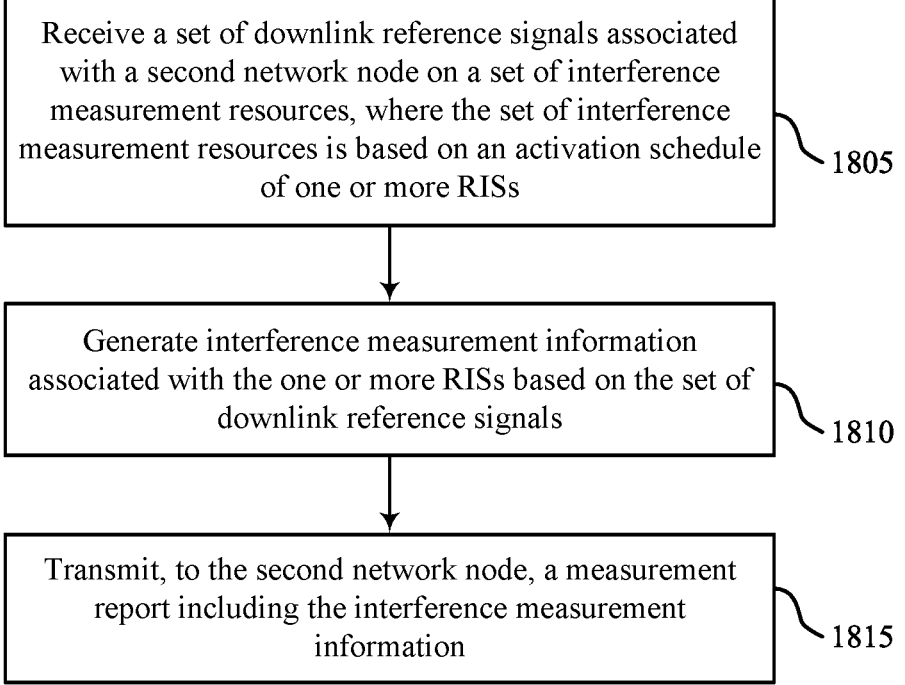

Receive a set of downlink reference signals associated with a second network node on a set of interference measurement resources, where the set of interference measurement resources is based on an activation schedule of one or more RISs ⟍ 1805

Generate interference measurement information associated with the one or more RISs based on the set of downlink reference signals ⟍ 1810

Transmit, to the second network node, a measurement report including the interference measurement information ⟍ 1815

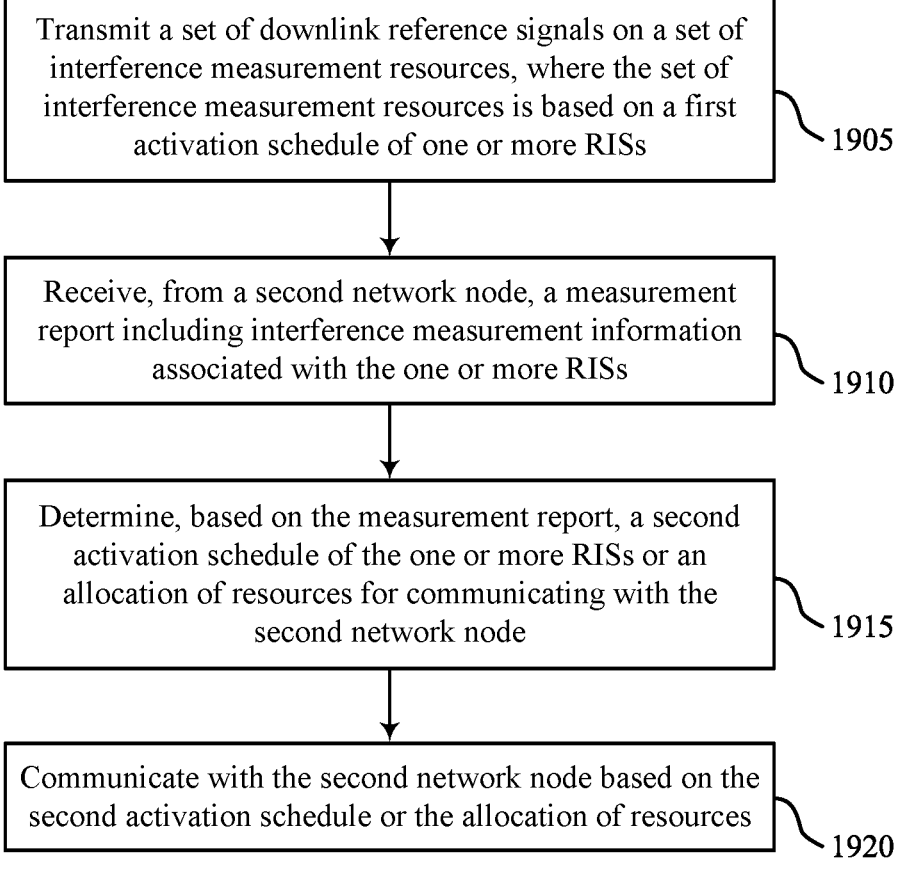

Transmit a set of downlink reference signals on a set of interference measurement resources, where the set of interference measurement resources is based on a first activation schedule of one or more RISs

1905

Receive, from a second network node, a measurement report including interference measurement information associated with the one or more RISs

1910

Determine, based on the measurement report, a second activation schedule of the one or more RISs or an allocation of resources for communicating with the second network node

1915

Communicate with the second network node based on the second activation schedule or the allocation of resources

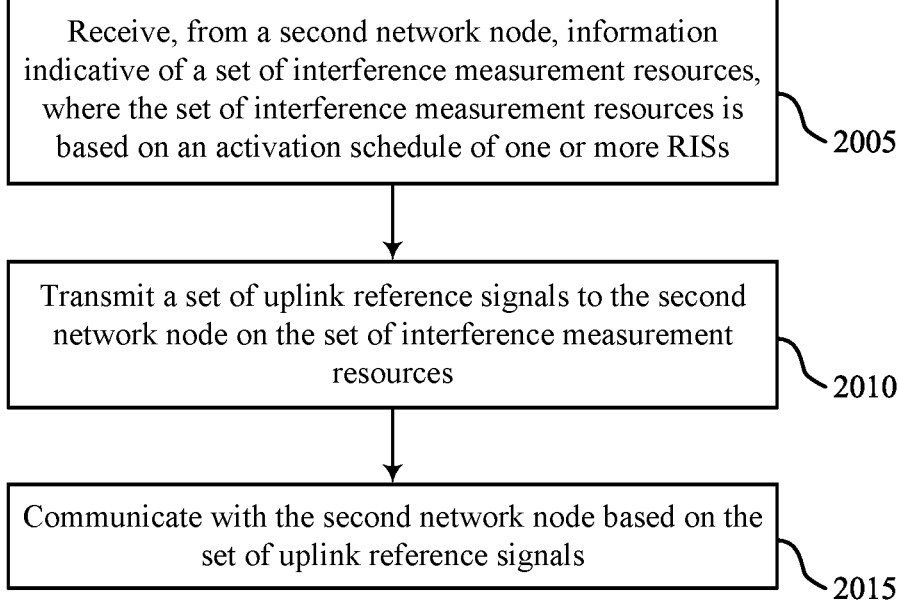

Receive, from a second network node, information indicative of a set of interference measurement resources, where the set of interference measurement resources is based on an activation schedule of one or more RISs    2005

Transmit a set of uplink reference signals to the second network node on the set of interference measurement resources    2010

Communicate with the second network node based on the set of uplink reference signals    2015

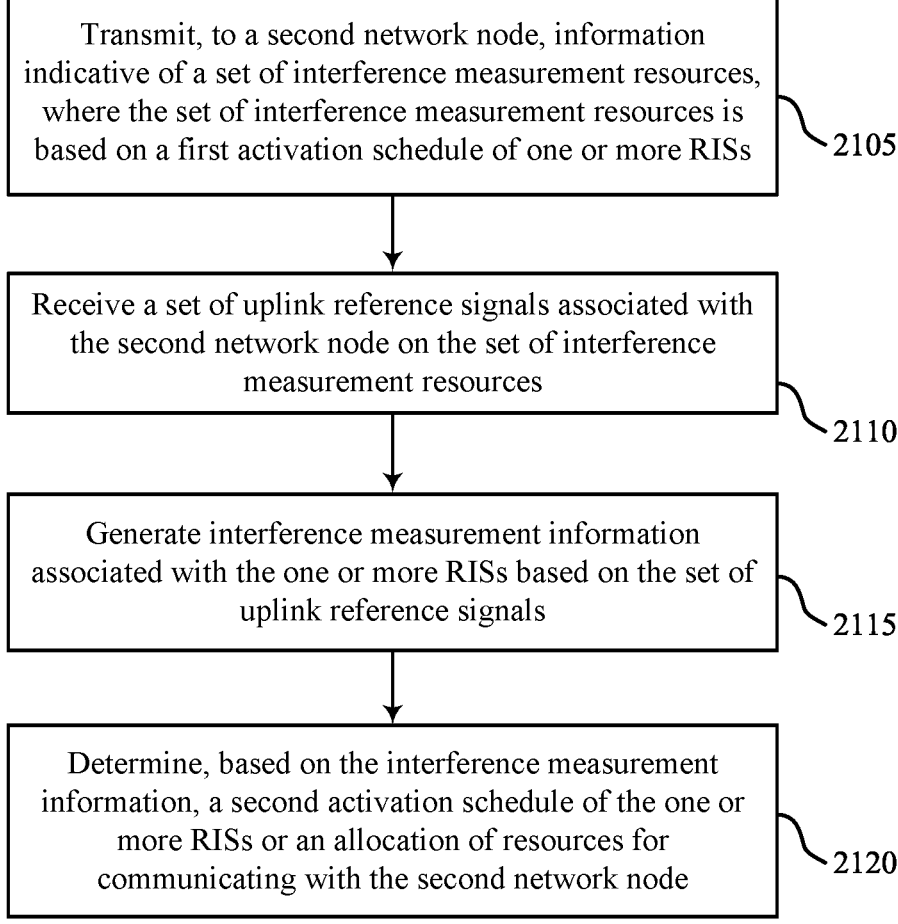

Transmit, to a second network node, information indicative of a set of interference measurement resources, where the set of interference measurement resources is based on a first activation schedule of one or more RISs ⟋2105

Receive a set of uplink reference signals associated with the second network node on the set of interference measurement resources ⟋2110

Generate interference measurement information associated with the one or more RISs based on the set of uplink reference signals ⟋2115

Determine, based on the interference measurement information, a second activation schedule of the one or more RISs or an allocation of resources for communicating with the second network node ⟋2120

INTERFERENCE MANAGEMENT FOR RECONFIGURABLE INTELLIGENT SURFACES

FIELD OF TECHNOLOGY

The following relates to wireless communications, including interference management for reconfigurable intelligent surfaces (RISs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may employ reconfigurable intelligent surfaces (RISs) to increase cell coverage and channel diversity. A RIS may be an example of a passive device that can reflect, refract, or otherwise passively steer signals in a desired direction. In some cases, however, signals reflected (e.g., refracted, steered) by a RIS may cause interference at other wireless devices.

SUMMARY

The described techniques relate to improved methods, systems, devices, and apparatuses that support interference management for reconfigurable intelligent surfaces (RISs). Generally, the described techniques provide for decreasing RIS-centric interference (e.g., interference caused by a RIS). In accordance with aspects of the present disclosure, a user equipment (UE) or a base station may communicate a set of reference signals on a set of interference measurement resources. The set of interference measurement resources may be based on a first activation schedule of one or more RISs. The UE or the base station may generate interference measurement information based on the set of reference signals. The base station may determine a second activation schedule of the one or more RISs or an allocation of resources for communicating with the UE based on the interference measurement information. The base station may communicate with the UE based on the second activation schedule or the allocation of resources. The techniques described herein may result in decreased interference and improved communication reliability, among other benefits.

A method for wireless communication at a first network node is described. The method may include receiving a set of downlink reference signals associated with a second network node on a set of interference measurement resources, where the set of interference measurement resources is based on an activation schedule of one or more RISs. The method may further include generating interference measurement information associated with the one or more RISs based on the set of downlink reference signals. The method may further include transmitting, to the second network node, a measurement report including the interference measurement information.

A first network node for wireless communication is described. The first network node may include a processor and memory coupled with the processor. The processor may be configured to receive a set of downlink reference signals associated with a second network node on a set of interference measurement resources, where the set of interference measurement resources is based on an activation schedule of one or more RISs. The processor may be further configured to generate interference measurement information associated with the one or more RISs based on the set of downlink reference signals. The processor may be further configured to transmit, to the second network node, a measurement report including the interference measurement information.

An apparatus for wireless communication at a first network node is described. The apparatus may include means for receiving a set of downlink reference signals associated with a second network node on a set of interference measurement resources, where the set of interference measurement resources is based on an activation schedule of one or more RISs. The apparatus may further include means for generating interference measurement information associated with the one or more RISs based on the set of downlink reference signals. The apparatus may further include means for transmitting, to the second network node, a measurement report including the interference measurement information.

A non-transitory computer-readable medium storing code for wireless communication at a first network node is described. The code may include instructions executable by a processor to receive a set of downlink reference signals associated with a second network node on a set of interference measurement resources, where the set of interference measurement resources is based on an activation schedule of one or more RISs. The instructions may be further executable to generate interference measurement information associated with the one or more RISs based on the set of downlink reference signals. The instructions may be further executable to transmit, to the second network node, a measurement report including the interference measurement information.

Some examples of the methods, network nodes, apparatuses, and non-transitory computer-readable media described herein may further include operations, features, means, or instructions for receiving, from the second network node, information indicative of an allocation of resources for communication with the second network node, where the allocation of resources is based on the measurement report.

Some examples of the methods, network nodes, apparatuses, and non-transitory computer-readable media described herein may further include operations, features, means, or instructions for communicating with the second network node via the one or more RISs using resources allocated by the allocation of resources.

In some examples of the methods, network nodes, apparatuses, and non-transitory computer-readable media described herein, receiving the set of downlink reference signals may include operations, features, means, or instructions for receiving the set of downlink reference signals associated with the second network node on the set of interference measurement resources, where the set of interference measurement resources is based on a set of directional settings associated with the activation schedule of the one or more RISs, a set of active periods associated with the activation schedule of the one or more RISs, or a set of inactive periods associated with the activation schedule of the one or more RISs.

In some examples of the methods, network nodes, apparatuses, and non-transitory computer-readable media described herein, the interference measurement information includes information indicative of a respective received power for each respective downlink reference signal of the set of downlink reference signals.

Some examples of the methods, network nodes, apparatuses, and non-transitory computer-readable media described herein may further include operations, features, means, or instructions for receiving, from the second network node, information indicative of the set of interference measurement resources, where receiving the set of downlink reference signals is based on the information indicative of the set of interference measurement resources.

A method for wireless communication at a first network node is described. The method may include transmitting a set of downlink reference signals on a set of interference measurement resources, where the set of interference measurement resources is based on a first activation schedule of one or more RISs. The method may further include receiving, from a second network node, a measurement report including interference measurement information associated with the one or more RISs. The method may further include determining, based on the measurement report, a second activation schedule of the one or more RISs or an allocation of resources for communicating with the second network node. The method may further include communicating with the second network node based on the second activation schedule or the allocation of resources.

A first network node for wireless communication is described. The first network node may include a processor and memory coupled with the processor. The processor may be configured to transmit a set of downlink reference signals on a set of interference measurement resources, where the set of interference measurement resources is based on a first activation schedule of one or more RISs. The processor may be further configured to receive, from a second network node, a measurement report including interference measurement information associated with the one or more RISs. The processor may be further configured to determine, based on the measurement report, a second activation schedule of the one or more RISs or an allocation of resources for communicating with the second network node. The processor may be further configured to communicate with the second network node based on the second activation schedule or the allocation of resources.

An apparatus for wireless communication at a first network node is described. The apparatus may include means for transmitting a set of downlink reference signals on a set of interference measurement resources, where the set of interference measurement resources is based on a first activation schedule of one or more RISs. The apparatus may further include means for receiving, from a second network node, a measurement report including interference measurement information associated with the one or more RISs. The apparatus may further include means for determining, based on the measurement report, a second activation schedule of the one or more RISs or an allocation of resources for communicating with the second network node. The apparatus may further include means for communicating with the second network node based on the second activation schedule or the allocation of resources.

A non-transitory computer-readable medium storing code for wireless communication at a first network node is described. The code may include instructions executable by a processor to transmit a set of downlink reference signals on a set of interference measurement resources, where the set of interference measurement resources is based on a first activation schedule of one or more RISs. The instructions may be further executable by the processor to receive, from a second network node, a measurement report including interference measurement information associated with the one or more RISs. The instructions may be further executable by the processor to determine, based on the measurement report, a second activation schedule of the one or more RISs or an allocation of resources for communicating with the second network node. The instructions may be further executable by the processor to communicate with the second network node based on the second activation schedule or the allocation of resources.

In some examples of the methods, network nodes, apparatuses, and non-transitory computer-readable media described herein, determining the second activation schedule or the allocation of resources may include operations, features, means, or instructions for determining a set of directional settings for the one or more RISs, a set of active periods associated with the second activation schedule of the one or more RISs, a set of inactive periods associated with the second activation schedule of the one or more RISs, an allocation of uplink resources for communicating with the second network node, or an allocation of downlink resources for communicating with the second network node.

Some examples of the methods, network nodes, apparatuses, and non-transitory computer-readable media described herein may further include operations, features, means, or instructions for transmitting, to a third network node, first information indicative of the interference measurement information, a first set of directional settings associated with the second activation schedule of the one or more RISs, a first set of active periods associated with the second activation schedule of the one or more RISs, or a first set of inactive periods associated with the second activation schedule of the one or more RISs.

Some examples of the methods, network nodes, apparatuses, and non-transitory computer-readable media described herein may further include operations, features, means, or instructions for receiving, from the third network node, second information indicative of second interference measurement information associated with the one or more RISs, a second set of directional settings associated with the second activation schedule of the one or more RISs, a second set of active periods associated with the second activation schedule of the one or more RISs, or a second set of inactive periods associated with the second activation schedule of the one or more RISs, where determining the second activation schedule or the allocation of resources is based on the first information and the second information.

Some examples of the methods, network nodes, apparatuses, and non-transitory computer-readable media described herein may further include operations, features, means, or instructions for receiving, from a controller associated with the one or more RISs, information indicative of a set of directional settings associated with the first activation schedule of the one or more RISs, a set of active periods associated with the first activation schedule of the one or more RISs, or a set of inactive periods associated with the first activation schedule of the one or more RISs, where determining the second activation schedule or the allocation of resources is based on the information.

Some examples of the methods, network nodes, apparatuses, and non-transitory computer-readable media described herein may further include operations, features, means, or instructions for transmitting, to the controller and based on the information received from the controller, second information indicative of the second activation schedule of the one or more RISs.

Some examples of the methods, network nodes, apparatuses, and non-transitory computer-readable media described herein may further include operations, features, means, or instructions for determining the set of interference measurement resources based on a measurement resource coordination procedure between the first network node and a third network node or a controller associated with the one or more RISs.

Some examples of the methods, network nodes, apparatuses, and non-transitory computer-readable media described herein may further include operations, features, means, or instructions for transmitting, to the second network node, information indicative of the set of interference measurement resources, where transmitting the set of downlink reference signals is based on the information.

In some examples of the methods, network nodes, apparatuses, and non-transitory computer-readable media described herein, communicating with the second network node may include operations, features, means, or instructions for communicating with the second network node via the one or more RISs based on the second activation schedule or the allocation of resources.

In some examples of the methods, network nodes, apparatuses, and non-transitory computer-readable media described herein, transmitting the set of downlink reference signals may include operations, features, means, or instructions for transmitting the set of downlink reference signals on the set of interference measurement resources, where the set of interference measurement resources is configured for a set of network nodes in a connected state with the first network node, a set of network nodes with a threshold received signal strength indicator (RSSI), or a set of network nodes in a geographic coverage area of the first network node.

In some examples of the methods, network nodes, apparatuses, and non-transitory computer-readable media described herein, transmitting the set of downlink reference signals may include operations, features, means, or instructions for transmitting the set of downlink reference signals on the set of interference measurement resources, where two or more interference measurement resources of the set of interference measurement resources correspond to respective combinations of one or more active RISs and one or more inactive RISs, and where the one or more RISs comprise the one or more active RISs and the one or more inactive RISs, and where the respective combinations are based on the first activation schedule.

In some examples of the methods, network nodes, apparatuses, and non-transitory computer-readable media described herein, a first interference measurement resource of the set of interference measurement resources is within an active period of a first RIS of the one or more RISs and a second interference measurement resource of the set of interference measurement resources is within an inactive period of the first RIS.

In some examples of the methods, network nodes, apparatuses, and non-transitory computer-readable media described herein, the first interference measurement resource is within an inactive period of a second RIS of the one or more RISs and the second interference measurement resource is within an active period of the second RIS.

Some examples of the methods, network nodes, apparatuses, and non-transitory computer-readable media described herein may further include operations, features, means, or instructions for receiving, from a third network node, a second measurement report including second interference measurement information associated with the one or more RISs, where determining the second activation schedule or the allocation of resources is based on the measurement report from the second network node and the second measurement report from the third network node.

A method for wireless communication at a first network node is described. The method may include receiving, from a second network node, information indicative of a set of interference measurement resources, where the set of interference measurement resources is based on an activation schedule of one or more RISs. The method may further include transmitting a set of uplink reference signals to the second network node on the set of interference measurement resources. The method may further include communicating with the second network node based on the set of uplink reference signals.

A first network node for wireless communication is described. The first network node may include a processor and memory coupled with the processor. The processor may be configured to receive, from a second network node, information indicative of a set of interference measurement resources, where the set of interference measurement resources is based on an activation schedule of one or more RISs. The processor may be further configured to transmit a set of uplink reference signals to the second network node on the set of interference measurement resources. The processor may be further configured to communicate with the second network node based on the set of uplink reference signals.

An apparatus for wireless communication at a first network node is described. The apparatus may include means for receiving, from a second network node, information indicative of a set of interference measurement resources, where the set of interference measurement resources is based on an activation schedule of one or more RISs. The apparatus may further include means for transmitting a set of uplink reference signals to the second network node on the set of interference measurement resources. The apparatus may further include means for communicating with the second network node based on the set of uplink reference signals.

A non-transitory computer-readable medium storing code for wireless communication at a first network node is described. The code may include instructions executable by a processor to receive, from a second network node, information indicative of a set of interference measurement resources, where the set of interference measurement resources is based on an activation schedule of one or more RISs. The instructions may be further executable by the processor to transmit a set of uplink reference signals to the second network node on the set of interference measurement resources. The instructions may be further executable by the processor to communicate with the second network node based on the set of uplink reference signals Some examples of the methods, network nodes, apparatuses, and non-transitory computer-readable media described herein may further include operations, features, means, or instructions for receiving, from the second network node, information indicative of an allocation of resources for communicating with the second network node, where the allocation of resources is based on the set of uplink reference signals.

In some examples of the methods, network nodes, apparatuses, and non-transitory computer-readable media described herein, communicating with the second network node may include operations, features, means, or instructions for communicating with the second network node via the one or more RISs using resources allocated by the allocation of resources.

In some examples of the methods, network nodes, apparatuses, and non-transitory computer-readable media described herein, transmitting the set of uplink reference signals may include operations, features, means, or instructions for transmitting the set of uplink reference signals to the second network node on the set of interference measurement resources, where the set of interference measurement resources is based on a set of directional settings associated with the activation schedule of the one or more RISs, a set of active periods associated with the activation schedule of the one or more RISs, or a set of inactive periods associated with the activation schedule of the one or more RISs.

In some examples of the methods, network nodes, apparatuses, and non-transitory computer-readable media described herein, a first interference measurement resource of the set of interference measurement resources is within an active period of a first RIS of the one or more RISs and a second interference measurement resource of the set of interference measurement resources is within an inactive period of the first RIS.

In some examples of the methods, network nodes, apparatuses, and non-transitory computer-readable media described herein, the first interference measurement resource is within an inactive period of a second RIS of the one or more RISs and the second interference measurement resource is within an active period of the second RIS.

A method for wireless communication at a first network node is described. The method may include transmitting, to a second network node, information indicative of a set of interference measurement resources, where the set of interference measurement resources is based on a first activation schedule of one or more RISs. The method may further include receiving a set of uplink reference signals associated with the second network node on the set of interference measurement resources. The method may further include generating interference measurement information associated with the one or more RISs based on the set of uplink reference signals. The method may further include determining, based on the interference measurement information, a second activation schedule of the one or more RISs or an allocation of resources for communicating with the second network node.

A first network node for wireless communication is described. The first network node may include a processor and memory coupled with the processor. The processor may be configured to transmit, to a second network node, information indicative of a set of interference measurement resources, where the set of interference measurement resources is based on a first activation schedule of one or more RISs. The processor may be further configured to receive a set of uplink reference signals associated with the second network node on the set of interference measurement resources. The processor may be further configured to generate interference measurement information associated with the one or more RISs based on the set of uplink reference signals. The processor may be further configured to determine, based on the interference measurement information, a second activation schedule of the one or more RISs or an allocation of resources for communicating with the second network node.

An apparatus for wireless communication at a first network node is described. The apparatus may include means for transmitting, to a second network node, information indicative of a set of interference measurement resources, where the set of interference measurement resources is based on a first activation schedule of one or more RISs. The apparatus may further include means for receiving a set of uplink reference signals associated with the second network node on the set of interference measurement resources. The apparatus may further include means for generating interference measurement information associated with the one or more RISs based on the set of uplink reference signals. The apparatus may further include means for determining, based on the interference measurement information, a second activation schedule of the one or more RISs or an allocation of resources for communicating with the second network node.

A non-transitory computer-readable medium storing code for wireless communication at a first network node is described. The code may include instructions executable by a processor to transmit, to a second network node, information indicative of a set of interference measurement resources, where the set of interference measurement resources is based on a first activation schedule of one or more RISs. The instructions may be further executable by the processor to receive a set of uplink reference signals associated with the second network node on the set of interference measurement resources. The instructions may be further executable by the processor to generate interference measurement information associated with the one or more RISs based on the set of uplink reference signals. The instructions may be further executable by the processor to determine, based on the interference measurement information, a second activation schedule of the one or more RISs or an allocation of resources for communicating with the second network node.

In some examples of the methods, network nodes, apparatuses, and non-transitory computer-readable media described herein, determining the second activation schedule or the allocation of resources may include operations, features, means, or instructions for determining a set of directional settings associated with the second activation schedule of the one or more RISs, a set of active periods associated with the second activation schedule of the one or more RISs, a set of inactive periods associated with the second activation schedule of the one or more RISs, an allocation of uplink resources for communicating with the second network node, or an allocation of downlink resources for communicating with the second network node.

Some examples of the methods, network nodes, apparatuses, and non-transitory computer-readable media described herein may further include operations, features, means, or instructions for transmitting, to a third network node, first information indicative of the interference measurement information, a first set of directional settings associated with the second activation schedule of the one or more RISs, a first set of active periods associated with the second activation schedule of the one or more RISs, or a first set of inactive periods associated with the second activation schedule of the one or more RISs.

Some examples of the methods, network nodes, apparatuses, and non-transitory computer-readable media described herein may further include operations, features, means, or instructions for receiving, from the third network node, second information indicative of second interference measurement information, a second set of directional settings associated with the second activation schedule of the one or more RISs, a second set of active periods associated with the second activation schedule of the one or more RISs, or a second set of inactive periods associated with the second activation schedule of the one or more RISs, where determining the second activation schedule or the allocation of resources is based on the first information and the second information.

Some examples of the methods, network nodes, apparatuses, and non-transitory computer-readable media described herein may further include operations, features, means, or instructions for receiving, from a controller associated with the one or more RISs, information indicative of a set of directional settings associated with the first activation schedule of the one or more RISs, a set of active periods associated with the first activation schedule of the one or more RISs, or a set of inactive periods associated with the first activation schedule of the one or more RISs, where determining the second activation schedule or the allocation of resources is based on the information.

Some examples of the methods, network nodes, apparatuses, and non-transitory computer-readable media described herein may further include operations, features, means, or instructions for transmitting, to the controller and based on the information received from the controller, second information indicative of the second activation schedule of the one or more RISs.

Some examples of the methods, network nodes, apparatuses, and non-transitory computer-readable media described herein may further include operations, features, means, or instructions for determining the set of interference measurement resources based on a measurement resource coordination procedure between the first network node and a third network node or a controller associated with the one or more RISs, where transmitting the information indicative of the set of interference measurement resources to the second network node is based on the measurement resource coordination procedure.

Some examples of the method, apparatuses, and non-transitory computer-readable medium described herein may further include operations, features, means, or instructions for communicating with the second network node via the one or more RISs based on the second activation schedule or the allocation of resources.

In some examples of the methods, network nodes, apparatuses, and non-transitory computer-readable media described herein, receiving the set of uplink reference signals may include operations, features, means, or instructions for receiving the set of uplink reference signals on the set of interference measurement resources, where the set of interference measurement resources is configured for a set of network nodes in a connected state with the first network node, a set of network nodes with a threshold RSSI, or a set of network nodes in a geographic coverage area of the first network node.

In some examples of the methods, network nodes, apparatuses, and non-transitory computer-readable media described herein, receiving the set of uplink reference signals may include operations, features, means, or instructions for receiving the set of uplink reference signals on the set of interference measurement resources, where the set of interference measurement resources is based on whether the one or more RISs are scheduled to be in an active state or an inactive state during a set of time periods corresponding to the set of interference measurement resources.

Some examples of the methods, network nodes, apparatuses, and non-transitory computer-readable media described herein may further include operations, features, means, or instructions for receiving a second set of uplink reference signals associated with a third network node on the set of interference measurement resources, where the set of uplink reference signals associated with the second network node and the second set of uplink reference signals associated with the third network node are associated with different orthogonal cover codes.

Some examples of the methods, network nodes, apparatuses, and non-transitory computer-readable media described herein may further include operations, features, means, or instructions for generating second interference measurement information associated with the one or more RISs based on the second set of uplink reference signals associated with the third network node, where determining the second activation schedule or the allocation of resources is based on the interference measurement information from the second network node and the second interference measurement information from the third network node.

BRIEF DESCRIPTION OF THE DRAWINGS

FIGS. 18 through 21 show flowcharts illustrating methods that support interference management for RISs in accordance with aspects of the present disclosure.

DETAILED DESCRIPTION

Figure 1:
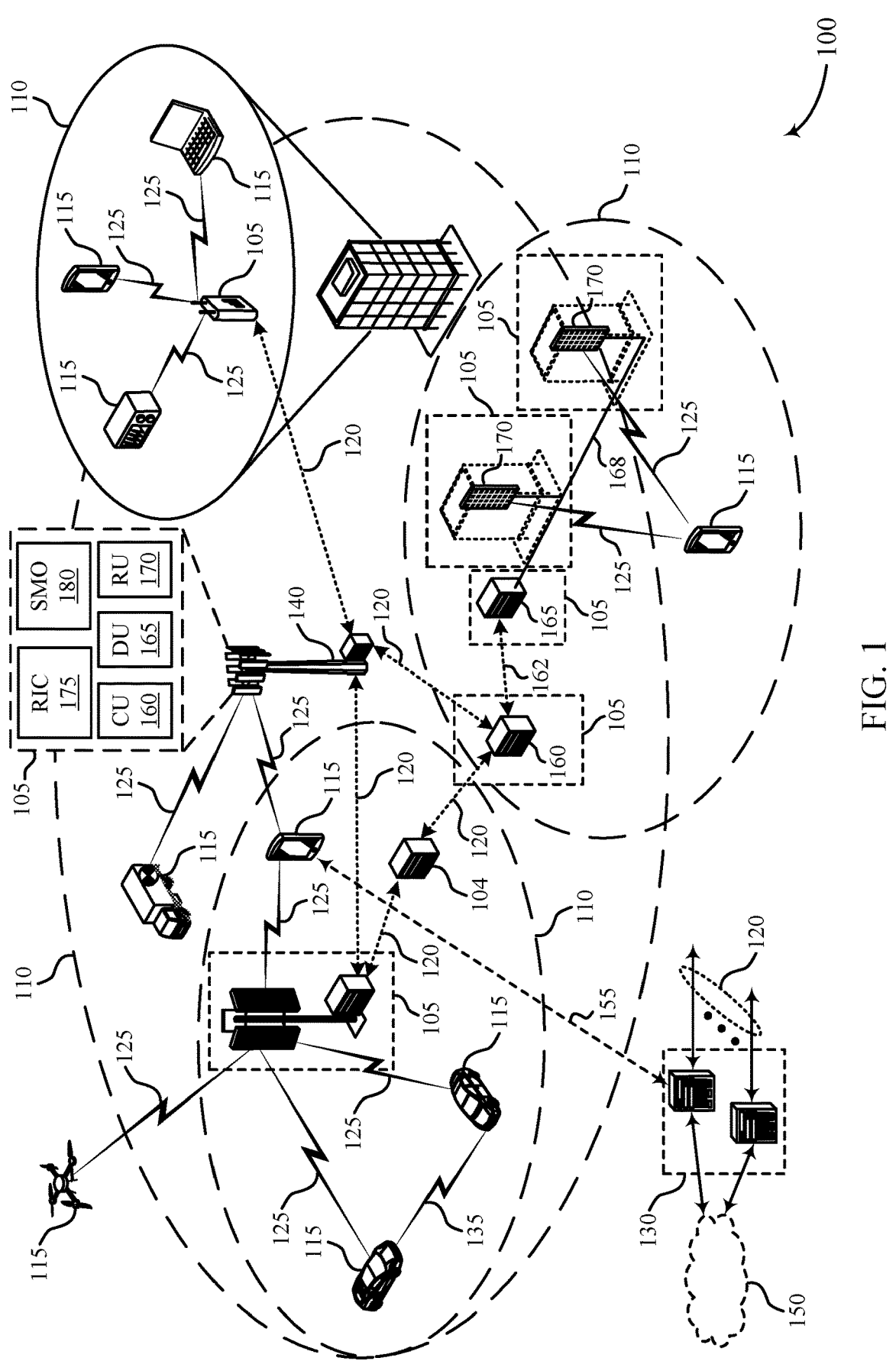
FIGS. 1 and 2 illustrate examples of wireless communications systems that support interference management for reconfigurable intelligent surfaces (RISs) in accordance with aspects of the present disclosure.

In some wireless communications systems, a reconfigurable intelligent surface (RIS) may be used to increase cell coverage and channel diversity. A RIS may be an example of a passive (e.g., low-power) device that can reflect, refract, or otherwise passively steer signals in a desired direction. In some cases, a RIS may not actively decode, encode, amplify, or otherwise process signals that are reflected by the RIS. For example, a RIS may have a configurable (e.g., controllable) index (e.g., angle) of reflection or refraction (e.g., based on configurable properties, such as electromagnetic properties or electromechanical properties). A controller of the RIS may configure (e.g., adjust) the RIS to control the direction of reflection or refraction. As a more specific example, a RIS controller may adjust various gratings on a RIS (e.g., a spacing, an orientation, or another property of the gratings) to steer incident waves in a desired direction.

Some wireless communications systems may include multiple RISs, which may be connected to or controlled by multiple base stations or a central RIS controller. For example, a first base station may use a first RIS to communicate with a first user equipment (UE), and a second base station may use a second RIS to communicate with a second UE. In some cases, however, signals reflected by the first RIS (e.g., signals reflected from the first UE to the first base station or vice versa) may assist communications between the first base station and the first UE but also interfere with or otherwise disrupt communications between the second base station and the second UE. Likewise, signals reflected by the second RIS may assist communications between the second base station and the second UE but also cause interference at the first UE or the first base station.

The techniques described herein provide for managing interference caused by RISs by performing interference measurements on RIS-centric interference measurement resources (RC-IMRs). In some examples, a UE may receive downlink reference signals from a base station on RC-IMRs, and may generate a set of RIS-centric interference measurements based on the downlink reference signals. Accordingly, the UE may transmit an indication of the RIS-centric interference measurements to the base station, and the base station may use the RIS-centric interference measurements provided by the UE to make scheduling decisions or to determine optimal RIS configuration settings (e.g., directional settings, active and inactive periods).

In other examples, a UE may transmit uplink reference signals to a base station on RC-IMRs, and the base station may generate a set of RIS-centric interference measurements based on the uplink reference signals. The base station may use the set of RIS-centric interference measurements to improve subsequent communications with the UE (e.g., by determining suitable resource allocations for the UE). In some examples, the base station may coordinate with other base stations or a central RIS controller to determine a RIS activation schedule that minimizes RIS-centric interference (e.g., interference caused by RISs). The techniques described herein may result in decreased interference and improved communication reliability, among other benefits.

Aspects of the disclosure are initially described in the context of wireless communications systems and process flows. Aspects of the disclosure are further illustrated by and described with reference to apparatus diagrams, system diagrams, and flowcharts that relate to interference management for RISs.

FIG. 1 illustrates an example of a wireless communications system 100 that supports interference management for RISs in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary or mobile at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

As described herein, a node (which may be referred to as a node, a network node, a network entity, or a wireless node) may include, be, or be included in (e.g., be a component of) a base station 140 (e.g., any base station described herein), a UE 115 (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE 115. As another example, a network node may be a base station 140 or a network entity 105. As another example, a first network node may be configured to communicate with a second network node or a third network node.

In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples. Similarly, reference to a UE 115, base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE 115 is configured to receive information from a base station also discloses that a first network node is configured to receive information from a second network node, the first network node may refer to a first UE 115, a first base station 140, a first apparatus, a first device, a first computing system, a first set of one or more one or more components, a first processing entity, or the like configured to receive the information; and the second network node may refer to a second UE 115, a second base station 140, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130 or with one another. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol). The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a DU 165, an RU 170, a RAN Intelligent Controller (RIC) 175 (e.g., a Near-Real Time RIC (Near-RT RIC), a Non-Real Time RIC (Non-RT RIC)), or a Service Management and Orchestration (SMO) 180 system. An RU 170 may also be referred to as a radio head, a smart radio head, a remote radio head (RRH), an RRU, or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node or a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for performing non-terrestrial cell measurements in a connected mode as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105 or the UEs 115) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modu-lation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme or the coding rate of the modulation scheme), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM)

techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets or phase offsets to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques or error correction techniques to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems may use RISs to provide coverage enhancements. A RIS may be an example of a low-power, passive device without a transceiver that operates like a phased array. The RIS can be used to steer an incident wave in a desired direction using a controller. A RIS may change the conditions of a communication channel between a transmitter and a receiver. For example, a RIS may provide an alternate path from the transmitter to the receiver, which may change the channel characteristics of the communication channel. As such, a RIS may be used to artificially induce a desired channel response. Specifically, a desired channel response may be attained by switching a RIS on or off, adjusting a number of RISs present in the environment, and adapting analog beamforming weights (e.g., directional settings) of the RISs. While RISs can help improve communication between two devices (e.g., end points), using RISs may sometimes result in higher interference levels. The techniques describe herein may support techniques for reducing RIS-centric interference (e.g., interference caused by RISs), which may result in higher communication reliability and increased system throughput.

Figure 2:
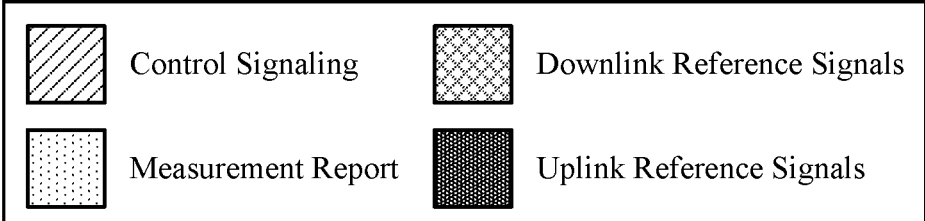
Figure 2:
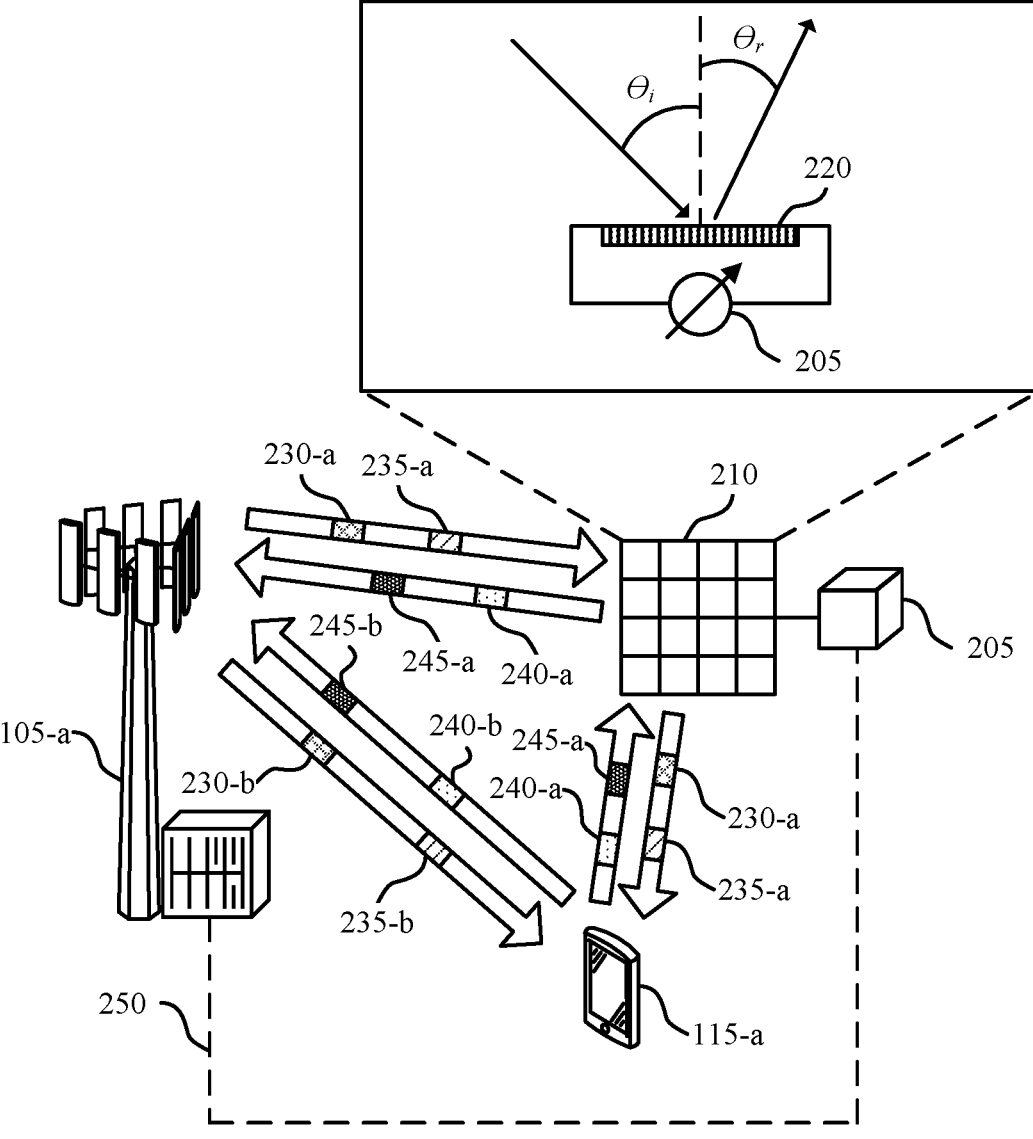
Figure 2:

FIG. 2 illustrates an example of a wireless communications system 200 that supports interference management for RISs in accordance with aspects of the present disclosure. The wireless communications system 200 may implement or be implemented by aspects of the wireless communications system 100. For example, the wireless communications system 200 may include a network entity 105-*a* and a UE 115-*a*, which may be examples of corresponding devices described with reference to FIG. 1. In the wireless communications system 200, the UE 115-*a* may communicate with the network entity 105-*a* via a RIS 210.

In some examples, the RIS 210 may be controlled by the network entity 105-*a*. For example, the network entity 105-*a* may control the RIS 210 over an interface 250. In other examples, the RIS 210 may be controlled by a central RIS controller (e.g., a RIS controller 405 described with reference to FIG. 4). The RIS 210 may be used to relay (e.g., deflect, refract, reflect) signals between the network entity 105-*a* and the UE 115-*a*. For example, a wave (e.g., an incident wave) may arrive at the RIS 210 with an incident angle (e.g., Bi), and may exit the RIS 210 (e.g., as a reflected wave) with a reflected angle (e.g., Or).

The RIS 210 may be configured with a controller 205 that can adjust or otherwise configure directional settings of the RIS 210. For example, the controller 205 may adjust gratings 220 on the RIS 210 to control the angle at which waves are reflected off the RIS 210. By adjusting the gratings 220 of the RIS 210, the controller 205 may be capable of steering waves (e.g., signals) in a specific direction. In some examples, the controller 205 may provide a low amount of power to the surface of the RIS 210 to improve the reflective properties of the RIS 210 (e.g., to increase the power or quality of signals reflected by the RIS 210). The amount of power consumed by the RIS 210 may be negligible in comparison to power amplifiers or other active relay devices.

In accordance with aspects of the present disclosure, the network entity 105-*a* may transmit control signaling 235 to the UE 115-*a*. In some examples, the network entity 105-*a* may transmit control signaling 235-*a* to the UE 115-*a* via the RIS 210. That is, the RIS 210 may relay the control signaling 235-*a* from the network entity 105-*a* to the UE 115-*a*. In other examples, the network entity 105-*a* may transmit control signaling 235-*b* to the UE 115-*a* over a direct communication link. The control signaling 235 may indicate a set of RC-IMRs (e.g., time and frequency resources) to be used for RIS interference measurements (e.g., interference measurements associated with the RIS 210). Each RC-IMR may correspond to a different configuration of the RIS 210. For example, the RIS 210 may be configured with a first set of directional settings (e.g., beamforming weights) and a first activation status (e.g., on or off) during a first RC-IMR, and may be configured with a second set of directional settings and a second activation status (e.g., on or off) during a second RC-IMR.

In some examples, the network entity 105-*a* may transmit downlink reference signals 230 to the UE 115-*a* on the set of RC-IMRs. For example, the network entity 105-*a* may transmit downlink reference signals 230-*a* to the UE 115-*a* via the RIS 210. Additionally or alternatively, the network entity 105-*a* may transmit downlink reference signals 230-*b* to the UE 115-*a* over a direct communication link. In other examples, the UE 115-*a* may transmit uplink reference signals 245 to the network entity 105-*a* on the set of RC-IMRs. For example, the UE 115-*a* may transmit uplink reference signals 245-*a* to the network entity 105-*a* via the RIS 210. Additionally or alternatively, the UE 115-*a* may transmit uplink reference signals 245-*b* to the network entity 105-*a* over a direct communication link.

If, for example, the network entity 105-*a* transmits downlink reference signals 230 to the UE 115-*a* on the RC-IMRs, the UE 115-*a* may perform a set of interference measurements based on the downlink reference signals 230. For example, the UE 115-*a* may measure a reference signal received power (RSRP) of the downlink reference signals 230. Accordingly, the UE 115-*a* may transmit measurement reports 240 to the network entity 105-*a*. The measurement reports 240 may indicate the interference measurements performed by the UE 115-*a*. In some examples, the UE 115-*a* may transmit a measurement report 240-*a* to the network entity 105-*a* via the RIS 210. In other examples, the UE 115-*a* may transmit a measurement report 240-*b* to the network entity 105-*a* over a direct communication link. Alternatively, if the UE 115-*a* transmits uplink reference signals 245 to the network entity 105-*a* on the RC-IMRs, the network entity 105-*a* may perform a set of interference measurements on the uplink reference signals 245. For example, the network entity 105-*a* may measure an RSRP of the uplink reference signals 245.

The network entity 105-*a* may determine an optimal configuration (e.g., beamforming weights, active periods, inactive periods) for the RIS 210 or a suitable allocation of resources (e.g., time and frequency resources) for communicating with the UE 115-*a* based on the measurement reports 240 from the UE 115-*a* or the interference measurements performed by the network entity 105-*a*. In some examples, the network entity 105-*a* may determine the optimal configuration for the RIS 210 or the suitable allocation of resources for the UE 115-*a* based on coordinating (e.g., negotiating) with other network entities 105 or a central RIS controller over an Xn interface. In such examples, the network entities 105 (e.g., the network entity 105-*a* and the other network entities 105) and the central RIS controller may jointly determine RIS configuration settings or resource allocations that minimize RIS-centric interference levels in the wireless communications system 200.

The wireless communications system 200 may support techniques for reduced RIS-centric interference and improved communication reliability, among other benefits. For example, the techniques described herein may enable the network entity 105-*a* to determine an optimal RIS configuration for the RIS 210 or a suitable allocation of resources for communicating with the UE 115-*a* based on performing or receiving interference measurements associated with the RIS 210. The optimal RIS configuration and the suitable allocation of resources may decrease interference caused by the RISs 210 and improve the likelihood of the network entity 105-*a* successfully communicating with the UE 115-*a* via the RIS 210.

Figures 3A, 3B:
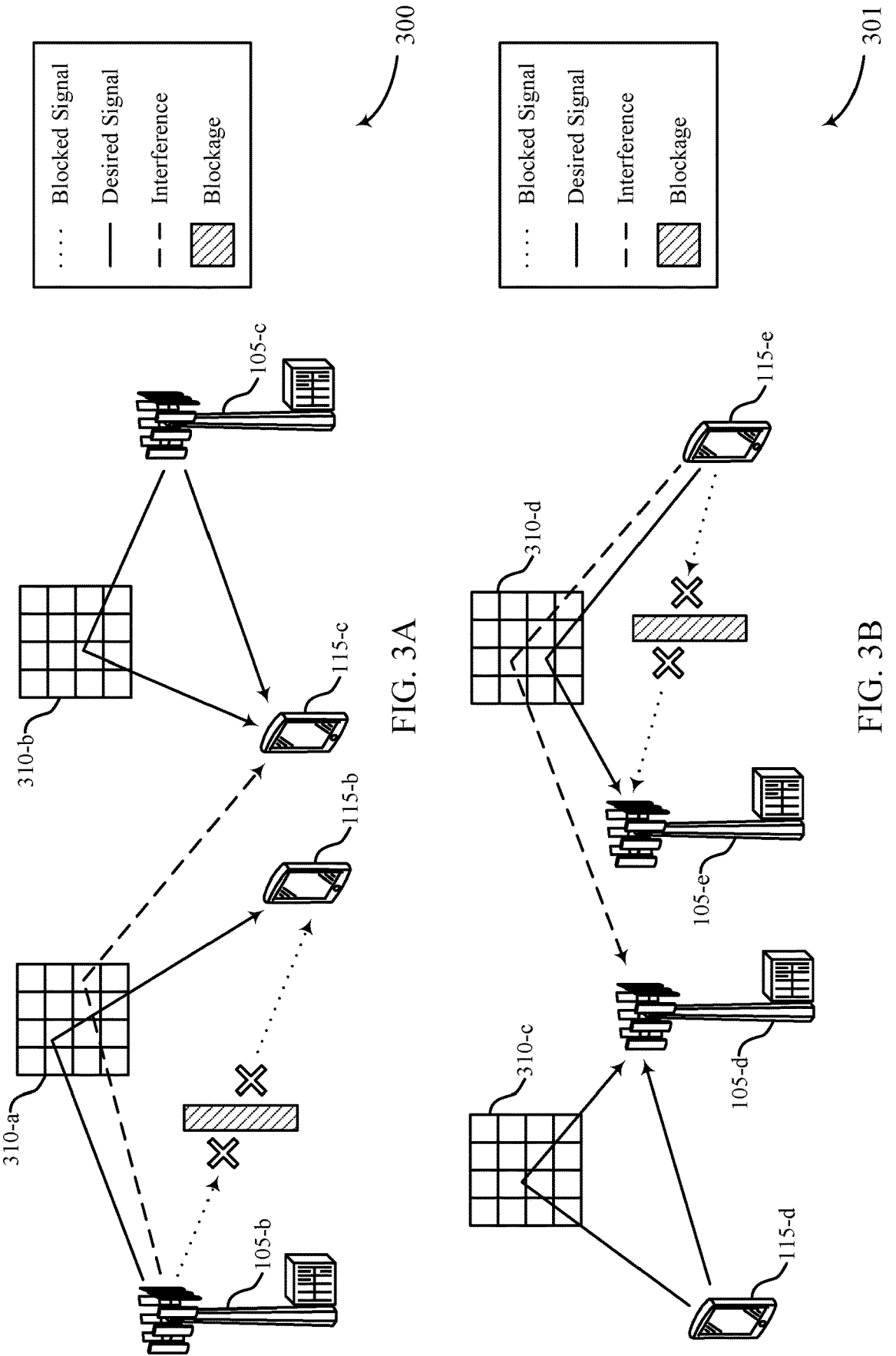
FIGS. 3A and 3B illustrate examples of wireless communications systems that support interference management for RISs in accordance with aspects of the present disclosure.

FIGS. 3A and 3B illustrate examples of a wireless communications system 300 and a wireless communications system 301 that support interference management for RISs in accordance with aspects of the present disclosure. The wireless communications system 300 and the wireless communications system 301 may implement or be implemented by aspects of the wireless communications system 100 or the wireless communications system 200. For example, the wireless communications system 300 may include a network entity 105-*b*, a network entity 105-*c*, a UE 115-*b*, and a UE 115-*c*, which may be examples of corresponding devices described with reference to FIGS. 1 and 2. Likewise, the wireless communications system 301 may include a network entity 105-*d*, a network entity 105-*e*, a UE 115-*d*, and a UE 115-*e*, which may be examples of corresponding devices described with reference to FIGS. 1 and 2. The wireless communications system 300 may also include a RIS 310-*a* and a RIS 310-*b*, which may be examples of a RIS 210 described with reference to FIG. 2. Similarly, the wireless communications system 301 may include a RIS 310-*c* and a RIS 310-*d*, which may also be examples of a RIS 210 described with reference to FIG. 2. In the wireless communications system 300 and the wireless communications system 301, the RISs 310 may be configured with an activation schedule that results in lower RIS-centric interference.

In the wireless communications system 300, the network entity 105-*b* may control the RIS 310-*a* and the UE 115-*b*. Likewise, the network entity 105-*c* may control the RIS 310-*b* and the UE 115-*c*. As illustrated in the example of FIG. 3A, a direct line-of-sight from the network entity 105-*b* to the UE 115-*b* may be obstructed by blockage (e.g., resulting in blocked signals from the network entity 105-*b*). As such, the presence of the RIS 310-*a* may enable communications between the network entity 105-*b* and the UE 115-*b*. That is, signals from the network entity 105-*b* (e.g., desired signals) may reach the UE 115-*b* via the RIS 310-*a*. However, the presence of the RIS 310-*a* may also create interference at the UE 115-*c* (e.g., transmissions from the network entity 105-*b* may interfere with the UE 115-*c*). Thus, switching on the RIS 310-*a* may improve communications between the network entity 105-*b* and the UE 115-*b* while adversely affecting communications between the network entity 105-*c* and the UE 115-*c*. In contrast, switching off the RIS 310-*a* may improve communications between the network entity 105-*c* and the UE 115-*c* while adversely affecting communications between the UE 115-*b* and the network entity 105-*b*.

In the wireless communications system 301, the network entity 105-*d* may control the RIS 310-*c* and the UE 115-*d*. Similarly, the network entity 105-*e* may control the RIS 310-*d* and the UE 115-*e*. As illustrated in the example of FIG. 3B, a direct line-of-sight from the network entity 105-*e* to the UE 115-*e* may be obstructed by blockage (e.g., resulting in blocked signals from the UE 115-*e*). As such, the presence of the RIS 310-*d* may enable communications between the UE 115-*e* and the network entity 105-*e*. That is, signals from the UE 115-*e* (e.g., desired signals) may reach the network entity 105-*e* via the RIS 310-*d*. For example, the RIS 310-*d* may reflect (e.g., deflect, refract) uplink transmissions from the UE 115-*e* to the network entity 105-*e*. However, these uplink transmissions may cause interference at the network entity 105-*d*. Thus, while the presence of the RIS 310-*d* may improve communications between the UE 115-*e* and the network entity 105-*e*, the presence of the RIS 310-*d* may also have a detrimental effect on communications between the network entity 105-*d* and the UE 115-*d*.

In accordance with aspects of the present disclosure, the network entities 105 may mitigate interference caused by the RISs 310 by performing interference measurements on RC-IMRs. For example, the UE 115-*c* may receive downlink reference signals from the network entity 105-*c* on RC-IMRs, and may generate a set of RIS-centric interference measurements based on the downlink reference signals. Accordingly, the UE 115-*c* may transmit an indication of the RIS-centric interference measurements to the network entity 105-*c*. The network entity 105-*c* may use the RIS-centric interference measurements provided by the UE 115-*c* to determine suitable resource allocations (e.g., for the UE 115-*c*) or RIS configuration settings (e.g., directional settings, active and inactive periods) for the RISs 310.

In other examples, the UE 115-*e* may transmit uplink reference signals to the network entity 105-*e* on RC-IMRs, and the network entity 105-*e* may generate a set of RIS-centric interference measurements based on the uplink reference signals from the UE 115-*e*. The network entity 105-*e* may use the set of RIS-centric interference measurements to improve subsequent communications with the UE 115-*e* (e.g., by determining suitable resource allocations for the UE 115-*e*). In some examples, the network entity 105-*e* may coordinate with the network entity 105-*d* to determine a RIS activation schedule that minimizes RIS-centric interference (e.g., interference caused by RISs 310). For example, the network entity 105-*e* may determine a suitable activation schedule for the RIS 310-*d* based on interference measurements provided by the network entity 105-*d*.

The wireless communications system 300 and the wireless communications system 301 may support techniques for reduced RIS-centric interference and improved communication reliability, among other benefits. For example, the techniques described herein may enable the network entities 105 to jointly determine an optimal RIS configuration for the RISs 310 or a suitable allocation of resources for communicating with the UEs 115 based on exchanging (e.g., communicating) interference measurements associated with the RISs 310. The optimal RIS configuration and the suitable allocation of resources may decrease interference caused by the RISs 310 and improve the likelihood of the network entities 105 successfully communicating with the UEs 115 via the RISs 310.

Figure 4:
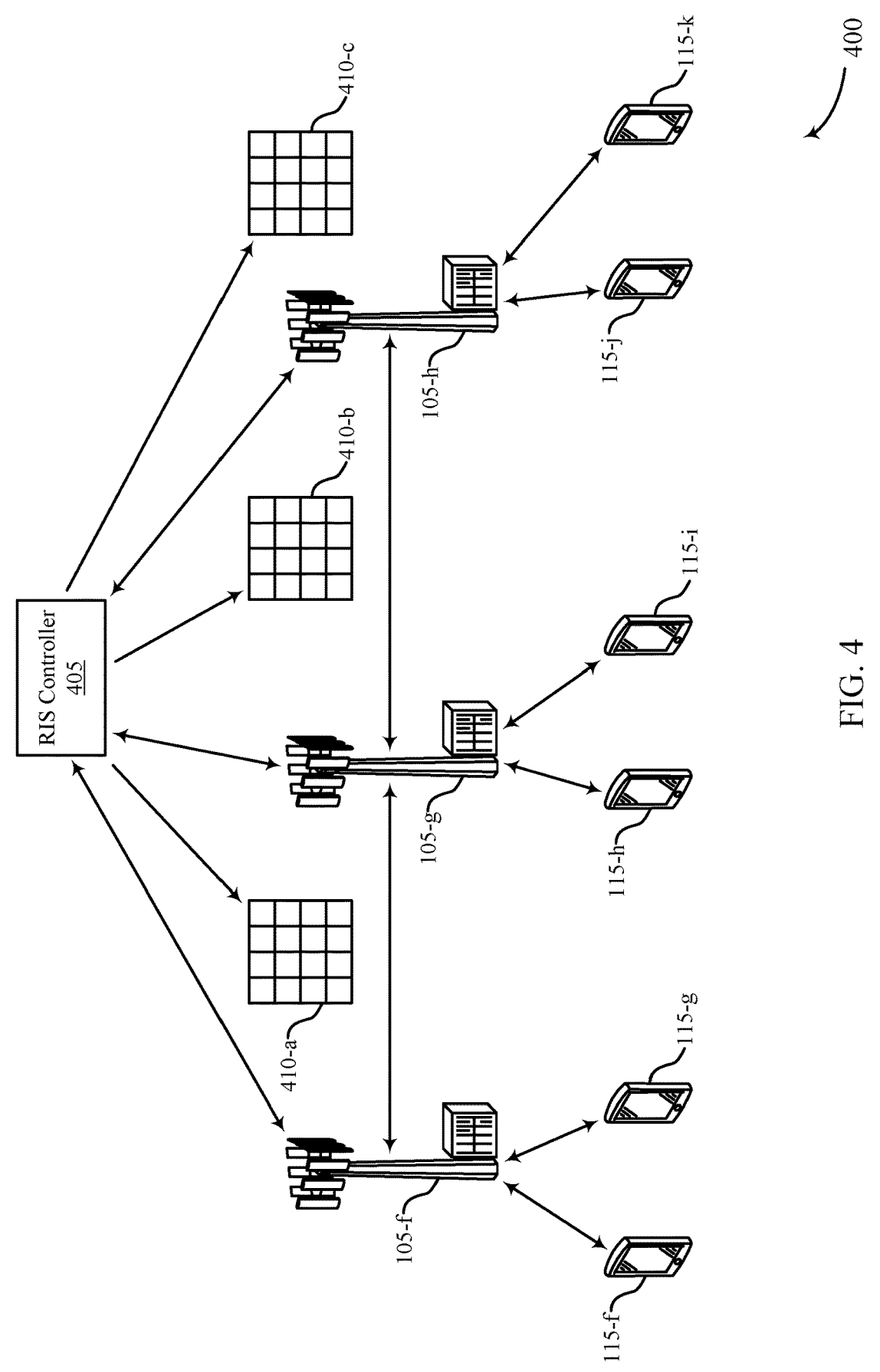
FIG. 4 illustrates an example of a wireless communications system that supports interference management for RISs in accordance with aspects of the present disclosure.

FIG. 4 illustrates an example of a wireless communications system 400 that supports interference management for RISs in accordance with aspects of the present disclosure. The wireless communications system 400 may implement or be implemented by aspects of the wireless communications system 100, the wireless communications system 200, the wireless communications system 300, or the wireless communications system 301. For example, the wireless communications system 400 may include a network entity 105-*f*, a network entity 105-*g*, a network entity 105-*h*, a UE 115-*f*, a UE 115-*g*, a UE 115-*h*, a UE 115-*i*, a UE 115-*j*, and a UE 115-*k*, which may be examples of corresponding devices described with reference to FIGS. 1 through 3. The wireless communications system 400 may also include a RIS 410-*a*, a RIS 410-*b*, and a RIS 410-*c*, which may be examples of a RIS 210 or a RIS 310 described with reference to FIGS. 2 and 3. In the wireless communications system 400, the network entities 105 may coordinate with a RIS controller 405 to determine an optimal activation schedule for the RISs 410.

The wireless communications system 400 may support techniques for configuring RC-IMRs among the network entities 105 with a RIS controller 405. As illustrated in the example of FIG. 4, there may be RISs 410 that impact the network entities 105. The UEs 115 (e.g., users of the network entities 105), the network entities 105, and the RIS controller 405 may cooperatively determine the impact of interference due to RIS on different users in one or more cells of the network entities 105. As described herein, one or more of the network entities 105 may initiate a session with the RIS controller 405 to perform a joint resource allocation for interference measurement management among all of the network entities 105. The network entities 105 may be provided with RIS-enabled or RIS-disabled measurement resource occasions by the RIS controller 405. Accordingly, the network entities 105 may transmit an indication of these resource occasions to the UEs 115.

In some examples, the RIS controller 405 may initiate a session with one or more of the network entities 105 at times when a particular RIS is enabled or disabled. Specifically, the RIS controller 405 may provide a combination of different on and off times for the RISs 410. For example, at a first time (e.g., t₁), the RIS 410-*a* may be off, the RIS 410-*b* may be off, and the RIS 410-*c* may be off (e.g., t₁: (off, off, off)). At a second time (e.g., t₂), the RIS 410-*a* may be off, the RIS 410-*b* may be off, and the RIS 410-*c* may be on (e.g., t₂: (off, off, on)). At a third time (e.g., t₃), the RIS 410-*a* may be off, the RIS 410-*b* may be on, and the RIS 410-*c* may be on (e.g., t₃: (off, on, on)). Additionally or alternatively, network entities 105 may negotiate (e.g., over an Xn interface) to determine appropriate time-frequency resources (e.g., RC-IMRs) for different measurement occasions (e.g., t₁) based on information provided by the RIS controller 405.

The wireless communications system 400 may support UE measurement reporting during RIS-enabled or RIS-disabled downlink transmissions. The network entities 105 may configure the UEs 115 (e.g., users serviced by the network entities 105) with suitable RC-IMRs. As described herein, an RC-IMR may denote one or more time-frequency resources corresponding to a RIS activation pattern (e.g., a combination of active and inactive RISs), and different RC-IMRs within a set of RC-IMRs may correspond to different RIS activation patterns. The UEs 115 may measure the received power (e.g., RSRP) of downlink reference signals from the network entities 105 on these resources. In some examples, the RC-IMRs may be applicable to all users of a specific cell. In other examples, the RC-IMRs may be applicable to UEs 115 that have reported a high received signal strength indicator (RSSI). In other examples, the RC-IMRs may be applicable to one or more geographical zones of the network entities 105.

Each of the network entities 105 may transmit unique downlink reference signals to the UEs 115, and each of the UEs 115 may measure the received power (e.g., RSRP) of these downlink reference signals in each of the configured RC-IMRs. Accordingly, the UEs 115 may report measurements performed on the RC-IMRs to the network entities 105. For example, the UE 115-*g* may report measurements performed on RC-IMRs to the network entity 105-*f*, the UE 115-*h* may report measurements performed on RC-IMRs to the network entity 105-*g*, and the UE 115-*k* may report measurements performed on RC-IMRs to the network entity 105-*h*. After obtaining interference and signal quality reports from the UEs 115, the network entities 105 may negotiate (e.g., determine) directional settings for each of the RISs 410, activation schedules (e.g., whether to enable or disable each of the RISs 410) in each slot, and suitable resource allocations for the UEs 115.

The wireless communications system 400 may also support techniques for UE measurement reporting during RIS enabled or disabled uplink transmissions. For uplink measurements, the network entities 105 may configure the UEs 115 to transmit orthogonal uplink reference signals on RC-IMRs. Accordingly, the UEs 115 may transmit the orthogonal uplink reference signals during the assigned RC-IMRs, and the network entities 105 may measure the RSRP of orthogonal uplink reference signal transmissions from the UEs 115 to determine the impact of the RISs 410. Upon measuring the RSRP of these uplink reference signals, the network entities 105 may determine suitable resource allocations for the UEs 115 and configuration settings for the RISs 410.

In some examples, the network entities 105 may determine suitable resource allocations for the UEs 115 based on the activation schedule of the RISs 410 (e.g., to service different sets of UEs 115 at different times). For example, if UEs 115 in a first zone have been reporting high interference levels from the RIS 410-*a*, the network entity 105-*f* may service these UEs 115 (e.g., users) at a time when the RIS 410-*a* is deactivated. This may enable the network entity 105-*f* to service the UEs 115 in the first zone without interference from the RIS 410-*a*. Similarly, if UEs 115 in a third zone have been reporting high interference levels from the RIS 410-*b*, the network entity 105-*g* may service these UEs 115 at a time when the RIS 410-*b* is inactive. Thus, the network entity 105-*g* may service the UEs 115 in the third zone without interference from the RIS 410-*b*. In some examples, the network entities 105 may agree on an optimal RIS activation schedule based on signal to interference and noise ratio (SINR) measurements from the UEs 115. Accordingly, the network entities 105 may transmit an indication of this optimal RIS activation schedule to the RIS controller 405. Additionally or alternatively, the network entities 105 may request that the RIS controller 405 alter the directional settings (e.g., 0) of the RISs 410 to enhance the received signal quality of communications between the network entities 105 and the UEs 115.

The wireless communications system 400 may support techniques for reduced RIS-centric interference and improved communication reliability, among other benefits. For example, the techniques described herein may enable the network entities 105 and the RIS controller 405 to jointly determine an optimal RIS configuration or a suitable allocation of resources for communicating with the UEs 115 based on exchanging (e.g., communicating) interference measurements associated with the RISs 410. The optimal RIS configuration and the suitable allocation of resources may decrease RIS-centric interference (e.g., interference caused by the RISs 410) and improve the likelihood of the network entities 105 successfully communicating with the UEs 115 via the RISs 410.

Figure 5:
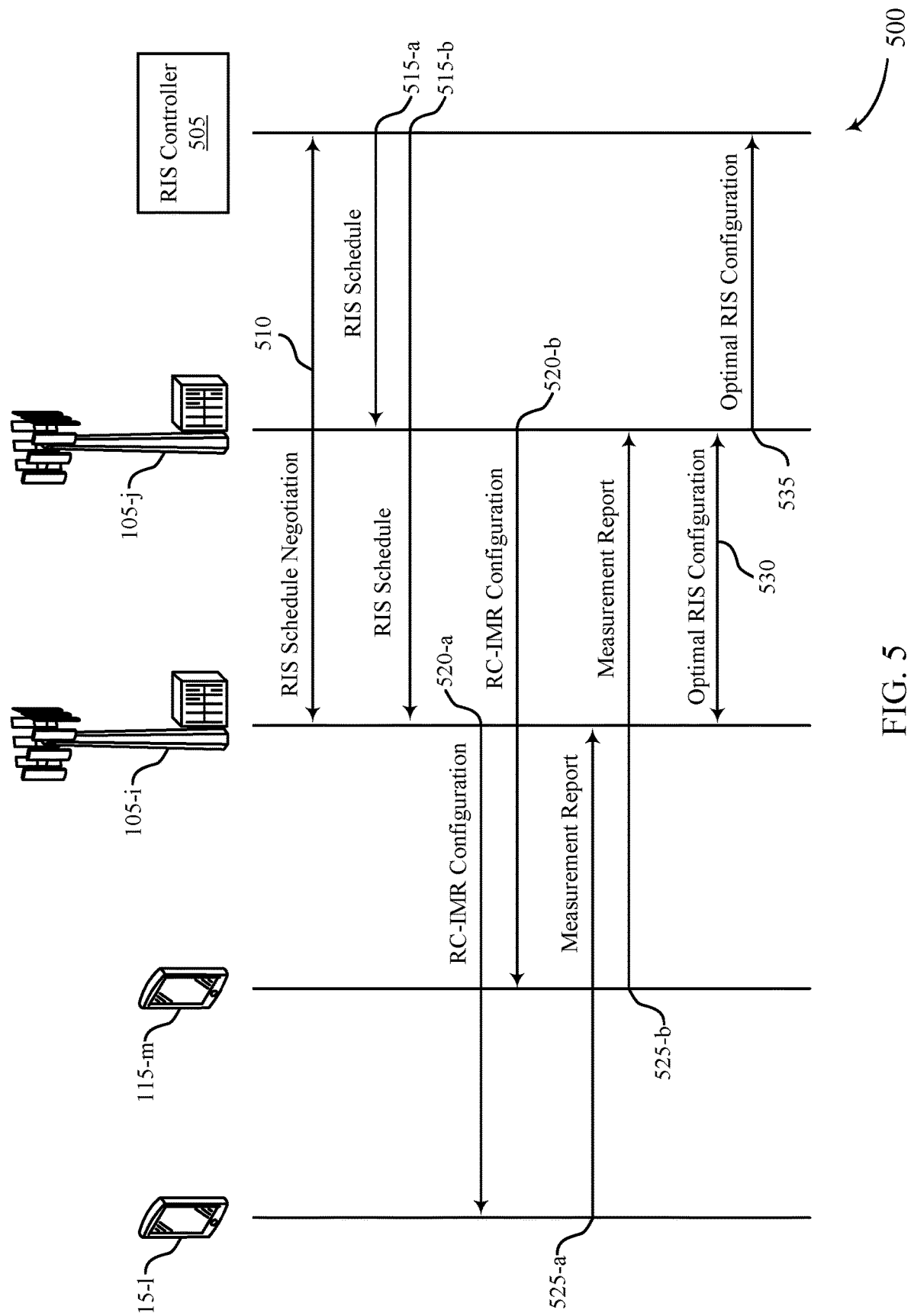
FIGS. 5 and 6 illustrate examples of process flows that support interference management for RISs in accordance with aspects of the present disclosure.

FIG. 5 illustrates an example of a process flow 500 that supports interference management for RISs in accordance with aspects of the present disclosure. The process flow 500 may implement or be implemented by aspects of the wireless communications system 100, the wireless communications system 200, the wireless communications system 300, the wireless communications system 301, or the wireless communications system 400. For example, the process flow 500 may include a network entity 105-*i*, a network entity 105-*j*, a UE 115-*l*, and a UE 115-*m*, which may be examples of corresponding devices described with reference to FIGS. 1 through 4. The process flow 500 may also include a RIS controller 505, which may be an example of a RIS controller 405 described with reference to FIGS. 2 and 4. In the following description of the process flow 500, operations between the network entities 105, the UEs 115, and the RIS controller 505 may be performed in a different order or at a different time than as shown. Additionally or alternatively, some operations may be omitted from the process flow 500, and other operations may be added to the process flow 500.

At 510, the network entities 105 may perform a RIS schedule negotiation procedure with the RIS controller 505. During the RIS schedule negotiation procedure, the network entities 105 may exchange control messages with the RIS controller 505. For example, the network entity 105-*i* may transmit a control message to the RIS controller 505 indicating a request for the RIS controller 505 to configure one or more RISs with a first set of directional settings, a first set of inactive periods, or a first set of active periods. Similarly, the network entity 105-*j* may transmit a control message to the RIS controller 505 indicating a request for the RIS controller 505 to configure the one or more RISs with a second set of directional settings, a second set of inactive periods, or a second set of active periods.

The RIS controller 505 may determine a first activation schedule (e.g., an initial set of directional settings, inactive periods, and active periods) for the one or more RISs based on performing the RIS schedule negotiation procedure with the network entities 105. Accordingly, the RIS controller 505 may configure the one or more RISs with the first activation schedule. At 515-*a*, the RIS controller 505 may transmit an indication of the first activation schedule to the network entity 105-*j*. Likewise, the RIS controller 505 may transmit an indication of the first activation schedule to the network entity 105-*i* at 515-*b*.

At 520-*a*, the network entity 105-*i* may determine a first RC-IMR configuration (e.g., time and frequency resource locations) for the UE 115-*l* based on the first activation schedule, and may transmit an indication of the first RC-IMR configuration to the UE 115-*l*. At 520-*b*, the network entity 105-*j* may determine a second RC-IMR configuration for the UE 115-*m* based on the first activation schedule, and may transmit an indication of the second RC-IMR configuration to the UE 115-*m*. Accordingly, the network entities 105 may transmit downlink reference signals to the UEs 115 on RC-IMRs. For example, the network entity 105-*i* may transmit downlink reference signals to the UE 115-*l* on a set of RC-IMRs associated with the first RC-IMR configuration, and the network entity 105-*j* may transmit downlink reference signals to the UE 115-*m* on a set of RC-IMRs associated with the second RC-IMR configuration.

The UEs 115 may perform interference measurements associated with the one or more RISs based on receiving the downlink reference signals from the network entities 105. Specifically, the UE 115-*l* may perform a first set of interference measurements associated with the one or more RISs based on receiving downlink reference signals from the network entity 105-*i* on the set of RC-IMRs associated with the first RC-IMR configuration. Likewise, the UE 115-*m* may perform a second set of interference measurements associated with the one or more RISs based on receiving downlink reference signals from the network entity 105-*j* on the set of RC-IMRs associated with the second RC-IMR configuration. At 525-*a*, the UE 115-*l* may generate a first measurement report based on the first set of interference measurements, and may transmit the first measurement report to the network entity 105-*i*. At 525-*b*, the UE 115-*m* may generate a second measurement report based on the second set of interference measurements, and may transmit the second measurement report to the network entity 105-*j*.

At 530, the network entities 105 may determine a second activation schedule (e.g., an optimal set of directional settings, active periods, and inactive periods) for the one or more RISs based on the first and second measurement reports. In some examples, the network entity 105-*i* may transmit a control message to the network entity 105-*j* indicating the first set of interference measurements performed by the UE 115-*l*. Similarly, the network entity 105-*j* may transmit a control message to the network entity 105-*i* indicating the second set of interference measurements performed by the UE 115-*m*. The network entities 105 may determine the second activation schedule based on exchanging these control messages. Additionally or alternatively, the network entities 105 may determine suitable resource allocations for communicating with the UEs 115 based on the first and second measurement reports.

At 535, the network entities 105 may transmit an indication of the second activation schedule to the RIS controller 505. Accordingly, the RIS controller 505 may reconfigure the one or more RISs based on the second activation schedule. In some examples, the RIS controller 505 may transmit a control message to the network entities 105 indicating an updated configuration (e.g., directional settings, inactive periods, active periods) of the one or more RISs. The network entities 105 may schedule communications with the UEs 115 based on the updated configuration of the one or more RISs.

The process flow 500 may support techniques for reduced RIS-centric interference and improved communication reliability, among other benefits. For example, the techniques described herein may enable the network entities 105 and the RIS controller 505 to jointly determine an optimal RIS configuration or a suitable allocation of resources for communicating with the UEs 115 based on exchanging (e.g., communicating) interference measurements associated with one or more RISs. The optimal RIS configuration and the suitable allocation of resources may decrease RIS-centric interference (e.g., interference caused by the one or more RISs) and improve the likelihood of the network entities 105 successfully communicating with the UEs 115 via the one or more RISs.

Figure 6:
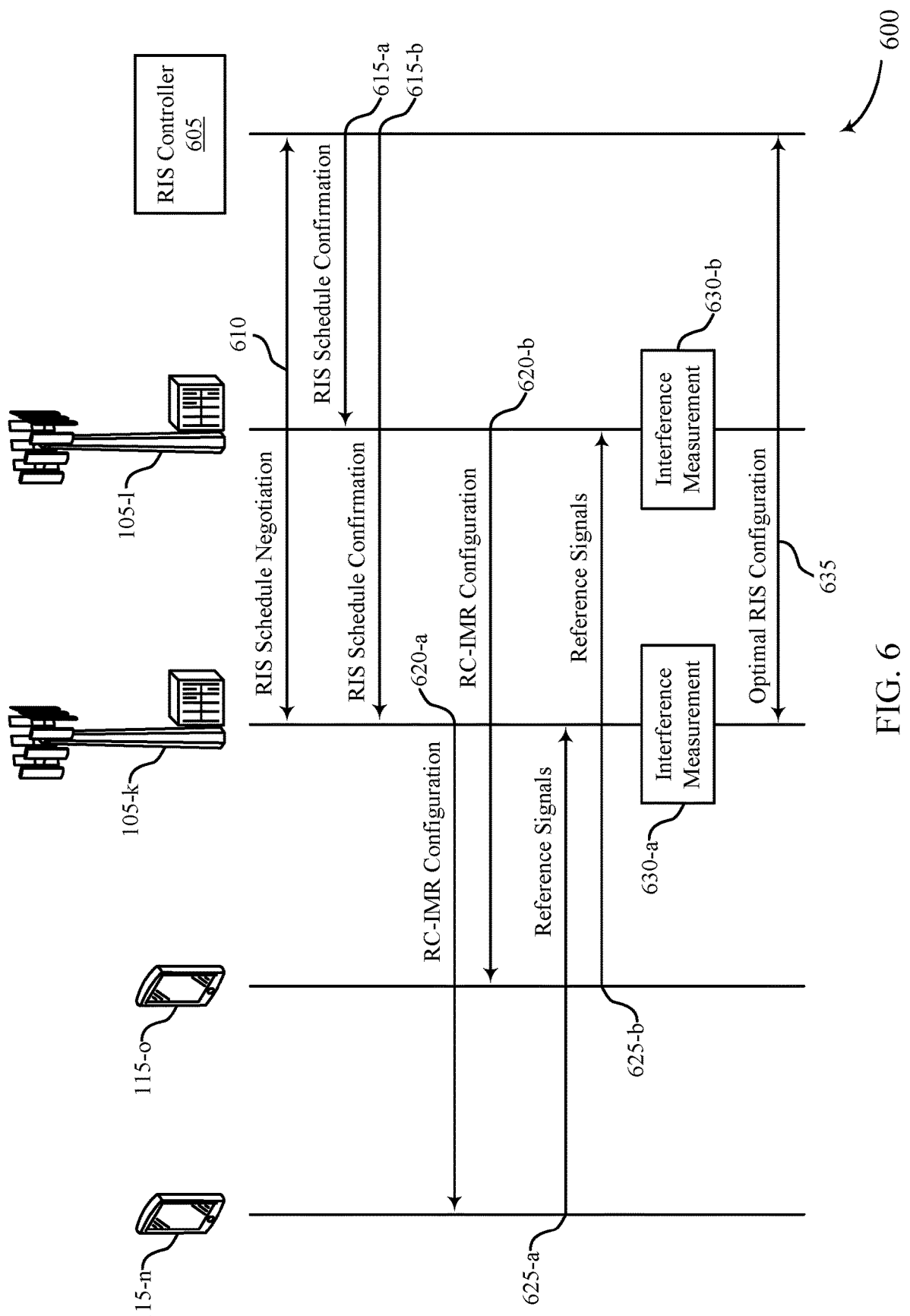

FIG. 6 illustrates an example of a process flow 600 that supports interference management for RISs in accordance with aspects of the present disclosure. The process flow 600 may implement or be implemented by aspects of the wireless communications system 100, the wireless communications system 200, the wireless communications system 300, the wireless communications system 301, the wireless communications system 400, or the process flow 500. For example, the process flow 600 may include a network entity 105-*k*, a network entity 105-*l*, a UE 115-*n*, and a UE 115-*o*, which may be examples of corresponding devices described with reference to FIGS. 1 through 5. The process flow 600 may also include a RIS controller 605, which may be an example of a RIS controller 405 or a RIS controller 505 described with reference to FIGS. 2 through 5. In the following description of the process flow 600, operations between the network entities 105, the UEs 115, and the RIS controller 605 may be performed in a different order or at a different time than as shown. Additionally or alternatively, some operations may be omitted from the process flow 600, and other operations may be added to the process flow 600.

At 610, the network entities 105 may perform a RIS schedule negotiation procedure with the RIS controller 605. During the RIS schedule negotiation procedure, the network entities 105 may exchange control messages with the RIS controller 605. For example, the network entity 105-*k* may transmit a control message to the RIS controller 605 indicating a request for the RIS controller 605 to configure one or more RISs with a first set of directional settings, a first set of inactive periods, or a first set of active periods. Similarly, the network entity 105-*l* may transmit a control message to the RIS controller 605 indicating a request for the RIS controller 605 to configure the one or more RISs with a second set of directional settings, a second set of inactive periods, or a second set of active periods.

The RIS controller 605 may determine a first activation schedule (e.g., an initial set of directional settings, inactive periods, and active periods) for the one or more RISs based on performing the RIS schedule negotiation procedure with the network entities 105. Accordingly, the RIS controller 605 may configure the one or more RISs with the first activation schedule. At 615-*a*, the RIS controller 605 may transmit an indication of the first activation schedule to the network entity 105-*l*. Likewise, the RIS controller 605 may transmit an indication of the first activation schedule to the network entity 105-*k* at 615-*b*.

At 620-*a*, the network entity 105-*k* may determine a first RC-IMR configuration (e.g., time and frequency resource locations) for the UE 115-*o* based on the first activation schedule, and may transmit an indication of the first RC-IMR configuration to the UE 115-*o*. At 620-*b*, the network entity 105-*l* may determine a second RC-IMR configuration for the UE 115-*n* based on the first activation schedule, and may transmit an indication of the second RC-IMR configuration to the UE 115-*n*. Accordingly, the network entities 105 may receive uplink reference signals from the UEs 115.

At 625-*a*, the network entity 105-*k* may receive uplink reference signals from the UE 115-*n* on a set of RC-IMRs associated with the first RC-IMR configuration. At 625-*b*, the network entity 105-*l* may receive uplink reference signals from the UE 115-*o* on a set of RC-IMRs associated with the second RC-IMR configuration. In some examples, the uplink reference signals from the UE 115-*n* and the uplink reference signals from the UE 115-*o* may be associated with different orthogonal cover codes.

At 630, the network entities 105 may perform interference measurements associated with the one or more RISs based on receiving the uplink reference signals from the UEs 115. At 630-*a*, the network entity 105-*k* may perform a first set of interference measurements associated with the one or more RISs based on receiving uplink reference signals from the UE 115-*n* on the set of RC-IMRs associated with the first RC-IMR configuration. At 630-*b*, the network entity 105-*l* may perform a second set of interference measurements associated with the one or more RISs based on receiving uplink reference signals from the UE 115-*o* on the set of RC-IMRs associated with the second RC-IMR configuration.

At 635, the network entities 105 may jointly determine a second activation schedule (e.g., an optimal set of directional settings, active periods, and inactive periods) for the one or more RISs based on the first and second set of interference measurements. In some examples, the network entity 105-*k* may transmit a control message to the network entity 105-*l* indicating the first set of interference measurements performed by the network entity 105-*k*. Similarly, the network entity 105-*l* may transmit a control message to the network entity 105-*k* indicating the second set of interference measurements performed by the network entity 105-*l*. The network entities 105 may determine the second activation schedule based on exchanging these control messages. Additionally or alternatively, the network entities 105 may determine suitable resource allocations for communicating with the UEs 115 based on the first and second set so interference measurements.

In some examples, the network entities 105 may transmit an indication of the second activation schedule to the RIS controller 605. Accordingly, the RIS controller 605 may reconfigure the one or more RISs based on the second activation schedule. In some examples, the RIS controller 605 may transmit a control message to the network entities 105 indicating an updated activation schedule (e.g., directional settings, inactive periods, active periods) for the one or more RISs. The updated activation schedule may be the same or different from the second activation schedule determined by the network entities 105. The network entities 105 may schedule communications with the UEs 115 based on the updated configuration of the one or more RISs.

The process flow 600 may support techniques for reduced RIS-centric interference and improved communication reliability, among other benefits. For example, the techniques described herein may enable the network entities 105 and the RIS controller 605 to jointly determine an optimal RIS configuration or a suitable allocation of resources for communicating with the UEs 115 based on exchanging (e.g., communicating) interference measurements associated with one or more RISs. The optimal RIS configuration and the suitable allocation of resources may decrease RIS-centric interference (e.g., interference caused by the one or more RISs) and improve the likelihood of the network entities 105 successfully communicating with the UEs 115 via the one or more RISs.

Figure 7:
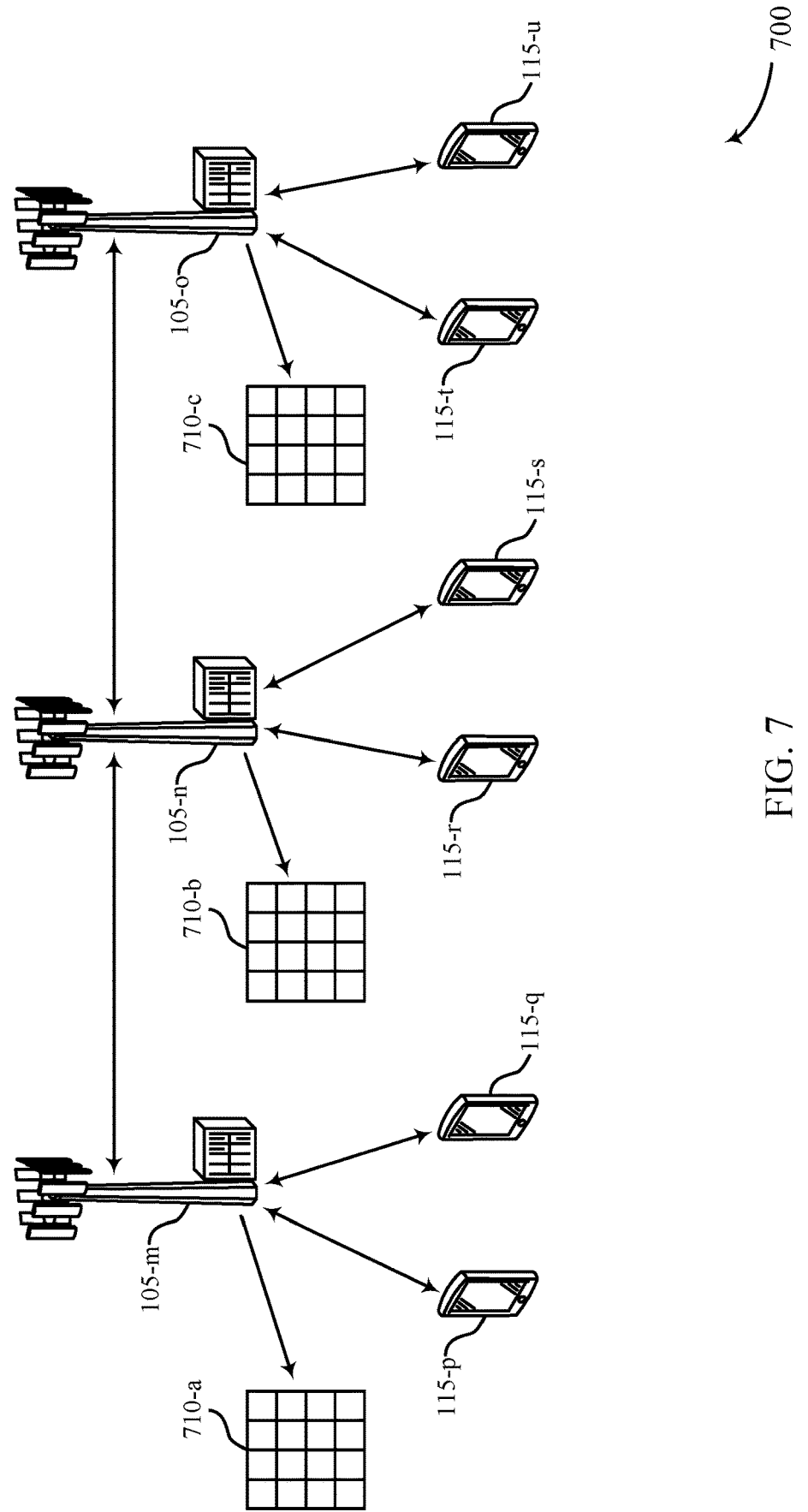
FIG. 7 illustrates an example of a wireless communications system that supports interference management for RISs in accordance with aspects of the present disclosure.

FIG. 7 illustrates an example of a wireless communications system 700 that supports interference management for RISs in accordance with aspects of the present disclosure. The wireless communications system 700 may implement or be implemented by aspects of the wireless communications system 100, the wireless communications system 200, the wireless communications system 300, the wireless communications system 301, the wireless communications system 400, the process flow 500, or the process flow 600. For example, the wireless communications system 700 may include a network entity 105-*m*, a network entity 105-*n*, a network entity 105-*o*, a UE 115-*p*, a UE 115-*q*, a UE 115-*r*, a UE 115-*s*, a UE 115-*t*, and a UE 115-*u*, which may be examples of corresponding devices described with reference to FIGS. 1 through 6. The wireless communications system 700 may also include a RIS 710-*a*, a RIS 710-*b*, and a RIS 710-*c*, which may be examples of a RIS 210, a RIS 310, or a RIS 410 described with reference to FIGS. 2 through 4. In the wireless communications system 700, the network entities 105 may communicate over one or more backhaul connections (e.g., Xn interfaces) to determine an optimal activation schedule for the RISs 710.

In the wireless communications system 700, the RISs 710 may be controlled by the network entities 105 (e.g., rather than a central RIS controller). Each of the network entities 105 may manage one or more of the RISs 710 with independent RIS activation schedules (e.g., on/off times). For example, the network entity 105-*m* may control the RIS 710-*a*, the network entity 105-*n* may control the RIS 710-*b*, and the network entity 105-*o* may control the RIS 710-*c*. In accordance with aspects of the present disclosure, the network entities 105 may negotiate (e.g., over an X2 interface) to determine suitable RIS parameters (e.g., RIS beamforming weights, on/off times) for the RISs 710. The network entities 105 may also jointly configure RC-IMRs for the UEs 115 serviced by the network entities 105 (e.g., such that the UEs 115 can measure interference from the RISs 710).

In some examples, the network entities 105 may exchange RIS configuration parameters (e.g., RIS beamforming weights, RIS on/off periods), and may determine a suitable RIS configuration (e.g., activation schedule) for each of the RISs 710 based on exchanging these RIS configuration parameters. The network entities 105 may also jointly determine RC-IMRs based on the determined RIS configuration for each of the RISs 710. In some examples, these RC-IMRs may correspond to different combinations of RIS beamforming weights and activation patterns of the RISs 710. The network entities 105 may configure the RISs 710 with different beamforming weights and activation patterns in specific time-frequency resources such that the UEs 115 can perform interference measurements for different RIS configurations. For each time-frequency resource in the set of RC-IMRs, the UEs 115 may perform interference measurements associated with the RISs 710.

The UEs 115 may generate interference measurement information based on performing measurements of downlink reference signals associated with the network entities 105. Likewise, the UEs 115 may generate interference measurement information based on performing measurements of uplink reference signals associated with the UEs 115. As described herein, reference signals associated with a network node may refer to reference signals that are transmitted by (e.g., originate at) the network node, and such reference signals may be received by one or more other network nodes directly from the network node or indirectly via one or more RISs (e.g., one or more RISs 710). Reference signals received indirectly via a RIS may, for example, be reflected or refracted by the RIS.

In some examples, the UEs 115 may report the interference measurement information to the network entities 105. The UEs 115 may perform one or more measurements to generate the reported interference measurement information. The interference measurement information reported by a UE 115 may be information that is measured by the UE 115 (e.g., the UE 115 may perform a measurement to measure an RSRP value and report the measured RSRP value). Additionally or alternatively, the interference measurement information reported by a UE 115 may be derived from information that is measured by the UE 115 (e.g., the UE 115 may report an SNR value, which the UE 115 may derive from one or more measured values).

The wireless communications system 700 may support techniques for reduced RIS-centric interference and improved communication reliability, among other benefits. For example, the techniques described herein may enable the network entities 105 to jointly determine an optimal RIS configuration for the RISs 710 or a suitable allocation of resources for communicating with the UEs 115 based on exchanging (e.g., communicating) interference measurements associated with the RISs 710. The optimal RIS configuration and the suitable allocation of resources may decrease interference caused by the RISs 710 and improve the likelihood of the network entities 105 successfully communicating with the UEs 115 via the RISs 710.

Figure 8:
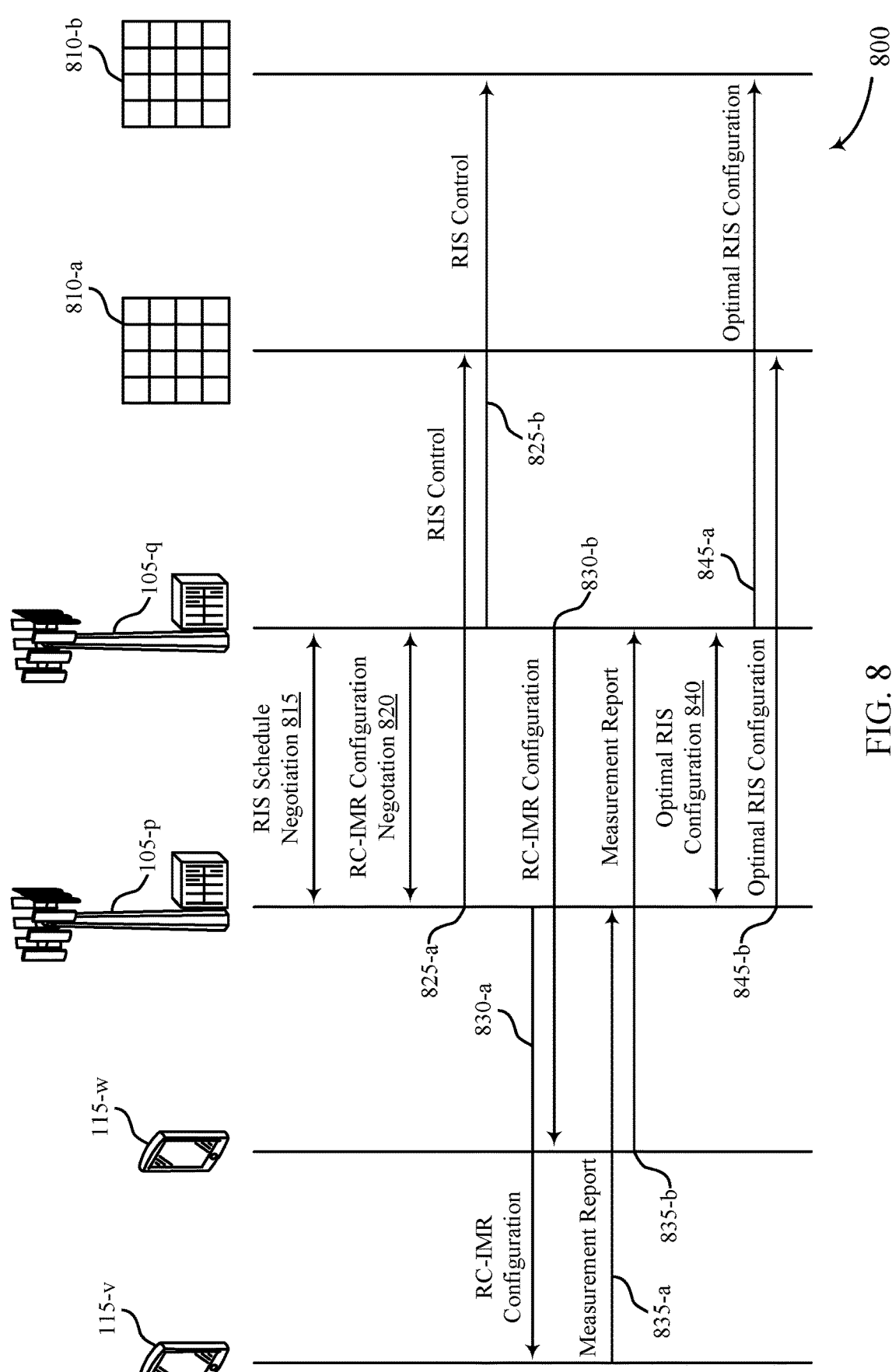
FIGS. 8 and 9 illustrate examples of process flows that support interference management for RISs in accordance with aspects of the present disclosure.

FIG. 8 illustrates an example of a process flow 800 that supports interference management for RISs in accordance with aspects of the present disclosure. The process flow 800 may implement or be implemented by aspects of the wireless communications system 100, the wireless communications system 200, the wireless communications system 300, the wireless communications system 301, the wireless communications system 400, the process flow 500, the process flow 600, or the wireless communications system 700. For example, the process flow 800 may include a network entity 105-*p*, a network entity 105-*q*, a UE 115-*v*, and a UE 115-*w*, which may be examples of corresponding devices described with reference to FIGS. 1 through 7. The process flow 800 may also include a RIS 810-*a* and a RIS 810-*b*, which may be examples of a RIS 210, a RIS 310, a RIS 410, or a RIS 710 described with reference to FIGS. 2 through 7. In the following description of the process flow 800, operations between the network entities 105, the UEs 115, and the RISs 810 may be performed in a different order or at a different time than as shown. Additionally or alternatively, some operations may be omitted from the process flow 800, and other operations may be added to the process flow 800.

At 815, the network entity 105-*p* may perform a RIS schedule negotiation procedure with the network entity 105-*q*. For example, the network entity 105-*p* may transmit a control message to the network entity 105-*q* indicating a first set of directional settings for the RISs 810, a first set of active periods for the RISs 810, or a first set of inactive periods for the RISs 810. Similarly, the network entity 105-*q* may transmit a control message to the network entity 105-*p* indicating a second set of directional settings for the RISs 810, a second set of active periods for the RISs 810, or a second set of inactive periods for the RISs 810. The network entities 105 may determine a first activation schedule (e.g., an initial activation schedule) for the RISs 810 based on these control messages.

At 820, the network entity 105-*p* may perform an RC-IMR configuration negotiation procedure with the network entity 105-*q*. In some examples, the network entities 105 may perform the RC-IMR configuration negotiation procedure over a backhaul connection (e.g., an Xn interface). During the RC-IMR configuration negotiation procedure, the network entity 105-*p* may transmit a control message to the network entity 105-*q* indicating a first set of potential RC-IMRs. Likewise, the network entity 105-*q* may transmit a control message to the network entity 105-*p* indicating a second potential set of RC-IMRs. The network entities 105 may jointly determine an RC-IMR configuration (e.g., a final set of RC-IMRs) based on exchanging these control messages.

At 825, the network entities 105 may transmit RIS control messages to the RISs 810 based on determining the RC-IMR configuration and the first activation schedule. For example, the network entity 105-*p* may transmit a first RIS control message to the RIS 810-*a* at 825-*a*. The first RIS control message may indicate a set of directional settings for the RIS 810-*a*, a set of active periods for the RIS 810-*a*, or a set of inactive periods for the RIS 810-*a*. Likewise, the network entity 105-*q* may transmit a second RIS control message to the RIS 810-*b* at 825-*b*. The second RIS control message may indicate a set of directional settings for the RIS 810-*b*, a set of active periods for the RIS 810-*b*, or a set of inactive periods for the RIS 810-*b*.

At 830-*a*, the network entity 105-*p* may transmit an indication of the RC-IMR configuration (e.g., locations of RC-IMRs) to the UE 115-*v*. At 830-*b*, the network entity 105-*q* may transmit an indication of the RC-IMR configuration to the UE 115-*w*. Accordingly, the network entities 105 may transmit one or more downlink reference signals to the UEs 115 on RC-IMRs associated with the RC-IMR configuration. For example, the network entity 105-*p* may transmit one or more downlink reference signals to the UE 115-*v* on a first set of RC-IMRs, and the network entity 105-*q* may transmit one or more downlink reference signals to the UE 115-*w* on a second set of RC-IMRs. In some examples, each RC-IMR may correspond to a respective combination of active RISs and inactive RISs.

The UEs 115 may perform interference measurements associated with the RISs 810 based on receiving the one or more downlink reference signals from the network entities 105. For example, the UEs 115 may measure an RSRP of the one or more downlink reference signals. Accordingly, the UEs 115 may generate respective measurement reports indicating these interference measurements, and may transmit the respective measurement reports to the network entities 105. For example, the UE 115-*v* may transmit a measurement report to the network entity 105-*p* at 835-*a*. Likewise, the UE 115-*w* may transmit a measurement report to the network entity 105-*q* at 835-*b*.

At 840, the network entities 105 may determine a second activation schedule (e.g., an optimal RIS configuration) for the RISs 810 or a suitable allocation of resources for communicating with the UEs 115 based on the measurement reports from the UEs 115. In some examples, the network entity 105-*p* may transmit a control message to the network entity 105-*q* indicating the interference measurements performed by the UE 115-*v*. Likewise, the network entity 105-*q* may transmit a control message to the network entity 105-*p* indicating the interference measurements performed by the UE 115-*w*. The network entities 105 may jointly determine the second activation schedule for the RISs 810 and the suitable allocation of resources for communicating with the UEs 115 based on exchanging these control messages.

At 845, the network entities 105 may configure the RISs 810 with the second activation schedule. For example, the network entity 105-*q* may configure the RIS 810-*b* with a set of directional settings, a set of active periods, and a set of inactive periods associated with the second activation schedule at 845-*a*. Similarly, the network entity 105-*p* may configure the RIS 810-*a* with a set of directional settings, a set of active periods, and a set of inactive periods associated with the second activation schedule at 845-*b*. Additionally or alternatively, the network entities 105 may schedule communications with the UEs 115 using the suitable allocation of resources determined at 840. For example, the network entity 105-*p* may schedule communications with the UE 115-*v* on a first set of time and frequency resources, and the network entity 105-*q* may schedule communications with the UE 115-*w* on a second set of time and frequency resources.

The process flow 800 may support techniques for reduced RIS-centric interference and improved communication reliability, among other benefits. For example, the techniques described herein may enable the network entities 105 to jointly determine an optimal RIS configuration for the RISs 810 or a suitable allocation of resources for communicating with the UEs 115 based on exchanging (e.g., communicating) interference measurements associated with the RISs 810. The optimal RIS configuration and the suitable allocation of resources may decrease interference caused by the RISs 810 and improve the likelihood of the network entities 105 successfully communicating with the UEs 115 via the RISs 810.

Figure 9:
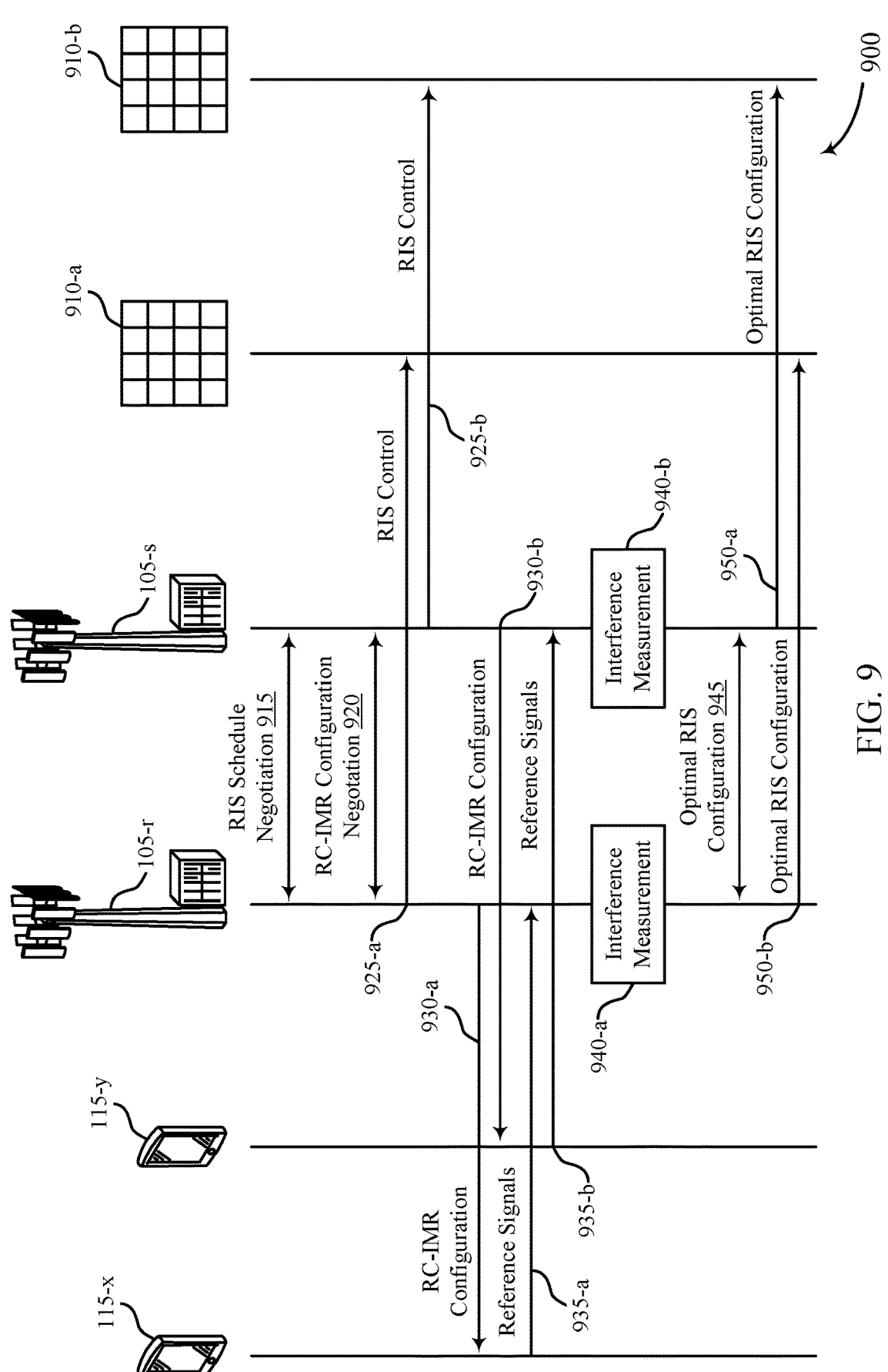

FIG. 9 illustrates an example of a process flow 900 that supports interference management for RISs in accordance with aspects of the present disclosure. The process flow 900 may implement or be implemented by aspects of the wireless communications system 100, the wireless communications system 200, the wireless communications system 300, the wireless communications system 301, the wireless communications system 400, the process flow 500, the process flow 600, the wireless communications system 700, or the process flow 800. For example, the process flow 900 may include a network entity 105-*r*, a network entity 105-*s*, a UE 115-*x*, and a UE 115-*y*, which may be examples of corresponding devices described with reference to FIGS. 1 through 8. The process flow 900 may also include a RIS 910-*a* and a RIS 910-*b*, which may be examples of a RIS 210, a RIS 310, a RIS 410, a RIS 710, or a RIS 810 described with reference to FIGS. 2 through 8. In the following description of the process flow 900, operations between the network entities 105, the UEs 115, and the RISs 910 may be performed in a different order or at a different time than as shown. Additionally or alternatively, some operations may be omitted from the process flow 900, and other operations may be added to the process flow 900.

At 915, the network entity 105-*r* may perform a RIS schedule negotiation procedure with the network entity 105-*s*. For example, the network entity 105-*r* may transmit a control message to the network entity 105-*s* indicating a first set of directional settings for the RISs 910, a first set of active periods for the RISs 910, or a first set of inactive periods for the RISs 910. Similarly, the network entity 105-*s* may transmit a control message to the network entity 105-*r* indicating a second set of directional settings for the RISs 910, a second set of active periods for the RISs 910, or a second set of inactive periods for the RISs 910. The network entities 105 may determine a first activation schedule (e.g., an initial activation schedule) for the RISs 910 based on these control messages.

At 920, the network entity 105-*r* may perform an RC-IMR configuration negotiation procedure with the network entity 105-*s*. In some examples, the network entities 105 may perform the RC-IMR configuration negotiation procedure over a backhaul connection (e.g., an Xn interface). During the RC-IMR configuration negotiation procedure, the network entity 105-r may transmit a control message to the network entity 105-s indicating a first set of potential RC-IMRs. Likewise, the network entity 105-s may transmit a control message to the network entity 105-r indicating a second potential set of RC-IMRs. The network entities 105 may jointly determine an RC-IMR configuration (e.g., a final set of RC-IMRs) based on exchanging these control messages.

At 925, the network entities 105 may transmit RIS control messages to the RISs 910 based on determining the RC-IMR configuration and the first activation schedule. For example, the network entity 105-r may transmit a first RIS control message to the RIS 910-a at 925-a. The first RIS control message may indicate a set of directional settings for the RIS 910-a, a set of active periods for the RIS 910-a, or a set of inactive periods for the RIS 910-a. Likewise, the network entity 105-s may transmit a second RIS control message to the RIS 910-b at 925-b. The second RIS control message may indicate a set of directional settings for the RIS 910-b, a set of active periods for the RIS 910-b, or a set of inactive periods for the RIS 910-b.

At 930-a, the network entity 105-r may transmit an indication of the RC-IMR configuration (e.g., RC-IMR locations) to the UE 115-x. At 930-b, the network entity 105-s may transmit an indication of the RC-IMR configuration to the UE 115-y. Accordingly, the network entities 105 may receive one or more uplink reference signals from the UEs 115 on RC-IMRs associated with the RC-IMR configuration. For example, the network entity 105-r may receive one or more uplink reference signals from the UE 115-x on a first set of RC-IMRs at 935-a, and the network entity 105-s may receive one or more uplink reference signals from the UE 115-y on a second set of RC-IMRs at 935-b. In some examples, each RC-IM R may correspond to a respective combination of active RISs (e.g., RISs that are in an active state) and inactive RISs (e.g., RISs that are in an inactive state).

The network entities 105 may perform interference measurements associated with the RISs 910 based on receiving the one or more uplink reference signals from the UEs 115 on the RC-IMRs. For example, the network entity 105-r may perform a set of interference measurements on uplink reference signals received from the UE 115-x at 940-a. Similarly, the network entity 105-s may perform a set of interference measurements on uplink reference signals received from the UE 115-y at 940-b. In some examples, the set of interference measurements may include, for example, an RSRP of the one or more uplink reference signals.

At 945, the network entities 105 may determine a second activation schedule (e.g., an optimal RIS configuration) for the RISs 910 or a suitable allocation of resources for communicating with the UEs 115 based on the interference measurements performed at 940. In some examples, the network entity 105-r may transmit a control message to the network entity 105-s indicating the interference measurements performed by the network entity 105-r. Likewise, the network entity 105-s may transmit a control message to the network entity 105-r indicating the interference measurements performed by the network entity 105-s. The network entities 105 may jointly determine the second activation schedule for the RISs 910 and the suitable allocation of resources for communicating with the UEs 115 based on exchanging these control messages.

At 950, the network entities 105 may configure the RISs 910 with the second activation schedule. For example, the network entity 105-s may configure the RIS 910-b with a set of directional settings, a set of active periods, and a set of inactive periods associated with the second activation schedule at 950-a. Similarly, the network entity 105-r may configure the RIS 910-a with a set of directional settings, a set of active periods, and a set of inactive periods associated with the second activation schedule at 950-b. Additionally or alternatively, the network entities 105 may schedule communications with the UEs 115 using the suitable allocation of resources determined at 945. For example, the network entity 105-r may schedule communications with the UE 115-x on a first set of time and frequency resources, and the network entity 105-s may schedule communications with the UE 115-y on a second set of time and frequency resources.

The process flow 900 may support techniques for reduced RIS-centric interference and improved communication reliability, among other benefits. For example, the techniques described herein may enable the network entities 105 to jointly determine one an optimal RIS configuration for the RISs 910 or a suitable allocation of resources for communicating with the UEs 115 based on exchanging (e.g., communicating) interference measurements associated with the RISs 910. The optimal RIS configuration and the suitable allocation of resources may decrease interference caused by the RISs 910 and improve the likelihood of the network entities 105 successfully communicating with the UEs 115 via the RISs 910.

Figure 10:
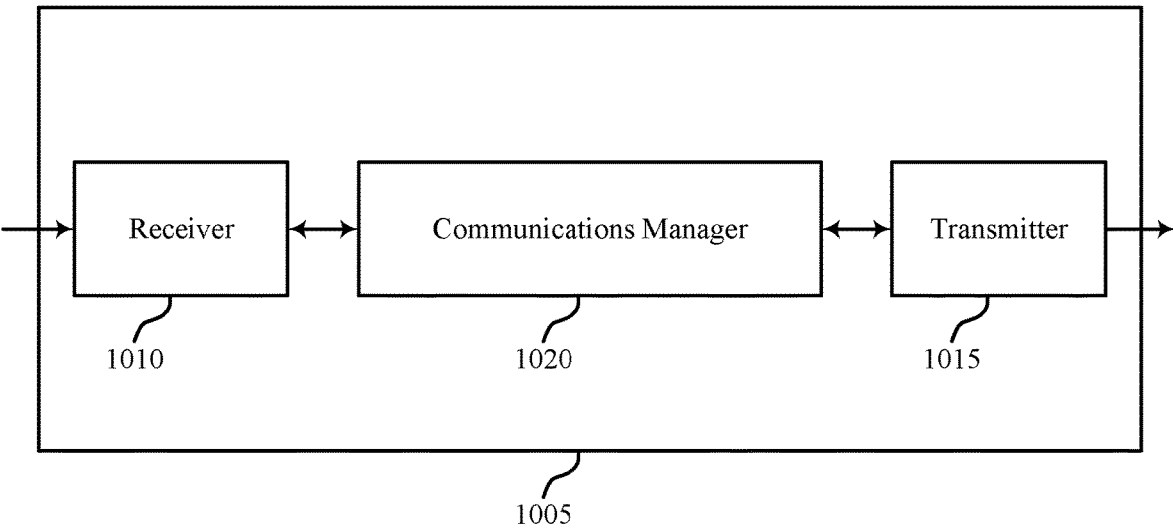
FIGS. 10 and 11 show block diagrams of devices that support interference management for RISs in accordance with aspects of the present disclosure.

FIG. 10 shows a block diagram 1000 of a device 1005 that supports interference management for RISs in accordance with aspects of the present disclosure. The device 1005 may be an example of aspects of a UE 115 described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, or control information associated with various information channels (e.g., control channels, data channels, information channels related to interference management for RISs). Information may be passed on to other components of the device 1005. The receiver 1010 may utilize a single antenna or multiple antennas.

The transmitter 1015 may provide a means for transmitting signals generated by other components of the device 1005. For example, the transmitter 1015 may transmit information such as packets, user data, or control information associated with various information channels (e.g., control channels, data channels, information channels related to interference management for RISs). In some examples, the transmitter 1015 may be co-located with a receiver 1010 in a transceiver module. The transmitter 1015 may utilize a single antenna or multiple antennas.

The communications manager 1020, the receiver 1010, the transmitter 1015, or various combinations thereof or various components thereof may be examples of means for performing various aspects of interference management for RISs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, or discrete hardware components configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010 or the transmitter 1015. For example, the communications manager 1020 may receive information from the receiver 1010, send information to the transmitter 1015, or be integrated in combination with the receiver 1010 or the transmitter 1015 to receive information, transmit information, or perform various other operations as described herein.

The communications manager 1020 may support wireless communication at the device 1005 (e.g., a first network node) in accordance with examples disclosed herein. For example, the communications manager 1020 may be configured as or otherwise support a means for receiving a set of downlink reference signals associated with a second network node on a set of interference measurement resources, where the set of interference measurement resources is based on an activation schedule of one or more RISs. The communications manager 1020 may be configured as or otherwise support a means for generating interference measurement information associated with the one or more RISs based on the set of downlink reference signals. The communications manager 1020 may be configured as or otherwise support a means for transmitting, to the second network node, a measurement report including the interference measurement information.

Additionally or alternatively, the communications manager 1020 may support wireless communications at the device 1005 (e.g., a first network node) in accordance with other examples disclosed herein. For example, the communications manager 1020 may be configured as or otherwise support a means for receiving, from a second network node, information indicative of a set of interference measurement resources, where the set of interference measurement resources is based on an activation schedule of one or more RISs. The communications manager 1020 may be configured as or otherwise support a means for transmitting a set of uplink reference signals to the second network node on the set of interference measurement resources. The communications manager 1020 may be configured as or otherwise support a means for communicating with the second network node based on the set of uplink reference signals.

By including or configuring the communications manager 1020 in accordance with examples as described herein, the device 1005 (e.g., a processor controlling or otherwise coupled to the receiver 1010, the transmitter 1015, or the communications manager 1020 may support techniques for reduced power consumption by reducing the number of retransmissions performed by the device 1005. For examples, the described techniques may enable the device 1005 to perform wireless communications with greater reliability and lower interference, which may reduce a number of retransmissions performed by the device 1005. Reducing the number of retransmissions performed by the device 1005 may enable the device 1005 to remain in a sleep mode for a longer duration, which may reduce power consumption at the device 1005, among other benefits.

Figure 11:
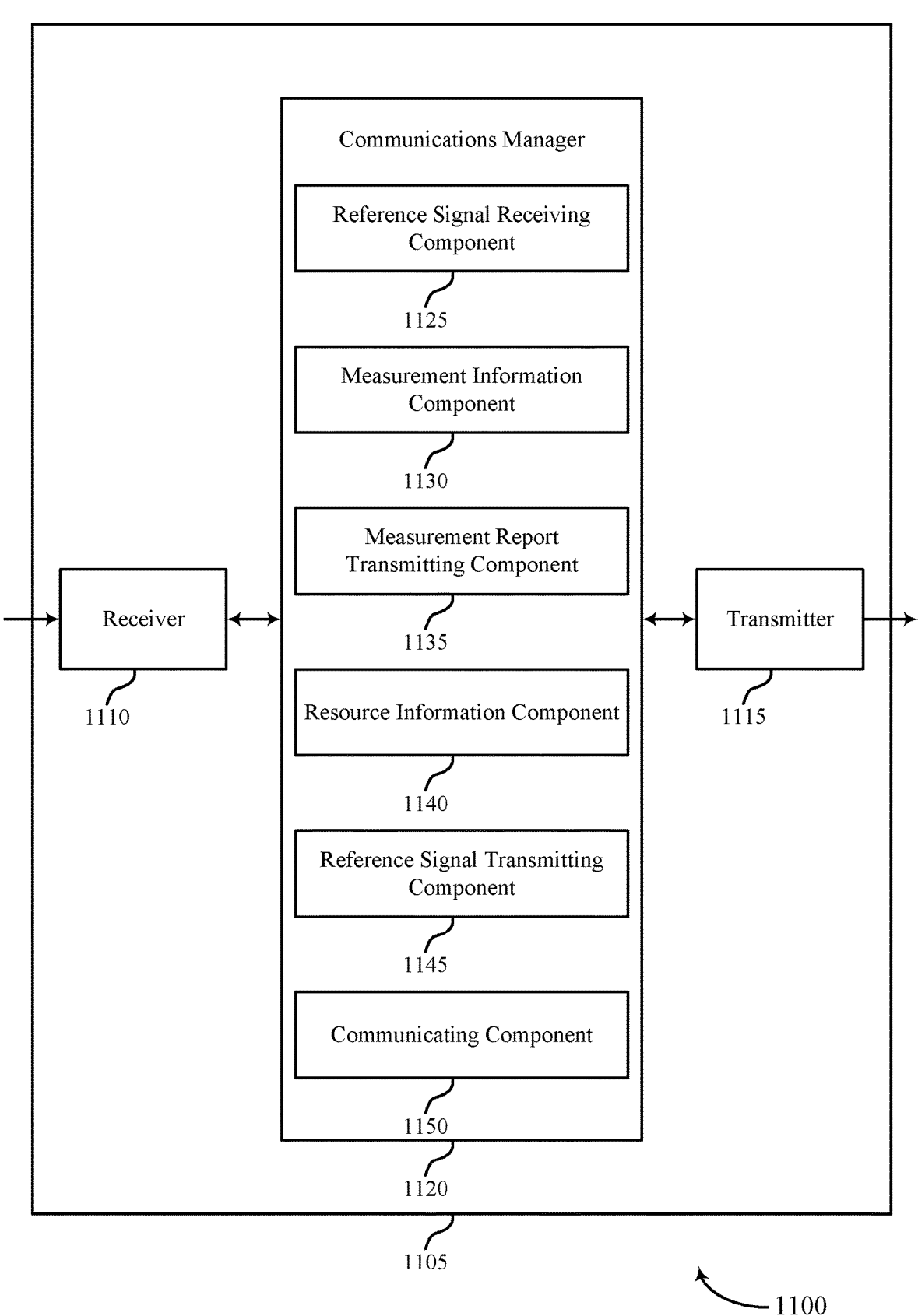

FIG. 11 shows a block diagram 1100 of a device 1105 that supports interference management for RISs in accordance with aspects of the present disclosure. The device 1105 may be an example of aspects of a device 1005 or a UE 115 described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, or control information associated with various information channels (e.g., control channels, data channels, information channels related to interference management for RISs). Information may be passed on to other components of the device 1105. The receiver 1110 may utilize a single antenna or multiple antennas.

The transmitter 1115 may provide a means for transmitting signals generated by other components of the device 1105. For example, the transmitter 1115 may transmit information such as packets, user data, or control information associated with various information channels (e.g., control channels, data channels, information channels related to interference management for RISs). In some examples, the transmitter 1115 may be co-located with a receiver 1110 in a transceiver module. The transmitter 1115 may utilize a single antenna or multiple antennas.

The device 1105, or various components thereof, may be an example of means for performing various aspects of interference management for RISs, as described herein. For example, the communications manager 1120 may include a reference signal receiving component 1125, a measurement information component 1130, a measurement report transmitting component 1135, a resource information component 1140, a reference signal transmitting component 1145, or a communicating component 1150. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110 or the transmitter 1115. For example, the communications manager 1120 may receive information from the receiver 1110, send information to the transmitter 1115, or be integrated in combination with the receiver 1110 or the transmitter 1115 to receive information, transmit information, or perform various other operations as described herein.

The communications manager 1120 may support wireless communications at the device 1105 (e.g., a first network node) in accordance with examples disclosed herein. The reference signal receiving component 1125 may be configured as or otherwise support a means for receiving a set of downlink reference signals associated with a second network node on a set of interference measurement resources, where the set of interference measurement resources is based on an activation schedule of one or more RISs. The measurement information component 1130 may be configured as or otherwise support a means for generating interference measurement information associated with the one or more RISs based on the set of downlink reference signals. The measurement report transmitting component 1135 may be configured as or otherwise support a means for transmitting, to the second network node, a measurement report including the interference measurement information.

Additionally or alternatively, the communications manager 1120 may support wireless communications at the device 1105 (e.g., a first network node) in accordance with other examples disclosed herein. The resource information component 1140 may be configured as or otherwise support a means for receiving, from a second network node, information indicative of a set of interference measurement resources, where the set of interference measurement resources is based on an activation schedule of one or more RISs. The reference signal transmitting component 1145 may be configured as or otherwise support a means for transmitting a set of uplink reference signals to the second network node on the set of interference measurement resources. The communicating component 1150 may be configured as or otherwise support a means for communicating with the second network node based on the set of uplink reference signals.

Figure 12:
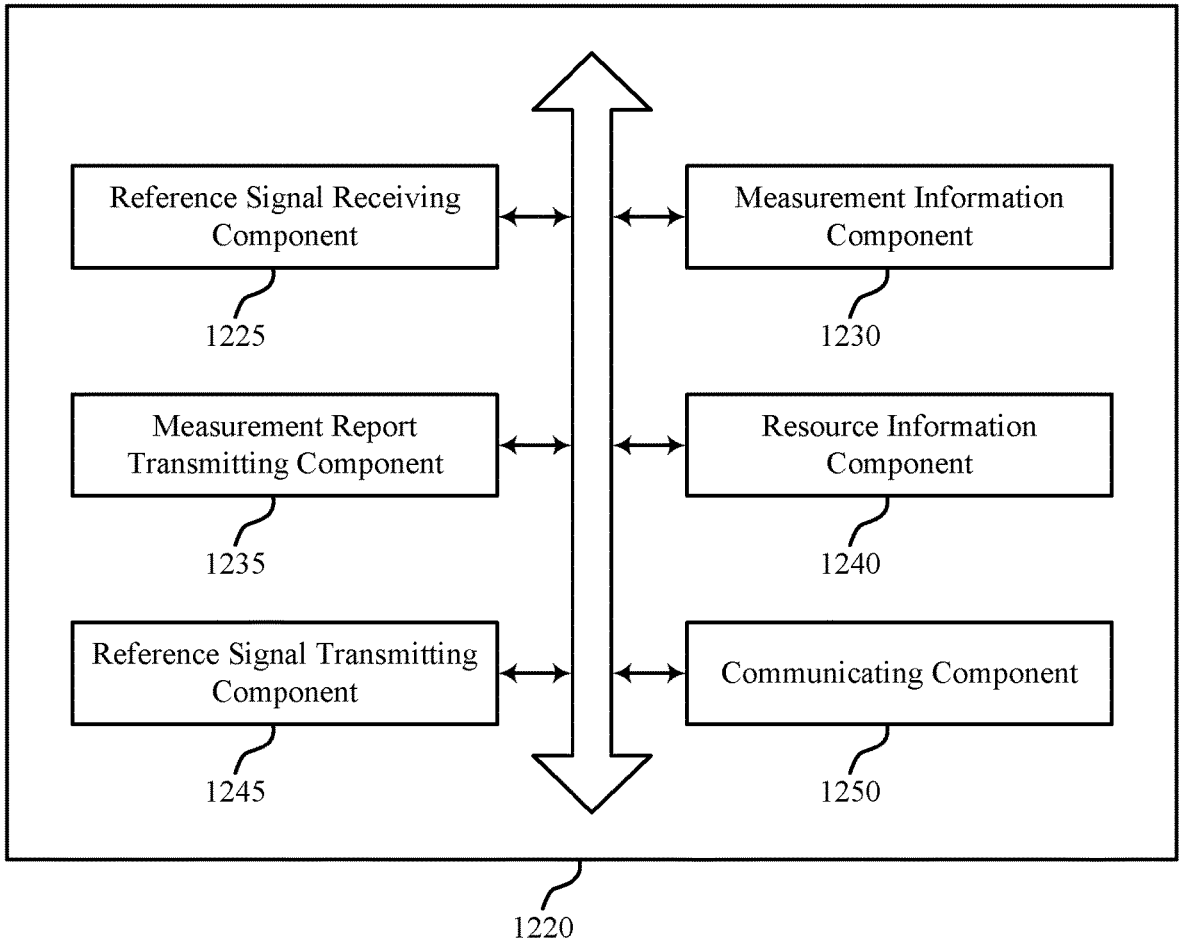
FIG. 12 shows a block diagram of a communications manager that supports interference management for RISs in accordance with aspects of the present disclosure.

FIG. 12 shows a block diagram 1200 of a communications manager 1220 that supports interference management for RISs in accordance with aspects of the present disclosure. The communications manager 1220 may be an example of aspects of a communications manager 1020 or a communications manager 1120, as described herein. The communications manager 1220, or various components thereof, may be an example of means for performing various aspects of interference management for RISs, as described herein. For example, the communications manager 1220 may include a reference signal receiving component 1225, a measurement information component 1230, a measurement report transmitting component 1235, a resource information component 1240, a reference signal transmitting component 1245, or a communicating component 1250. Each of these components may communicate, directly or indirectly, with one another (e.g., via one or more buses).

The communications manager 1220 may support wireless communication at a first network node in accordance with examples disclosed herein. The reference signal receiving component 1225 may be configured as or otherwise support a means for receiving a set of downlink reference signals associated with a second network node on a set of interference measurement resources, where the set of interference measurement resources is based on an activation schedule of one or more RISs. The measurement information component 1230 may be configured as or otherwise support a means for generating interference measurement information associated with the one or more RISs based on the set of downlink reference signals. The measurement report transmitting component 1235 may be configured as or otherwise support a means for transmitting, to the second network node, a measurement report including the interference measurement information.

In some examples, the resource information component 1240 may be configured as or otherwise support a means for receiving, from the second network node, information indicative of an allocation of resources for communication with the second network node, where the allocation of resources is based on the measurement report. In some examples, to support receiving the information indicative of the allocation of resources for communication with the second network node, the resource information component 1240 may be configured as or otherwise support a means for receiving control signaling that indicates the allocation of resources, where the control signaling includes RRC signaling, DCI, a system information block (SIB), or a MAC control element (CE).

In some examples, the communicating component 1250 may be configured as or otherwise support a means for communicating with the second network node via the one or more RISs using resources allocated by the allocation of resources.

In some examples, to support receiving the set of downlink reference signals, the reference signal receiving component 1225 may be configured as or otherwise support a means for receiving the set of downlink reference signals associated with the second network node on the set of interference measurement resources, where the set of interference measurement resources is based on a set of directional settings associated with the activation schedule of the one or more RISs, a set of active periods associated with the activation schedule of the one or more RISs, or a set of inactive periods associated with the activation schedule of the one or more RISs.

In some examples, the interference measurement information includes information indicative of a respective received power for each respective downlink reference signal of the set of downlink reference signals. In some examples, the resource information component 1240 may be configured as or otherwise support a means for receiving, from the second network node, information indicative of the set of interference measurement resources, where receiving the set of downlink reference signals is based on the information indicative of the set of interference measurement resources.

Additionally or alternatively, the communications manager 1220 may support wireless communications at a first network node in accordance with other examples disclosed herein. The resource information component 1240 may be configured as or otherwise support a means for receiving, from a second network node, information indicative of a set of interference measurement resources, where the set of interference measurement resources is based on an activation schedule of one or more RISs. The reference signal transmitting component 1245 may be configured as or otherwise support a means for transmitting a set of uplink reference signals to the second network node on the set of interference measurement resources. The communicating component 1250 may be configured as or otherwise support a means for communicating with the second network node based on the set of uplink reference signals.

In some examples, the resource information component 1240 may be configured as or otherwise support a means for receiving, from the second network node, information indicative of an allocation of resources for communicating with the second network node, where the allocation of resources is based on the set of uplink reference signals.

In some examples, to support communicating with the second network node, the communicating component 1250 may be configured as or otherwise support a means for communicating with the second network node via the one or more RISs using resources allocated by the allocation of resources.

In some examples, to support transmitting the set of uplink reference signals, the reference signal transmitting component 1245 may be configured as or otherwise support a means for transmitting the set of uplink reference signals to the second network node on the set of interference measurement resources, where the set of interference measurement resources is based on a set of directional settings associated with the activation schedule of the one or more RISs, a set of active periods associated with the activation schedule of the one or more RISs, or a set of inactive periods associated with the activation schedule of the one or more RISs.

In some examples, a first interference measurement resource of the set of interference measurement resources is within an active period of a first RIS of the one or more RISs and a second interference measurement resource of the set of interference measurement resources is within an inactive period of the first RIS. In some examples, the first interference measurement resource is within an inactive period of a second RIS of the one or more RISs and the second interference measurement resource is within an active period of the second RIS.

Figure 13:
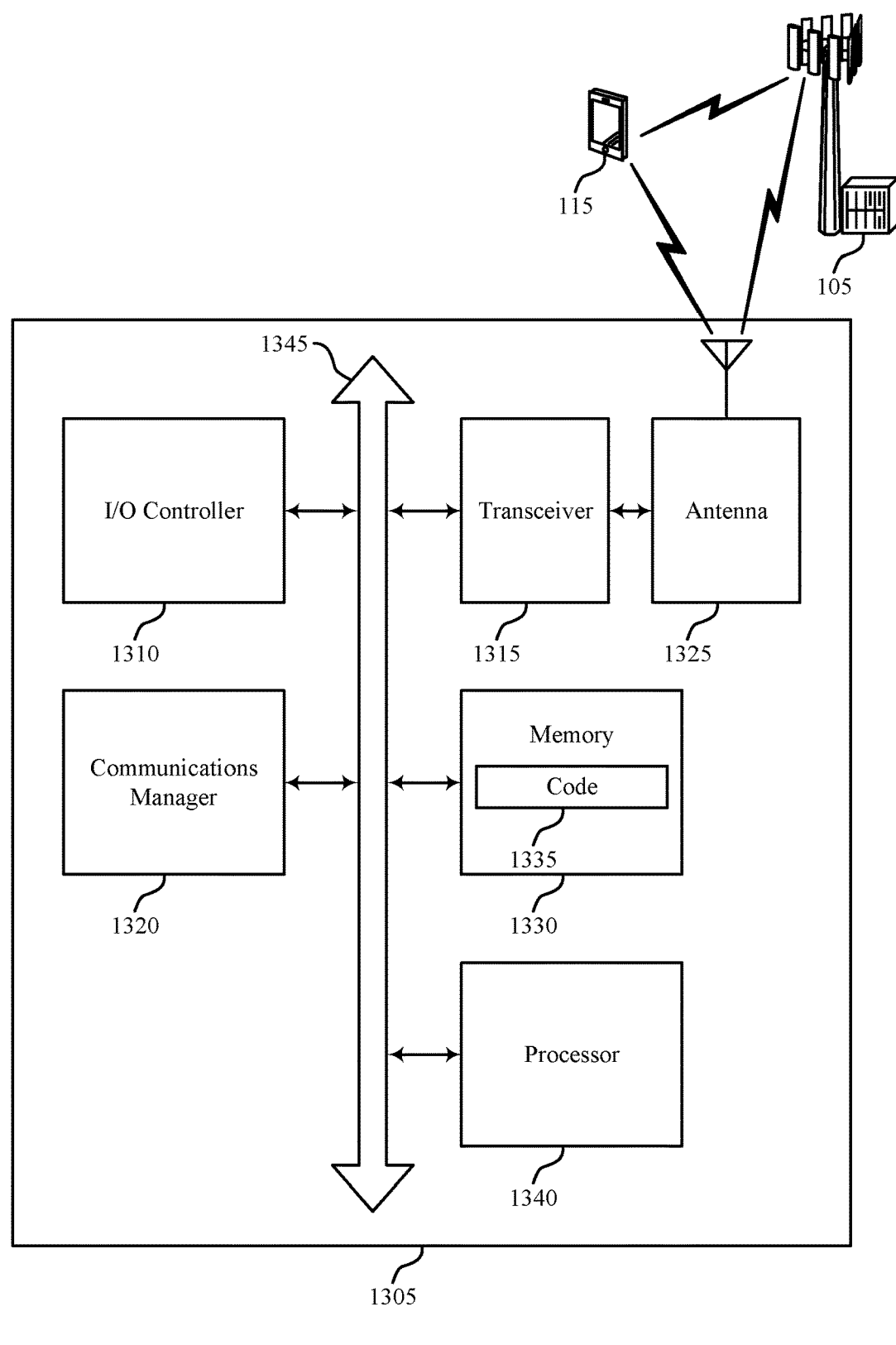
FIG. 13 shows a diagram of a system including a device that supports interference management for RISs in accordance with aspects of the present disclosure.

FIG. 13 shows a diagram of a system 1300 including a device 1305 that supports interference management for RISs in accordance with aspects of the present disclosure. The device 1305 may be an example of or include the components of a device 1005, a device 1105, or a UE 115, as described herein. The device 1305 may communicate wirelessly with one or more network entities 105 or UEs 115. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or a component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, or a discrete hardware component). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting interference management for RISs). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at the device 1305 (e.g., a first network node) in accordance with examples disclosed herein. For example, the communications manager 1320 may be configured as or otherwise support a means for receiving a set of downlink reference signals associated with a second network node on a set of interference measurement resources, where the set of interference measurement resources is based on an activation schedule of one or more RISs. The communications manager 1320 may be configured as or otherwise support a means for generating interference measurement information associated with the one or more RISs based on the set of downlink reference signals. The communications manager 1320 may be configured as or otherwise support a means for transmitting, to the second network node, a measurement report including the interference measurement information.

Additionally or alternatively, the communications manager 1320 may support wireless communications at the device 1305 (e.g., a first network node) in accordance with other examples disclosed herein. For example, the communications manager 1320 may be configured as or otherwise support a means for receiving, from a second network node, information indicative of a set of interference measurement resources, where the set of interference measurement resources is based on an activation schedule of one or more RISs. The communications manager 1320 may be configured as or otherwise support a means for transmitting a set of uplink reference signals to the second network node on the set of interference measurement resources. The communications manager 1320 may be configured as or otherwise support a means for communicating with the second network node based on the set of uplink reference signals.

By including or configuring the communications manager 1320 in accordance with examples as described herein, the device 1305 may support techniques for improved communication reliability and reduced interference at the device 1305. For example, the described techniques may enable the device 1305 to perform RIS-centric interference measurements on RC-IMRs. Accordingly, the device 1305 may transmit an indication of the RIS-centric interference measurements to a base station such that the base station can use the RIS-centric interference measurements to make scheduling decisions for the device 1305. These scheduling decisions may increase the likelihood of successful communications between the device 1305 and the base station, among other benefits.

In some examples, the communications manager 1320 may be configured to perform various operations (e.g., receiving, monitoring, transmitting) using or otherwise in cooperation with the transceiver 1315 or the one or more antennas 1325. Although the communications manager 1320 is illustrated as a separate component, in some examples, one or more functions described with reference to the communications manager 1320 may be supported by or performed by the processor 1340, the memory 1330, or the code 1335. For example, the code 1335 may include instructions executable by the processor 1340 to cause the device 1305 to perform various aspects of interference management for RISs as described herein, or the processor 1340 and the memory 1330 may be otherwise configured to perform or support such operations.

Figure 14:
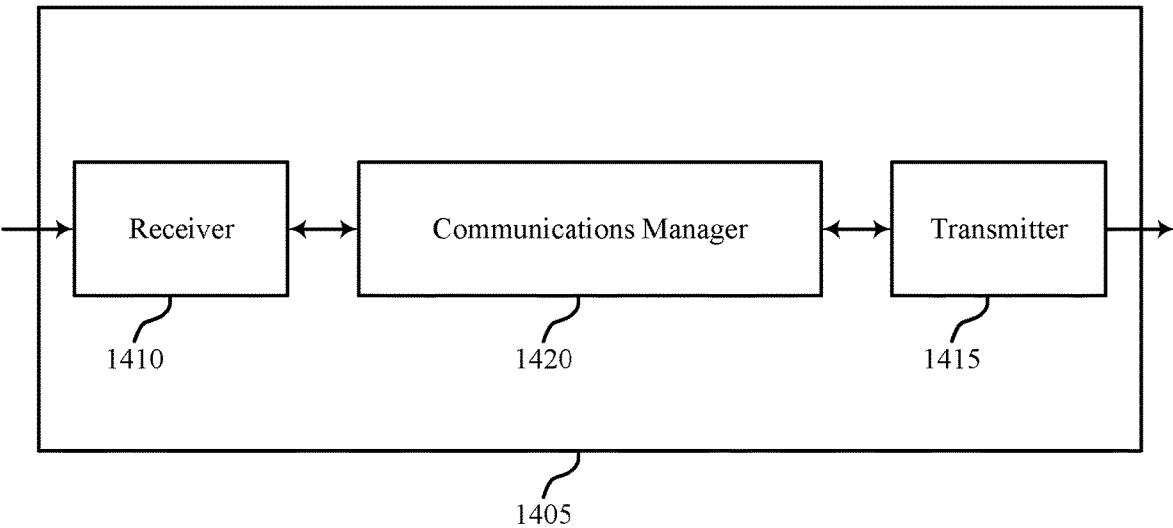
FIGS. 14 and 15 show block diagrams of devices that support interference management for RISs in accordance with aspects of the present disclosure.

FIG. 14 shows a block diagram 1400 of a device 1405 that supports interference management for RISs in accordance with aspects of the present disclosure. The device 1405 may be an example of aspects of a network entity 105, as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, or control information associated with various information channels (e.g., control channels, data channels, information channels related to interference management for RISs). Information may be passed on to other components of the device 1405. The receiver 1410 may utilize a single antenna or multiple antennas.

The transmitter 1415 may provide a means for transmitting signals generated by other components of the device 1405. For example, the transmitter 1415 may transmit information such as packets, user data, or control information associated with various information channels (e.g., control channels, data channels, information channels related to interference management for RISs). In some examples, the transmitter 1415 may be co-located with a receiver 1410 in a transceiver module. The transmitter 1415 may utilize a single antenna or multiple antennas.

The communications manager 1420, the receiver 1410, the transmitter 1415, or various combinations thereof or various components thereof may be examples of means for performing various aspects of interference management for RISs as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, or discrete hardware components configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410 or the transmitter 1415. For example, the communications manager 1420 may receive information from the receiver 1410, send information to the transmitter 1415, or be integrated in combination with the receiver 1410 or the transmitter 1415 to receive information, transmit information, or perform various other operations as described herein.

The communications manager 1420 may support wireless communications at the device 1405 (e.g., a first network node) in accordance with examples disclosed herein. For example, the communications manager 1420 may be configured as or otherwise support a means for transmitting a set of downlink reference signals on a set of interference measurement resources, where the set of interference measurement resources is based on a first activation schedule of one or more RISs. The communications manager 1420 may be configured as or otherwise support a means for receiving, from a second network node, a measurement report including interference measurement information associated with the one or more RISs. The communications manager 1420 may be configured as or otherwise support a means for determining, based on the measurement report, a second activation schedule of the one or more RISs or an allocation of resources for communicating with the second network node. The communications manager 1420 may be configured as or otherwise support a means for communicating with the second network node based on the second activation schedule or the allocation of resources.

Additionally or alternatively, the communications manager 1420 may support wireless communications at the device 1405 (e.g., a first network node) in accordance with other examples disclosed herein. For example, the communications manager 1420 may be configured as or otherwise support a means for transmitting, to a second network node, information indicative of a set of interference measurement resources, where the set of interference measurement resources is based on a first activation schedule of one or more RISs. The communications manager 1420 may be configured as or otherwise support a means for receiving a set of uplink reference signals associated with the second network node on the set of interference measurement resources. The communications manager 1420 may be configured as or otherwise support a means for generating interference measurement information associated with the one or more RISs based on the set of uplink reference signals. The communications manager 1420 may be configured as or otherwise support a means for determining, based on the interference measurement information, a second activation schedule of the one or more RISs or an allocation of resources for communicating with the second network node.

By including or configuring the communications manager 1420 in accordance with examples as described herein, the device 1405 (e.g., a processor controlling or otherwise coupled to the receiver 1410, the transmitter 1415, or the communications manager 1420) may support techniques for reduced power consumption by reducing the number of retransmissions performed by the device 1405. For example, the described techniques may enable the device 1405 to determine an activation schedule for one or more RISs or a resource allocation for one or more UEs based on performing one or more RIS-centric interference measurements. The determined activation schedule or resource allocation may improve the reliability of communications between the device 1405 and the one or more UEs, which may reduce a number of retransmissions performed by the device 1405. Reducing the number of retransmissions performed by the device 1405 may enable the device 1405 to remain in a sleep mode for a longer duration, which may result in greater power savings at the device 1405, among other benefits.

Figure 15:
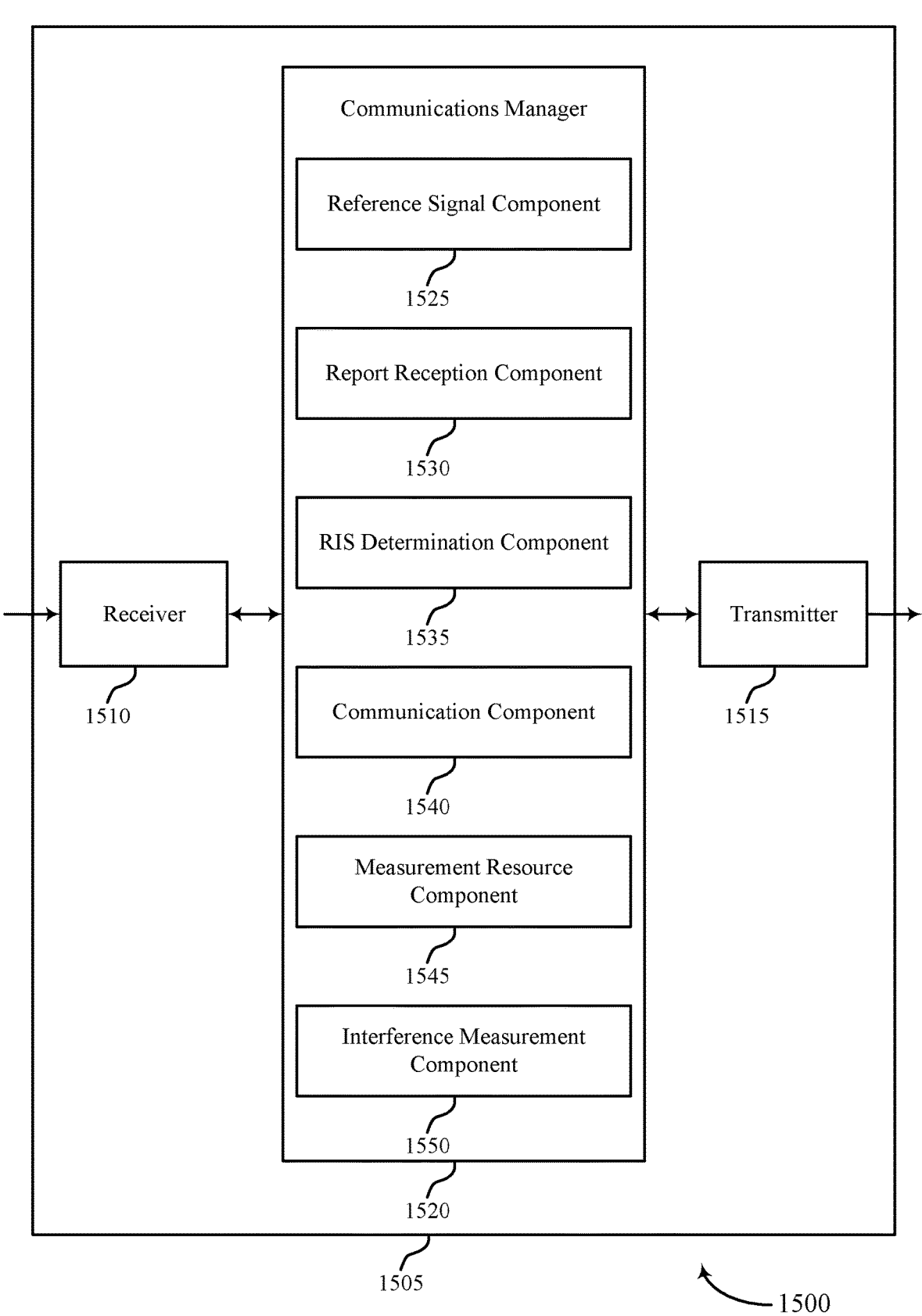

FIG. 15 shows a block diagram 1500 of a device 1505 that supports interference management for RISs in accordance with aspects of the present disclosure. The device 1505 may be an example of aspects of a device 1405 or a network entity 105, as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide means for receiving information such as packets, user data, or control information associated with various information channels (e.g., control channels, data channels, information channels related to interference management for RISs). Information may be passed on to other components of the device 1505. The receiver 1510 may utilize a single antenna or multiple antennas.

The transmitter 1515 may provide a means for transmitting signals generated by other components of the device 1505. For example, the transmitter 1515 may transmit information such as packets, user data, or control information associated with various information channels (e.g., control channels, data channels, information channels related to interference management for RISs). In some examples, the transmitter 1515 may be co-located with a receiver 1510 in a transceiver module. The transmitter 1515 may utilize a single antenna or multiple antennas.

The device 1505, or various components thereof, may be an example of means for performing various aspects of interference management for RISs as described herein. For example, the communications manager 1520 may include a reference signal component 1525, a report reception component 1530, a RIS determination component 1535, a communication component 1540, a measurement resource component 1545, or an interference measurement component 1550. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510 or the transmitter 1515. For example, the communications manager 1520 may receive information from the receiver 1510, send information to the transmitter 1515, or be integrated in combination with the receiver 1510 or the transmitter 1515 to receive information, transmit information, or perform various other operations as described herein.

The communications manager 1520 may support wireless communication at the device 1505 (e.g., a first network node) in accordance with examples disclosed herein. The reference signal component 1525 may be configured as or otherwise support a means for transmitting a set of downlink reference signals on a set of interference measurement resources, where the set of interference measurement resources is based on a first activation schedule of one or more RISs. The report reception component 1530 may be configured as or otherwise support a means for receiving, from a second network node, a measurement report including interference measurement information associated with the one or more RISs. The RIS determination component 1535 may be configured as or otherwise support a means for determining, based on the measurement report, a second activation schedule of the one or more RISs or an allocation of resources for communicating with the second network node. The communication component 1540 may be configured as or otherwise support a means for communicating with the second network node based on the second activation schedule or the allocation of resources.

Additionally or alternatively, the communications manager 1520 may support wireless communications at the device 1505 (e.g., a first network node) in accordance with other examples as disclosed herein. The measurement resource component 1545 may be configured as or otherwise support a means for transmitting, to a second network node, information indicative of a set of interference measurement resources, where the set of interference measurement resources is based on a first activation schedule of one or more RISs. The reference signal component 1525 may be configured as or otherwise support a means for receiving a set of uplink reference signals associated with the second network node on the set of interference measurement resources. The interference measurement component 1550 may be configured as or otherwise support a means for generating interference measurement information associated with the one or more RISs based on the set of uplink reference signals. The RIS determination component 1535 may be configured as or otherwise support a means for determining, based on the interference measurement information, a second activation schedule of the one or more RISs or an allocation of resources for communicating with the second network node.

Figure 16:
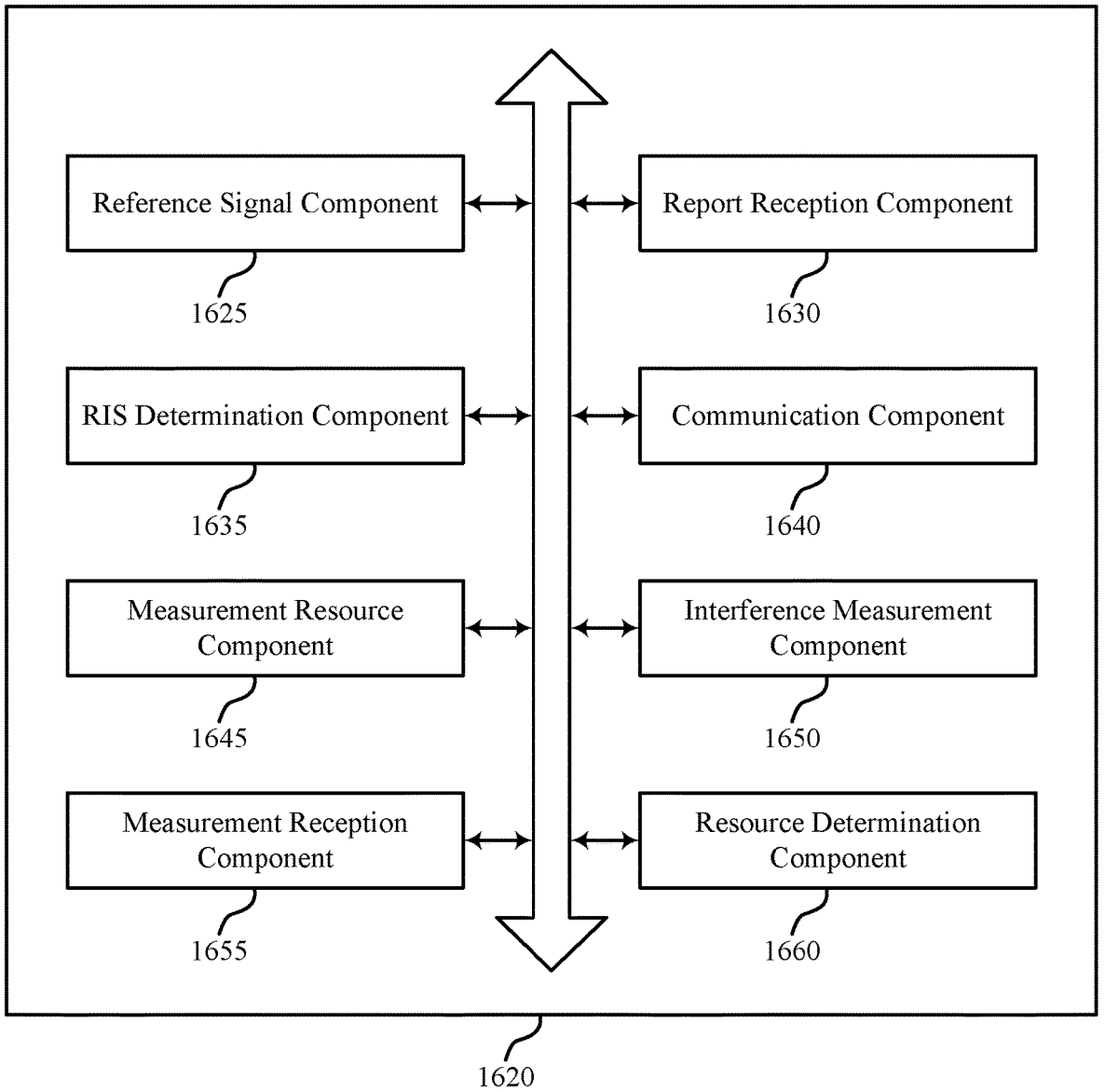
FIG. 16 shows a block diagram of a communications manager that supports interference management for RISs in accordance with aspects of the present disclosure.

FIG. 16 shows a block diagram 1600 of a communications manager 1620 that supports interference management for RISs in accordance with aspects of the present disclosure. The communications manager 1620 may be an example of aspects of a communications manager 1420 or a communications manager 1520, as described herein. The communications manager 1620, or various components thereof, may be an example of means for performing various aspects of interference management for RISs as described herein. For example, the communications manager 1620 may include a reference signal component 1625, a report reception component 1630, a RIS determination component 1635, a communication component 1640, a measurement resource component 1645, an interference measurement component 1650, a measurement reception component 1655, or a resource determination component 1660. Each of these components may communicate, directly or indirectly, with one another (e.g., via one or more buses).

The communications manager 1620 may support wireless communication at a first network node in accordance with examples disclosed herein. The reference signal component 1625 may be configured as or otherwise support a means for transmitting a set of downlink reference signals on a set of interference measurement resources, where the set of interference measurement resources is based on a first activation schedule of one or more RISs. The report reception component 1630 may be configured as or otherwise support a means for receiving, from a second network node, a measurement report including interference measurement information associated with the one or more RISs. The RIS determination component 1635 may be configured as or otherwise support a means for determining, based on the measurement report, a second activation schedule of the one or more RISs or an allocation of resources for communicating with the second network node. The communication component 1640 may be configured as or otherwise support a means for communicating with the second network node based on the second activation schedule or the allocation of resources.

In some examples, to support determining the second activation schedule or the allocation of resources, the RIS determination component 1635 may be configured as or otherwise support a means for determining a set of directional settings for the one or more RISs, a set of active periods associated with the second activation schedule of the one or more RISs, a set of inactive periods associated with the second activation schedule of the one or more RISs, an allocation of uplink resources for communicating with the second network node, or an allocation of downlink resources for communicating with the second network node.

In some examples, the measurement resource component 1645 may be configured as or otherwise support a means for transmitting, to a third network node, first information indicative of the interference measurement information, a first set of directional settings associated with the second activation schedule of the one or more RISs, a first set of active periods associated with the second activation schedule of the one or more RISs, or a first set of inactive periods associated with the second activation schedule of the one or more RISs.

In some examples, the measurement reception component 1655 may be configured as or otherwise support a means for receiving, from the third network node, second information indicative of second interference measurement information associated with the one or more RISs, a second set of directional settings associated with the second activation schedule of the one or more RISs, a second set of active periods associated with the second activation schedule of the one or more RISs, or a second set of inactive periods associated with the second activation schedule of the one or more RISs, where determining the second activation schedule or the allocation of resources is based on the first information and the second information.

In some examples, the measurement reception component 1655 may be configured as or otherwise support a means for receiving, from a controller associated with the one or more RISs, information indicative of a set of directional settings associated with the first activation schedule of the one or more RISs, a set of active periods associated with the first activation schedule of the one or more RISs, or a set of inactive periods associated with the first activation schedule of the one or more RISs, where determining the second activation schedule or the allocation of resources is based on the information.

In some examples, the measurement resource component 1645 may be configured as or otherwise support a means for transmitting, to the controller and based on the information received from the controller, second information indicative of the second activation schedule of the one or more RISs.

In some examples, the resource determination component 1660 may be configured as or otherwise support a means for determining the set of interference measurement resources based on a measurement resource coordination procedure between the first network node and a third network node or a controller associated with the one or more RISs.

In some examples, the measurement resource component 1645 may be configured as or otherwise support a means for transmitting, to the second network node, information indicative of the set of interference measurement resources, where transmitting the set of downlink reference signals is based on the information.

In some examples, to support communicating with the second network node, the communication component 1640 may be configured as or otherwise support a means for communicating with the second network node via the one or more RISs based on the second activation schedule or the allocation of resources.

In some examples, to support transmitting the set of downlink reference signals, the reference signal component 1625 may be configured as or otherwise support a means for transmitting the set of downlink reference signals on the set of interference measurement resources, where the set of interference measurement resources is configured for a set of network nodes in a connected state with the first network node, a set of network nodes with a threshold RSSI, or a set of network nodes in a geographic coverage area of the first network node.

In some examples, to support transmitting the set of downlink reference signals, the reference signal component 1625 may be configured as or otherwise support a means for transmitting the set of downlink reference signals on the set of interference measurement resources, where two or more interference measurement resources of the set of interference measurement resources correspond to respective combinations of one or more active RISs and one or more inactive RISs, and where the one or more RISs comprise the one or more active RISs and the one or more inactive RISs, and where the respective combinations are based on the first activation schedule.

In some examples, a first interference measurement resource of the set of interference measurement resources is within an active period of a first RIS of the one or more RISs and a second interference measurement resource of the set of interference measurement resources is within an inactive period of the first RIS. In some examples, the first interference measurement resource is within an inactive period of a second RIS of the one or more RISs and the second interference measurement resource is within an active period of the second RIS.

In some examples, the report reception component 1630 may be configured as or otherwise support a means for receiving, from a third network node, a second measurement report including second interference measurement information associated with the one or more RISs, where determining the second activation schedule or the allocation of resources is based on the measurement report from the second network node and the second measurement report from the third network node.

Additionally or alternatively, the communications manager 1620 may support wireless communications at a first network node in accordance with other examples disclosed herein. The measurement resource component 1645 may be configured as or otherwise support a means for transmitting, to a second network node, information indicative of a set of interference measurement resources, where the set of interference measurement resources is based on a first activation schedule of one or more RISs. In some examples, the reference signal component 1625 may be configured as or otherwise support a means for receiving a set of uplink reference signals associated with the second network node on the set of interference measurement resources. The interference measurement component 1650 may be configured as or otherwise support a means for generating interference measurement information associated with the one or more RISs based on the set of uplink reference signals. In some examples, the RIS determination component 1635 may be configured as or otherwise support a means for determining, based on the interference measurement information, a second activation schedule of the one or more RISs or an allocation of resources for communicating with the second network node.

In some examples, to support determining the second activation schedule or the allocation of resources, the RIS determination component 1635 may be configured as or otherwise support a means for determining a set of directional settings associated with the second activation schedule of the one or more RISs, a set of active periods associated with the second activation schedule of the one or more RISs, a set of inactive periods associated with the second activation schedule of the one or more RISs, an allocation of uplink resources for communicating with the second network node, or an allocation of downlink resources for communicating with the second network node.

In some examples, the measurement resource component 1645 may be configured as or otherwise support a means for transmitting, to a third network node, first information indicative of the interference measurement information, a first set of directional settings associated with the second activation schedule of the one or more RISs, a first set of active periods associated with the second activation schedule of the one or more RISs, or a first set of inactive periods associated with the second activation schedule of the one or more RISs.

In some examples, the measurement reception component 1655 may be configured as or otherwise support a means for receiving, from the third network node, second information indicative of second interference measurement information, a second set of directional settings associated with the second activation schedule of the one or more RISs, a second set of active periods associated with the second activation schedule of the one or more RISs, or a second set of inactive periods associated with the second activation schedule of the one or more RISs, where determining the second activation schedule or the allocation of resources is based on the first information and the second information.

In some examples, the measurement reception component 1655 may be configured as or otherwise support a means for receiving, from a controller associated with the one or more RISs, information indicative of a set of directional settings associated with the first activation schedule of the one or more RISs, a set of active periods associated with the first activation schedule of the one or more RISs, or a set of inactive periods associated with the first activation schedule of the one or more RISs, where determining the second activation schedule or the allocation of resources is based on the information.

In some examples, the measurement resource component 1645 may be configured as or otherwise support a means for transmitting, to the controller and based on the information received from the controller, second information indicative of the second activation schedule of the one or more RISs.

In some examples, the resource determination component 1660 may be configured as or otherwise support a means for determining the set of interference measurement resources based on a measurement resource coordination procedure between the first network node and a third network node or a controller associated with the one or more RISs, where transmitting the information indicative of the set of interference measurement resources to the second network node is based on the measurement resource coordination procedure.

In some examples, the communication component 1640 may be configured as or otherwise support a means for communicating with the second network node via the one or more RISs based on the second activation schedule or the allocation of resources.

In some examples, to support receiving the set of uplink reference signals, the reference signal component 1625 may be configured as or otherwise support a means for receiving the set of uplink reference signals on the set of interference measurement resources, where the set of interference measurement resources is configured for a set of network nodes in a connected state with the first network node, a set of network nodes with a threshold RSSI, or a set of network nodes in a geographic coverage area of the first network node.

In some examples, to support receiving the set of uplink reference signals, the reference signal component 1625 may be configured as or otherwise support a means for receiving the set of uplink reference signals on the set of interference measurement resources, where the set of interference measurement resources is based on whether the one or more RISs are scheduled to be in an active state or an inactive state during a set of time periods corresponding to the set of interference measurement resources.

In some examples, the reference signal component 1625 may be configured as or otherwise support a means for receiving a second set of uplink reference signals associated with a third network node on the set of interference measurement resources, where the set of uplink reference signals associated with the second network node and the second set of uplink reference signals associated with the third network node are associated with different orthogonal cover codes.

In some examples, the interference measurement component 1650 may be configured as or otherwise support a means for generating second interference measurement information associated with the one or more RISs based on the second set of uplink reference signals associated with the third network node, where determining the second activation schedule or the allocation of resources is based on the interference measurement information from the second network node and the second interference measurement information from the third network node.

Figure 17:
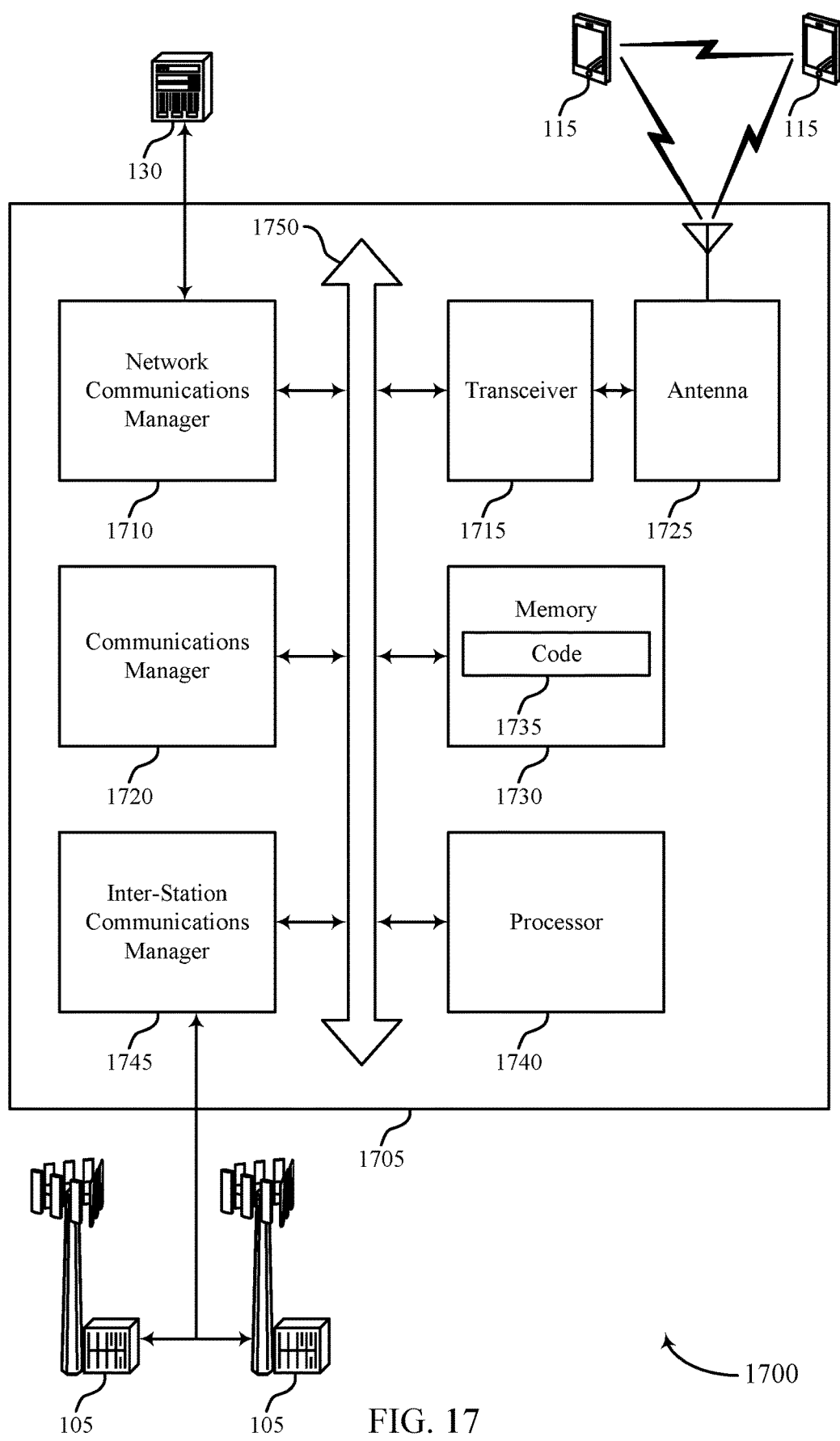
FIG. 17 shows a diagram of a system including a device that supports interference management for RISs in accordance with aspects of the present disclosure.

FIG. 17 shows a diagram of a system 1700 including a device 1705 that supports interference management for RISs in accordance with aspects of the present disclosure. The device 1705 may be an example of or include the components of a device 1405, a device 1505, or a network entity 105, as described herein. The device 1705 may communicate wirelessly with one or more network entities 105 or UEs 115. The device 1705 may include components for bidirectional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or a component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, or a discrete hardware component). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting interference management for RISs). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other network entities 105, and may include a controller or scheduler for controlling communications with UEs 115 in cooperation with other network entities 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between network entities 105.

The communications manager 1720 may support wireless communications at the device 1705 (e.g., a first network node) in accordance with examples as disclosed herein. For example, the communications manager 1720 may be configured as or otherwise support a means for transmitting a set of downlink reference signals on a set of interference measurement resources, where the set of interference measurement resources is based on a first activation schedule of one or more RISs. The communications manager 1720 may be configured as or otherwise support a means for receiving, from a second network node, a measurement report including interference measurement information associated with the one or more RISs. The communications manager 1720 may be configured as or otherwise support a means for determining, based on the measurement report, a second activation schedule of the one or more RISs or an allocation of resources for communicating with the second network node. The communications manager 1720 may be configured as or otherwise support a means for communicating with the second network node based on the second activation schedule or the allocation of resources.

Additionally or alternatively, the communications manager 1720 may support wireless communications at the device 1705 (e.g., a first network node) in accordance with examples as disclosed herein. For example, the communications manager 1720 may be configured as or otherwise support a means for transmitting, to a second network node, information indicative of a set of interference measurement resources, where the set of interference measurement resources is based on a first activation schedule of one or more RISs. The communications manager 1720 may be configured as or otherwise support a means for receiving a set of uplink reference signals associated with the second network node on the set of interference measurement resources. The communications manager 1720 may be configured as or otherwise support a means for generating interference measurement information associated with the one or more RISs based on the set of uplink reference signals. The communications manager 1720 may be configured as or otherwise support a means for determining, based on the interference measurement information, a second activation schedule of the one or more RISs or an allocation of resources for communicating with the second network node.

By including or configuring the communications manager 1720 in accordance with examples as described herein, the device 1705 may support techniques for improved communication reliability based on determining an activation schedule (e.g., for one or more RISs) or a resource allocation (e.g., for one or more UEs) that reduces RIS-centric interference. As a result, the device 1705 may perform wireless communications with lower interference and higher reliability, which may increase the likelihood of successful communications at the device 1705, among other benefits.

In some examples, the communications manager 1720 may be configured to perform various operations (e.g., receiving, monitoring, transmitting) using or otherwise in cooperation with the transceiver 1715 or the one or more antennas 1725. Although the communications manager 1720 is illustrated as a separate component, in some examples, one or more functions described with reference to the communications manager 1720 may be supported by or performed by the processor 1740, the memory 1730, or the code 1735. For example, the code 1735 may include instructions executable by the processor 1740 to cause the device 1705 to perform various aspects of interference management for RISs as described herein, or the processor 1740 and the memory 1730 may be otherwise configured to perform or support such operations.

FIG. 18 shows a flowchart illustrating a method 1800 that supports interference management for RISs in accordance with aspects of the present disclosure. The operations of the method 1800 may be implemented by a first network node, which may be an example of aspects of a UE 115 described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving a set of downlink reference signals associated with a second network node on a set of interference measurement resources, where the set of interference measurement resources is based on an activation schedule of one or more RISs. The operations of 1805 may be performed in accordance with examples disclosed herein. In some examples, aspects of the operations of 1805 may be performed by a reference signal receiving component 1225 described with reference to FIG. 12.

At 1810, the method may include generating interference measurement information associated with the one or more RISs based on the set of downlink reference signals. The operations of 1810 may be performed in accordance with examples disclosed herein. In some examples, aspects of the operations of 1810 may be performed by a measurement information component 1230 described with reference to FIG. 12.

At 1815, the method may include transmitting, to the second network node, a measurement report including the interference measurement information. The operations of 1815 may be performed in accordance with examples disclosed herein. In some examples, aspects of the operations of 1815 may be performed by a measurement report transmitting component 1235 described with reference to FIG. 12.

FIG. 19 shows a flowchart illustrating a method 1900 that supports interference management for RISs in accordance with aspects of the present disclosure. The operations of the method 1900 may be implemented by a first network node, which may be an example of aspects of a network entity 105 described with reference to FIGS. 1 through 9 and 14 through 17. In some examples, a network entity may execute a set of instructions to control the functional elements of the network entity to perform the described functions. Additionally or alternatively, the network entity may perform aspects of the described functions using special-purpose hardware.

At 1905, the method may include transmitting a set of downlink reference signals on a set of interference measurement resources, where the set of interference measurement resources is based on a first activation schedule of one or more RISs. The operations of 1905 may be performed in accordance with examples disclosed herein. In some examples, aspects of the operations of 1905 may be performed by a reference signal component 1625 described with reference to FIG. 16.

At 1910, the method may include receiving, from a second network node, a measurement report including interference measurement information associated with the one or more RISs. The operations of 1910 may be performed in accordance with examples disclosed herein. In some examples, aspects of the operations of 1910 may be performed by a report reception component 1630 described with reference to FIG. 16.

At 1915, the method may include determining, based on the measurement report, a second activation schedule of the one or more RISs or an allocation of resources for communicating with the second network node. The operations of 1915 may be performed in accordance with examples disclosed herein. In some examples, aspects of the operations of 1915 may be performed by a RIS determination component 1635 described with reference to FIG. 16.

At 1920, the method may include communicating with the second network node based on the second activation schedule or the allocation of resources. The operations of 1920 may be performed in accordance with examples disclosed herein. In some examples, aspects of the operations of 1920 may be performed by a communication component 1640 described with reference to FIG. 16.

FIG. 20 shows a flowchart illustrating a method 2000 that supports interference management for RISs in accordance with aspects of the present disclosure. The operations of the method 2000 may be implemented by a first network node, which may be an example of aspects of a UE 115 described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a second network node, information indicative of a set of interference measurement resources, where the set of interference measurement resources is based on an activation schedule of one or more RISs. The operations of 2005 may be performed in accordance with examples disclosed herein. In some examples, aspects of the operations of 2005 may be performed by a resource information component 1240 described with reference to FIG. 12.

At 2010, the method may include transmitting a set of uplink reference signals to the second network node on the set of interference measurement resources. The operations of 2010 may be performed in accordance with examples disclosed herein. In some examples, aspects of the operations of 2010 may be performed by a reference signal transmitting component 1245 described with reference to FIG. 12.

At 2015, the method may include communicating with the second network node based on the set of uplink reference signals. The operations of 2015 may be performed in accordance with examples disclosed herein. In some examples, aspects of the operations of 2015 may be performed by a communicating component 1250 described with reference to FIG. 12.

FIG. 21 shows a flowchart illustrating a method 2100 that supports interference management for RISs in accordance with aspects of the present disclosure. The operations of the method 2100 may be implemented by a first network node, which may be an example of aspects of a network entity 105 described with reference to FIGS. 1 through 9 and 14 through 17. In some examples, a network entity may execute a set of instructions to control the functional elements of the network entity to perform the described functions. Additionally or alternatively, the network entity may perform aspects of the described functions using special-purpose hardware.

At 2105, the method may include transmitting, to a second network node, information indicative of a set of interference measurement resources, where the set of interference measurement resources is based on a first activation schedule of one or more RISs. The operations of 2105 may be performed in accordance with examples disclosed herein. In some examples, aspects of the operations of 2105 may be performed by a measurement resource component 1645 described with reference to FIG. 16.

At 2110, the method may include receiving a set of uplink reference signals associated with the second network node on the set of interference measurement resources. The operations of 2110 may be performed in accordance with examples disclosed herein. In some examples, aspects of the operations of 2110 may be performed by a reference signal component 1625 described with reference to FIG. 16.

At 2115, the method may include generating interference measurement information associated with the one or more RISs based on the set of uplink reference signals. The operations of 2115 may be performed in accordance with examples disclosed herein. In some examples, aspects of the operations of 2115 may be performed by an interference measurement component 1650 described with reference to FIG. 16.

At 2120, the method may include determining, based on the interference measurement information, a second activation schedule of the one or more RISs or an allocation of resources for communicating with the second network node. The operations of 2120 may be performed in accordance with examples disclosed herein. In some examples, aspects of the operations of 2120 may be performed by a RIS determination component 1635 described with reference to FIG. 16.

The following provides an overview of aspects of the present disclosure:

Aspect 1: A method for wireless communication at a first network node, comprising: receiving a set of downlink reference signals associated with a second network node on a set of interference measurement resources, wherein the set of interference measurement resources is based on an activation schedule of one or more reconfigurable intelligent surfaces; generating interference measurement information associated with the one or more reconfigurable intelligent surfaces based on the set of downlink reference signals; and transmitting, to the second network node, a measurement report comprising the interference measurement information.

Aspect 2: The method of aspect 1, further comprising: receiving, from the second network node, information indicative of an allocation of resources for communication with the second network node, wherein the allocation of resources is based on the measurement report.

Aspect 3: The method of aspect 2, further comprising: communicating with the second network node via the one or more reconfigurable intelligent surfaces using resources allocated by the allocation of resources.

Aspect 4: The method of any of aspects 1 through 3, wherein receiving the set of downlink reference signals comprises: receiving the set of downlink reference signals associated with the second network node on the set of interference measurement resources, wherein the set of interference measurement resources is based on a set of directional settings associated with the activation schedule of the one or more reconfigurable intelligent surfaces, a set of active periods associated with the activation schedule of the one or more reconfigurable intelligent surfaces, or a set of inactive periods associated with the activation schedule of the one or more reconfigurable intelligent surfaces.

Aspect 5: The method of any of aspects 1 through 4, wherein the interference measurement information comprises information indicative of a respective received power for each respective downlink reference signal of the set of downlink reference signals.

Aspect 6: The method of any of aspects 1 through 5, further comprising: receiving, from the second network node, information indicative of the set of interference measurement resources, wherein receiving the set of downlink reference signals is based on the information.

Aspect 7: A method for wireless communication at a first network node, comprising: transmitting a set of downlink reference signals on a set of interference measurement resources, wherein the set of interference measurement resources is based on a first activation schedule of one or more reconfigurable intelligent surfaces; receiving, from a second network node, a measurement report comprising interference measurement information associated with the one or more reconfigurable intelligent surfaces; determining, based on the measurement report, a second activation schedule of the one or more reconfigurable intelligent surfaces or an allocation of resources for communicating with the second network node; and communicating with the second network node based on the second activation schedule or the allocation of resources.

Aspect 8: The method of aspect 7, wherein determining the second activation schedule or the allocation of resources comprises: determining a set of directional settings for the one or more reconfigurable intelligent surfaces, a set of active periods associated with the second activation schedule of the one or more reconfigurable intelligent surfaces, a set of inactive periods associated with the second activation schedule of the one or more reconfigurable intelligent surfaces, an allocation of uplink resources for communicating with the second network node, or an allocation of downlink resources for communicating with the second network node.

Aspect 9: The method of any of aspects 7 through 8, further comprising: transmitting, to a third network node, first information indicative of the interference measurement information, a first set of directional settings associated with the second activation schedule of the one or more reconfigurable intelligent surfaces, a first set of active periods associated with the second activation schedule of the one or more reconfigurable intelligent surfaces, or a first set of inactive periods associated with the second activation schedule of the one or more reconfigurable intelligent surfaces; and receiving, from the third network node, second information indicative of second interference measurement information associated with the one or more reconfigurable intelligent surfaces, a second set of directional settings associated with the second activation schedule of the one or more reconfigurable intelligent surfaces, a second set of active periods associated with the second activation schedule of the one or more reconfigurable intelligent surfaces, or a second set of inactive periods associated with the second activation schedule of the one or more reconfigurable intelligent surfaces, wherein determining the second activation schedule or the allocation of resources is based on the first information and the second information.

Aspect 10: The method of any of aspects 7 through 9, further comprising: receiving, from a controller associated with the one or more reconfigurable intelligent surfaces, information indicative of a set of directional settings associated with the first activation schedule of the one or more reconfigurable intelligent surfaces, a set of active periods associated with the first activation schedule of the one or more reconfigurable intelligent surfaces, or a set of inactive periods associated with the first activation schedule of the one or more reconfigurable intelligent surfaces, wherein determining the second activation schedule or the allocation of resources is based on the information.

Aspect 11: The method of aspect 10, further comprising: transmitting, to the controller and based on the information received from the controller, second information indicative of the second activation schedule of the one or more reconfigurable intelligent surfaces.

Aspect 12: The method of any of aspects 7 through 11, further comprising: determining the set of interference measurement resources based on a measurement resource coordination procedure between the first network node and a third network node or a controller associated with the one or more reconfigurable intelligent surfaces; and transmitting, to the second network node, information indicative of the set of interference measurement resources, wherein transmitting the set of downlink reference signals is based on the information.

Aspect 13: The method of any of aspects 7 through 12, wherein communicating with the second network node comprises: communicating with the second network node via the one or more reconfigurable intelligent surfaces based on the second activation schedule or the allocation of resources.

Aspect 14: The method of any of aspects 7 through 13, wherein transmitting the set of downlink reference signals comprises: transmitting the set of downlink reference signals on the set of interference measurement resources, wherein the set of interference measurement resources is configured for a set of network nodes in a connected state with the first network node, a set of network nodes with a threshold received signal strength indicator, or a set of network nodes in a geographic coverage area of the first network node.

Aspect 15: The method of any of aspects 7 through 14, wherein transmitting the set of downlink reference signals comprises: transmitting the set of downlink reference signals on the set of interference measurement resources, wherein two or more interference measurement resources of the set of interference measurement resources correspond to respective combinations of one or more active reconfigurable intelligent surfaces and one or more inactive reconfigurable intelligent surfaces, and wherein the one or more reconfigurable intelligent surfaces comprise the one or more active reconfigurable intelligent surfaces and the one or more inactive reconfigurable intelligent surfaces, and wherein the respective combinations are based on the first activation schedule.

Aspect 16: The method of any of aspects 7 through 15, wherein: a first interference measurement resource of the set of interference measurement resources is within an active period of a first reconfigurable intelligent surface of the one or more reconfigurable intelligent surfaces; and a second interference measurement resource of the set of interference measurement resources is within an inactive period of the first reconfigurable intelligent surface.

Aspect 17: The method of any of aspects 7 through 16, wherein: the first interference measurement resource is within an inactive period of a second reconfigurable intelligent surface of the one or more reconfigurable intelligent surfaces; and the second interference measurement resource is within an active period of the second reconfigurable intelligent surface.

Aspect 18: The method of any of aspects 7 through 17, further comprising: receiving, from a third network node, a second measurement report comprising second interference measurement information associated with the one or more reconfigurable intelligent surfaces, wherein determining the second activation schedule or the allocation of resources is based on the measurement report from the second network node and the second measurement report from the third network node.

Aspect 19: A method for wireless communication at a first network node, comprising: receiving, from a second network node, information indicative of a set of interference measurement resources, wherein the set of interference measurement resources is based on an activation schedule of one or more reconfigurable intelligent surfaces; transmitting a set of uplink reference signals to the second network node on the set of interference measurement resources; and communicating with the second network node based on the set of uplink reference signals.

Aspect 20: The method of aspect 19, further comprising: receiving, from the second network node, information indicative of an allocation of resources for communicating with the second network node, wherein the allocation of resources is based on the set of uplink reference signals.

Aspect 21: The method of any of aspects 19 or 20, wherein communicating with the second network node comprises: communicating with the second network node via the one or more reconfigurable intelligent surfaces using resources allocated by the allocation of resources.

Aspect 22: The method of any of aspects 19 through 21, wherein transmitting the set of uplink reference signals comprises: transmitting the set of uplink reference signals to the second network node on the set of interference measurement resources, wherein the set of interference measurement resources is based on a set of directional settings associated with the activation schedule of the one or more reconfigurable intelligent surfaces, a set of active periods associated with the activation schedule of the one or more reconfigurable intelligent surfaces, or a set of inactive periods associated with the activation schedule of the one or more reconfigurable intelligent surfaces.

Aspect 23: The method of any of aspects 19 through 22, wherein: a first interference measurement resource of the set of interference measurement resources is within an active period of a first reconfigurable intelligent surface of the one or more reconfigurable intelligent surfaces; and a second interference measurement resource of the set of interference measurement resources is within an inactive period of the first reconfigurable intelligent surface.

Aspect 24: The method of any of aspects 19 through 23, wherein: the first interference measurement resource is within an inactive period of a second reconfigurable intelligent surface of the one or more reconfigurable intelligent surfaces; and the second interference measurement resource is within an active period of the second reconfigurable intelligent surface.

Aspect 25: A method for wireless communication at a first network node, comprising: transmitting, to a second network node, information indicative of a set of interference measurement resources, wherein the set of interference measurement resources is based on a first activation schedule of one or more reconfigurable intelligent surfaces; receiving a set of uplink reference signals associated with the second network node on the set of interference measurement resources; generating interference measurement information associated with the one or more reconfigurable intelligent surfaces based on the set of uplink reference signals; and determining, based on the interference measurement information, a second activation schedule of the one or more reconfigurable intelligent surfaces or an allocation of resources for communicating with the second network node.

Aspect 26: The method of aspect 25, wherein determining the second activation schedule or the allocation of resources comprises: determining a set of directional settings associated with the second activation schedule of the one or more reconfigurable intelligent surfaces, a set of active periods associated with the second activation schedule of the one or more reconfigurable intelligent surfaces, a set of inactive periods associated with the second activation schedule of the one or more reconfigurable intelligent surfaces, an allocation of uplink resources for communicating with the second network node, or an allocation of downlink resources for communicating with the second network node.

Aspect 27: The method of any of aspects 25 through 26, further comprising: transmitting, to a third network node, first information indicative of the interference measurement information, a first set of directional settings associated with the second activation schedule of the one or more reconfigurable intelligent surfaces, a first set of active periods associated with the second activation schedule of the one or more reconfigurable intelligent surfaces, or a first set of inactive periods associated with the second activation schedule of the one or more reconfigurable intelligent surfaces; and receiving, from the third network node, second information indicative of second interference measurement information, a second set of directional settings associated with the second activation schedule of the one or more reconfigurable intelligent surfaces, a second set of active periods associated with the second activation schedule of the one or more reconfigurable intelligent surfaces, or a second set of inactive periods associated with the second activation schedule of the one or more reconfigurable intelligent surfaces, wherein determining the second activation schedule or the allocation of resources is based on the first information and the second information.

Aspect 28: The method of any of aspects 25 through 27, further comprising: receiving, from a controller associated with the one or more reconfigurable intelligent surfaces, information indicative of a set of directional settings associated with the first activation schedule of the one or more reconfigurable intelligent surfaces, a set of active periods associated with the first activation schedule of the one or more reconfigurable intelligent surfaces, or a set of inactive periods associated with the first activation schedule of the one or more reconfigurable intelligent surfaces, wherein the processor is configured to determine the second activation schedule or the allocation of resources based on the information.

Aspect 29: The method of aspect 28, further comprising: transmitting, to the controller and based on the information received from the controller, second information indicative of the second activation schedule of the one or more RISs.

Aspect 30: The method of any of aspects 25 through 29, further comprising: determining the set of interference measurement resources based on a measurement resource coordination procedure between the first network node and a third network node or a controller associated with the one or more reconfigurable intelligent surfaces, wherein transmitting the information indicative of the set of interference measurement resources to the second network node is based on the measurement resource coordination procedure.

Aspect 31: The method of any of aspects 25 through 30, further comprising: communicating with the second network node via the one or more reconfigurable intelligent surfaces based on the second activation schedule or the allocation of resources.

Aspect 32: The method of any of aspects 25 through 31, wherein receiving the set of uplink reference signals comprises: receiving the set of uplink reference signals on the set of interference measurement resources, wherein the set of interference measurement resources is configured for a set of network nodes in a connected state with the first network node, a set of network nodes with a threshold received signal strength indicator, or a set of network nodes in a geographic coverage area of the first network node.

Aspect 33: The method of any of aspects 25 through 32, wherein receiving the set of uplink reference signals comprises: receiving the set of uplink reference signals on the set of interference measurement resources, wherein the set of interference measurement resources is based on whether the one or more reconfigurable intelligent surfaces are scheduled to be in an active state or an inactive state during a set of time periods corresponding to the set of interference measurement resources.

Aspect 34: The method of any of aspects 25 through 33, further comprising: receiving a second set of uplink reference signals associated with a third network node on the set of interference measurement resources, wherein the set of uplink reference signals associated with the second network node and the second set of uplink reference signals associated with the third network node are associated with different orthogonal cover codes; and generating second interference measurement information associated with the one or more reconfigurable intelligent surfaces based on the second set of uplink reference signals associated with the third network node, wherein determining the second activation schedule or the allocation of resources is based on the interference measurement information from the second network node and the second interference measurement information from the third network node.

Aspect 35: A first network node for wireless communication, comprising: a processor; and memory coupled with the processor, wherein the processor is configured to perform a method of any of aspects 1 through 6.

Aspect 36: An apparatus for wireless communication at a first network node, comprising: means for performing a method of any of aspects 1 through 6.

Aspect 37: A non-transitory computer-readable medium storing code for wireless communication at a first network node, the code comprising instructions executable by a processor to perform a method of any of aspects 1 through 6.

Aspect 38: A first network node for wireless communication, comprising: a processor; and memory coupled with the processor, wherein the processor is configured to perform a method of any of aspects 7 through 18.

Aspect 39: An apparatus for wireless communication at a first network node, comprising: means for performing a method of any of aspects 7 through 18.

Aspect 40: A non-transitory computer-readable medium storing code for wireless communication at a first network node, the code comprising instructions executable by a processor to perform a method of any of aspects 7 through 18.

Aspect 41: A first network node for wireless communication, comprising: a processor; and memory coupled with the processor, wherein the processor is configured to perform a method of any of aspects 19 through 24.

Aspect 42: An apparatus for wireless communication at a first network node, comprising: means for performing a method of any of aspects 19 through 24.

Aspect 43: A non-transitory computer-readable medium storing code for wireless communications at a UE, the code comprising instructions executable by a processor to perform a method of any of aspects 19 through 24.

Aspect 44: A first network node for wireless communication, comprising: a processor; and memory coupled with the processor, wherein the processor is configured to perform a method of any of aspects 25 through 34.

Aspect 45: An apparatus for wireless communication at a first network node, comprising: means for performing a method of any of aspects 25 through 34.

Aspect 46: A non-transitory computer-readable medium storing code for wireless communication at a first network node, the code comprising instructions executable by a processor to perform a method of any of aspects 25 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields, magnetic particles, optical fields, or optical particles.

The various illustrative blocks and components described in connection with the disclosure herein may be implemented or performed with a general-purpose processor, a DSP, an ASIC, a CPU, an FPGA or other programmable logic device, discrete gate or transistor logic, or discrete hardware components designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or firmware. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "Y being based on A, B, or C" shall be construed as including within its scope Y being based on A, Y being based on B, Y being based on C, Y being based on A and B, Y being based on A and C, Y being based on B and C, and Y being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    at least one processor; and
    at least one memory coupled with the at least one processor, wherein the at least one processor is configured to:
        receive a set of downlink reference signals associated with a second network node on a set of interference measurement resources, wherein the set of interference measurement resources is based on an activation schedule of one or more reconfigurable intelligent surfaces, and wherein the set of interference measurement resources indicate time and frequency resources allocated for one or more measurements of interference caused by the one or more reconfigurable intelligent surfaces;

generate interference measurement information associated with the one or more reconfigurable intelligent surfaces based on the set of downlink reference signals, wherein the interference measurement information indicates the interference;
        transmit, to the second network node, a measurement report comprising the interference measurement information; and
        receive, from the second network node, information indicative of an allocation of time and frequency resources for communication with the second network node, wherein the allocation of the time and frequency resources is based on the measurement report.

2. The first network node of claim 1, wherein the at least one processor is configured to:
    communicate with the second network node via the one or more reconfigurable intelligent surfaces using the resources allocated by the allocation of the time and frequency resources.

3. The first network node of claim 1, wherein, to receive the set of downlink reference signals, the at least one processor is configured to:
    receive the set of downlink reference signals associated with the second network node on the set of interference measurement resources, wherein the set of interference measurement resources is based on a set of directional settings associated with the activation schedule of the one or more reconfigurable intelligent surfaces, a set of active periods associated with the activation schedule of the one or more reconfigurable intelligent surfaces, or a set of inactive periods associated with the activation schedule of the one or more reconfigurable intelligent surfaces.

4. The first network node of claim 1, wherein the interference measurement information comprises information indicative of a respective received power for each respective downlink reference signal of the set of downlink reference signals.

5. The first network node of claim 1, wherein the at least one processor is configured to:
    receive, from the second network node, information indicative of the set of interference measurement resources, wherein, to receive the set of downlink reference signals, the at least one processor is configured to receive the set of downlink reference signals based on the information.

6. A first network node for wireless communication, comprising:
    at least one processor; and
    at least one memory coupled with the at least one processor, wherein the at least one processor is configured to:
        transmit a set of downlink reference signals on a set of interference measurement resources, wherein the set of interference measurement resources is based on a first activation schedule of one or more reconfigurable intelligent surfaces, and wherein the set of interference measurement resources indicate time and frequency resources allocated for one or more interference measurements of interference caused by the one or more reconfigurable intelligent surfaces;
        receive, from a second network node, a measurement report comprising interference measurement information associated with the one or more reconfigurable intelligent surfaces, wherein the interference measurement information indicates the interference;

determine, based on the measurement report, a second activation schedule of the one or more reconfigurable intelligent surfaces and an allocation of time and frequency resources for communicating with the second network node; and communicate with the second network node based on the second activation schedule and the allocation of the time and frequency resources.

7. The first network node of claim 6, wherein, to determine the second activation schedule and the allocation of the time and frequency resources, the at least one processor is configured to:

determine a set of directional settings for the one or more reconfigurable intelligent surfaces, a set of active periods associated with the second activation schedule of the one or more reconfigurable intelligent surfaces, a set of inactive periods associated with the second activation schedule of the one or more reconfigurable intelligent surfaces, an allocation of uplink resources for communicating with the second network node, or an allocation of downlink resources for communicating with the second network node.

8. The first network node of claim 6, wherein the at least one processor is configured to:

transmit, to a third network node, first information indicative of the interference measurement information, a first set of directional settings associated with the second activation schedule of the one or more reconfigurable intelligent surfaces, a first set of active periods associated with the second activation schedule of the one or more reconfigurable intelligent surfaces, or a first set of inactive periods associated with the second activation schedule of the one or more reconfigurable intelligent surfaces; and receive, from the third network node, second information indicative of second interference measurement information associated with the one or more reconfigurable intelligent surfaces, a second set of directional settings associated with the second activation schedule of the one or more reconfigurable intelligent surfaces, a second set of active periods associated with the second activation schedule of the one or more reconfigurable intelligent surfaces, or a second set of inactive periods associated with the second activation schedule of the one or more reconfigurable intelligent surfaces, wherein the at least one processor is configured to determine the second activation schedule and the allocation of the time and frequency resources based on the first information and the second information.

9. The first network node of claim 6, wherein the at least one processor is configured to:

receive, from a controller associated with the one or more reconfigurable intelligent surfaces, information indicative of a set of directional settings associated with the first activation schedule of the one or more reconfigurable intelligent surfaces, a set of active periods associated with the first activation schedule of the one or more reconfigurable intelligent surfaces, or a set of inactive periods associated with the first activation schedule of the one or more reconfigurable intelligent surfaces, wherein the at least one processor is configured to determine the second activation schedule and the allocation of the time and frequency resources based on the information.

10. The first network node of claim 9, wherein the at least one processor is configured to:

transmit, to the controller and based on the information received from the controller, second information indicative of the second activation schedule of the one or more reconfigurable intelligent surfaces.

11. The first network node of claim 6, wherein the at least one processor is configured to:

determine the set of interference measurement resources based on a measurement resource coordination procedure between the first network node and a third network node or a controller associated with the one or more reconfigurable intelligent surfaces; and transmit, to the second network node, information indicative of the set of interference measurement resources, wherein the at least one processor is configured to transmit the set of downlink reference signals based on the information.

12. The first network node of claim 6, wherein, to communicate with the second network node, the at least one processor is configured to:

communicate with the second network node via the one or more reconfigurable intelligent surfaces based on the second activation schedule and the allocation of the time and frequency resources.

13. The first network node of claim 6, wherein, to transmit the set of downlink reference signals, the at least one processor is configured to:

transmit the set of downlink reference signals on the set of interference measurement resources, wherein the set of interference measurement resources is configured for a set of network nodes in a connected state with the first network node, a set of network nodes with a threshold received signal strength indicator, or a set of network nodes in a geographic coverage area of the first network node.

14. The first network node of claim 6, wherein, to transmit the set of downlink reference signals, the at least one processor is configured to:

transmit the set of downlink reference signals on the set of interference measurement resources, wherein two or more interference measurement resources of the set of interference measurement resources correspond to respective combinations of one or more active reconfigurable intelligent surfaces and one or more inactive reconfigurable intelligent surfaces, and wherein the one or more reconfigurable intelligent surfaces comprise the one or more active reconfigurable intelligent surfaces and the one or more inactive reconfigurable intelligent surfaces, and wherein the respective combinations are based on the first activation schedule.

15. The first network node of claim 6, wherein:

a first interference measurement resource of the set of interference measurement resources is within an active period of a first reconfigurable intelligent surface of the one or more reconfigurable intelligent surfaces; and a second interference measurement resource of the set of interference measurement resources is within an inactive period of the first reconfigurable intelligent surface.

16. The first network node of claim 15, wherein:

the first interference measurement resource is within an inactive period of a second reconfigurable intelligent surface of the one or more reconfigurable intelligent surfaces; and the second interference measurement resource is within an active period of the second reconfigurable intelligent surface.

17. The first network node of claim 6, wherein the at least one processor is configured to:

receive, from a third network node, a second measurement report comprising second interference measurement information associated with the one or more reconfigurable intelligent surfaces, wherein the at least one processor is configured to determine the second activation schedule and the allocation of the time and frequency resources based on the measurement report from the second network node and the second measurement report from the third network node.

18. A first network node for wireless communications, comprising:

at least one processor; and at least one memory coupled with the at least one processor, wherein the at least one processor is configured to:

receive, from a second network node, information indicative of a set of interference measurement resources, wherein the set of interference measurement resources is based on an activation schedule of one or more reconfigurable intelligent surfaces, and wherein the set of interference measurement resources indicate time and frequency resources allocated for one or more interference measurements of interference caused by the one or more reconfigurable intelligent surfaces;

transmit a set of uplink reference signals to the second network node on the set of interference measurement resources;

receive, from the second network node, information indicative of an allocation of time and frequency resources for communication with the second network node, wherein the allocation of the time and frequency resources is based on the set of uplink reference signals; and communicate with the second network node via the time and frequency resources based on the set of uplink reference signals.

19. The first network node of claim 18, wherein, to communicate with the second network node, the at least one processor is configured to:

communicate with the second network node via the one or more reconfigurable intelligent surfaces using the resources allocated by the allocation of the time and frequency resources.

20. The first network node of claim 18, wherein, to transmit the set of uplink reference signals, the at least one processor is configured to:

transmit the set of uplink reference signals to the second network node on the set of interference measurement resources, wherein the set of interference measurement resources is based on a set of directional settings associated with the activation schedule of the one or more reconfigurable intelligent surfaces, a set of active periods associated with the activation schedule of the one or more reconfigurable intelligent surfaces, or a set of inactive periods associated with the activation schedule of the one or more reconfigurable intelligent surfaces.

21. The first network node of claim 18, wherein:

a first interference measurement resource of the set of interference measurement resources is within an active period of a first reconfigurable intelligent surface of the one or more reconfigurable intelligent surfaces; and a second interference measurement resource of the set of interference measurement resources is within an inactive period of the first reconfigurable intelligent surface.

22. The first network node of claim 21, wherein:

the first interference measurement resource is within an inactive period of a second reconfigurable intelligent surface of the one or more reconfigurable intelligent surfaces; and the second interference measurement resource is within an active period of the second reconfigurable intelligent surface.

23. A first network node for wireless communications, comprising:

at least one processor; and at least one memory coupled with the at least one processor, wherein the at least one processor is configured to:

transmit, to a second network node, information indicative of a set of interference measurement resources, wherein the set of interference measurement resources is based on a first activation schedule of one or more reconfigurable intelligent surfaces, and wherein the set of interference measurement resources indicate time and frequency resources allocated for one or more interference measurements of interference caused by the one or more reconfigurable intelligent surfaces;

receive a set of uplink reference signals associated with the second network node on the set of interference measurement resources;

generate interference measurement information associated with the one or more reconfigurable intelligent surfaces based on the set of uplink reference signals, wherein the interference measurement information indicates the interference; and determine, based on the interference measurement information, a second activation schedule of the one or more reconfigurable intelligent surfaces and an allocation of time and frequency resources for communicating with the second network node.

24. The first network node of claim 23, wherein, to determine the second activation schedule and the allocation of the time and frequency resources, the at least one processor is configured to:

determine a set of directional settings associated with the second activation schedule of the one or more reconfigurable intelligent surfaces, a set of active periods associated with the second activation schedule of the one or more reconfigurable intelligent surfaces, a set of inactive periods associated with the second activation schedule of the one or more reconfigurable intelligent surfaces, an allocation of uplink resources for communicating with the second network node, or an allocation of downlink resources for communicating with the second network node.

25. The first network node of claim 23, wherein the at least one processor is configured to:

transmit, to a third network node, first information indicative of the interference measurement information, a first set of directional settings associated with the second activation schedule of the one or more reconfigurable intelligent surfaces, a first set of active periods associated with the second activation schedule of the one or more reconfigurable intelligent surfaces, or a first set of inactive periods associated with the second activation schedule of the one or more reconfigurable intelligent surfaces; and receive, from the third network node, second information indicative of second interference measurement information, a second set of directional settings associated with the second activation schedule of the one or more reconfigurable intelligent surfaces, a second set of active periods associated with the second activation schedule of the one or more reconfigurable intelligent surfaces, or a second set of inactive periods associated with the second activation schedule of the one or more reconfigurable intelligent surfaces, wherein the at least one processor is configured to determine the second activation schedule and the allocation of the time and frequency resources based on the first information and the second information.

26. The first network node of claim 23, wherein the at least one processor is configured to:

receive, from a controller associated with the one or more reconfigurable intelligent surfaces, information indicative of a set of directional settings associated with the first activation schedule of the one or more reconfigurable intelligent surfaces, a set of active periods associated with the first activation schedule of the one or more reconfigurable intelligent surfaces, or a set of inactive periods associated with the first activation schedule of the one or more reconfigurable intelligent surfaces, wherein the at least one processor is configured to determine the second activation schedule and the allocation of the time and frequency resources based on the information.

27. The first network node of claim 26, wherein the at least one processor is configured to:

transmit, to the controller and based on the information received from the controller, second information indicative of the second activation schedule of the one or more reconfigurable intelligent surfaces.

28. The first network node of claim 23, wherein the at least one processor is configured to:

determine the set of interference measurement resources based on a measurement resource coordination procedure between the first network node and a third network node or a controller associated with the one or more reconfigurable intelligent surfaces, wherein the at least one processor is configured to transmit the information indicative of the set of interference measurement resources to the second network node based on the measurement resource coordination procedure.

29. The first network node of claim 23, wherein the at least one processor is configured to:

communicate with the second network node via the one or more reconfigurable intelligent surfaces based on the second activation schedule and the allocation of the time and frequency resources.

30. The first network node of claim 23, wherein, to receive the set of uplink reference signals, the at least one processor is configured to:

receive the set of uplink reference signals on the set of interference measurement resources, wherein the set of interference measurement resources is configured for a set of network nodes in a connected state with the first network node, a set of network nodes with a threshold received signal strength indicator, or a set of network nodes in a geographic coverage area of the first network node.

31. The first network node of claim 23, wherein, to receive the set of uplink reference signals, the at least one processor is configured to:

receive the set of uplink reference signals on the set of interference measurement resources, wherein the set of interference measurement resources is based on whether the one or more reconfigurable intelligent surfaces are scheduled to be in an active state or an inactive state during a set of time periods corresponding to the set of interference measurement resources.

32. The first network node of claim 23, wherein the at least one processor is configured to:

receive a second set of uplink reference signals associated with a third network node on the set of interference measurement resources, wherein the set of uplink reference signals associated with the second network node and the second set of uplink reference signals associated with the third network node are associated with different orthogonal cover codes; and generate second interference measurement information associated with the one or more reconfigurable intelligent surfaces based on the second set of uplink reference signals associated with the third network node, wherein the at least one processor is configured to determine the second activation schedule and the allocation of the time and frequency resources based on the interference measurement information from the second network node and the second interference measurement information from the third network node.

* * * * *